United States Patent
Kakimoto et al.

(10) Patent No.: US 7,760,605 B2
(45) Date of Patent: Jul. 20, 2010

(54) OPTICAL INFORMATION RECORDING DEVICE, OPTICAL INFORMATION RECORDING METHOD, AND SIGNAL PROCESSING CIRCUIT

(75) Inventors: Hiroya Kakimoto, Gunma (JP); Mitsuo Sekiguchi, Gunma (JP); Isao Matsuda, Gunma (JP); Masashi Yamada, Gunma (JP)

(73) Assignee: Taiyo Yuden Co., Ltd. (JP)

( * ) Notice: Subject to any disclaimer, the term of this patent is extended or adjusted under 35 U.S.C. 154(b) by 1183 days.

(21) Appl. No.: 11/361,884

(22) Filed: Feb. 24, 2006

(65) Prior Publication Data

US 2006/0203642 A1 Sep. 14, 2006

(30) Foreign Application Priority Data

Feb. 24, 2005 (JP) ............................. 2005-048986

(51) Int. Cl.
*G11B 7/00* (2006.01)
(52) U.S. Cl. .................. 369/53.26; 369/53.34; 369/116
(58) Field of Classification Search ........................ None
See application file for complete search history.

(56) References Cited

U.S. PATENT DOCUMENTS

| 6,317,396 | B1 * | 11/2001 | Kuribayashi | ............. | 369/44.35 |
| 2003/0012319 | A1 * | 1/2003 | Watanabe | ..................... | 375/368 |
| 2003/0174622 | A1 * | 9/2003 | Nagai et al. | .............. | 369/59.22 |
| 2004/0095862 | A1 * | 5/2004 | Nakajima et al. | ........ | 369/47.28 |
| 2004/0100885 | A1 * | 5/2004 | Nakamura et al. | ....... | 369/47.51 |

FOREIGN PATENT DOCUMENTS

| JP | 2002-197660 | 7/2002 |
| JP | 2003-15129 | 1/2003 |
| JP | 2003-30837 | 1/2003 |
| JP | 2004-13978 | 1/2004 |
| JP | 2004-63024 | 2/2004 |
| JP | 2004-110995 | 4/2004 |
| JP | 2004-152473 | 5/2004 |
| JP | 2004-213759 | 7/2004 |
| JP | 2004-280876 | 10/2004 |
| JP | 2004-335079 | 11/2004 |
| JP | 2004-355727 | 12/2004 |

* cited by examiner

*Primary Examiner*—Lixi Chow
(74) *Attorney, Agent, or Firm*—Chen Yoshimura LLP

(57) ABSTRACT

It is an object of the present invention to provide a recording condition closer to an optimum even for a medium unknown to a drive, and more particularly to provide a method especially effective when applied to code identification methods, such as PRML, wherein codes are identified based on amplitude information of an RF signal. In order to accomplish the object, an RF signal received from a photo-receiving part 108 of a pickup is converted into sampling data by an A/D converter 300, and a Viterbi decoder 302 performs code determination using the sampling data. Codes included in a reproduction signal are then determined by synchronizing recording pulses with the reproduction signal using the result of the code determination. Then, the result is used to specify a part to be detected in the codes, and finally an amplitude of the specified part is detected.

12 Claims, 28 Drawing Sheets

(a) Reproduction data (RF)

(b) Recording data (Write)

(c) Specific pattern (xyz)

(d) Part to be detected (Gate)

Determination flow of reference condition

FIG.17
Threshold determination flow
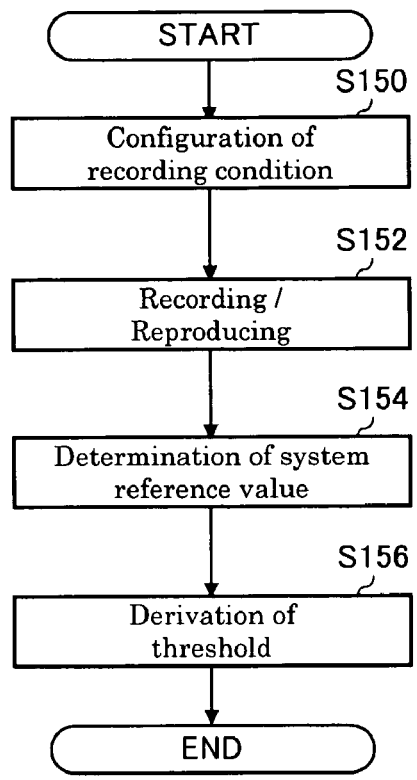
FIG.18
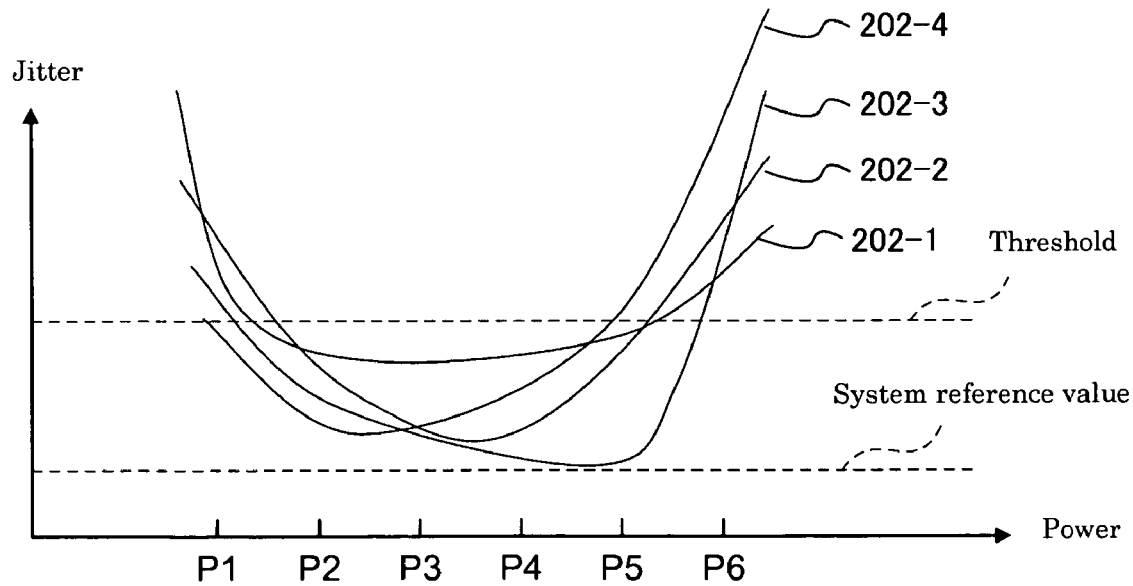
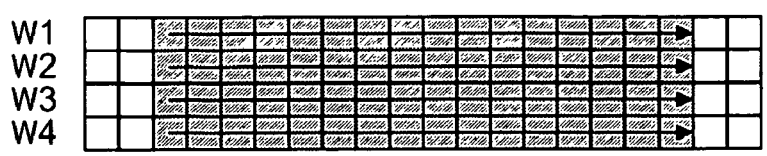

FIG.19
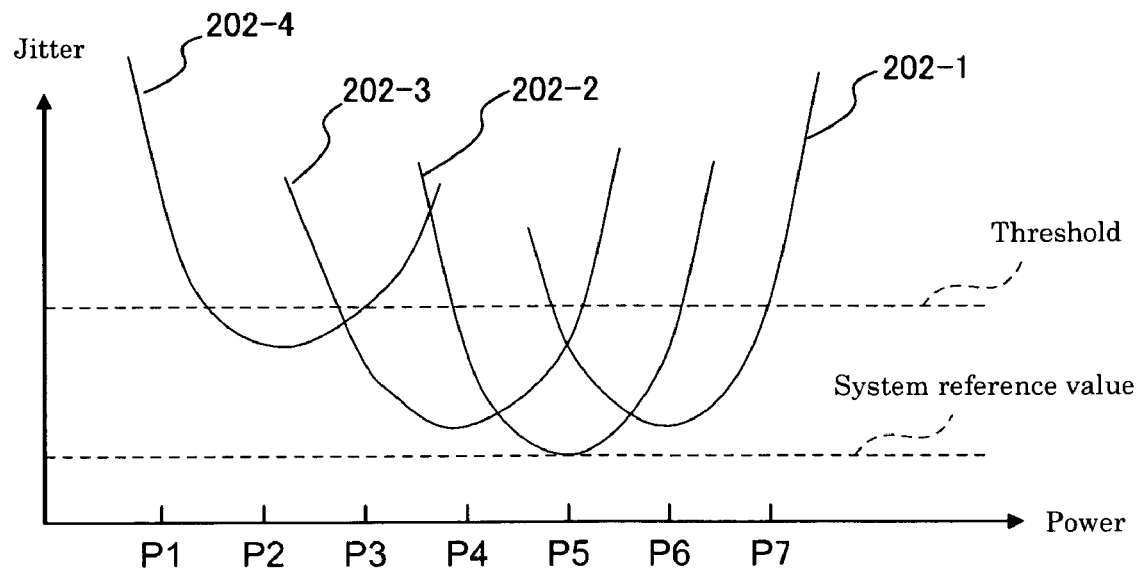
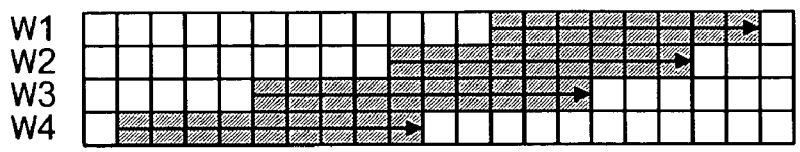
FIG.20
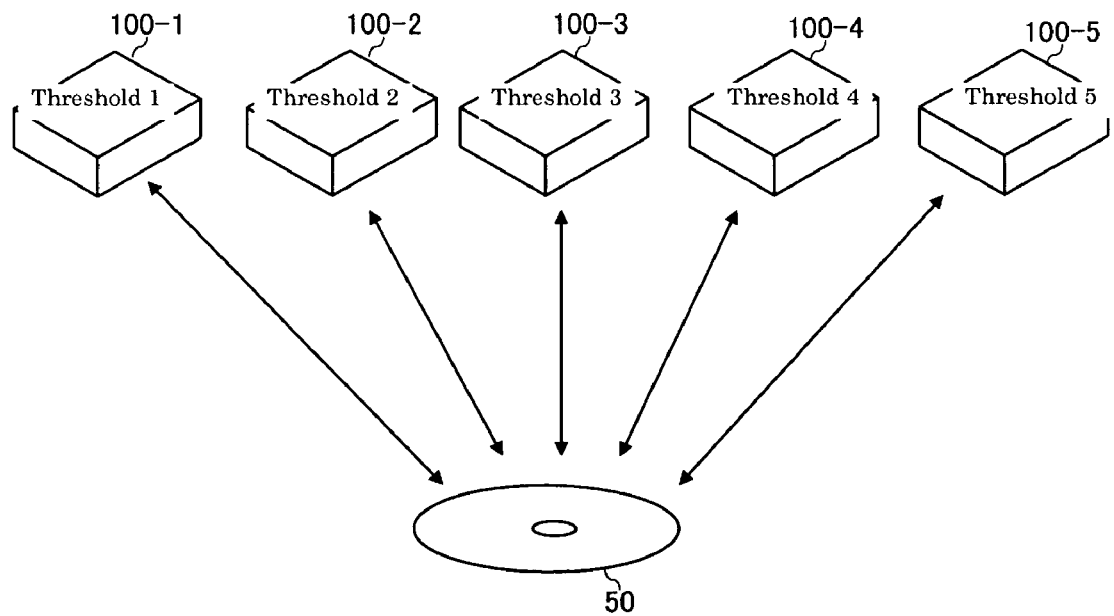

FIG.21
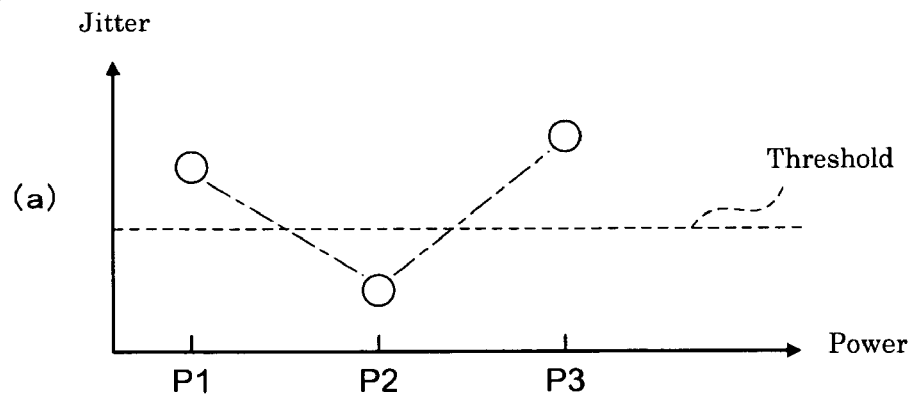
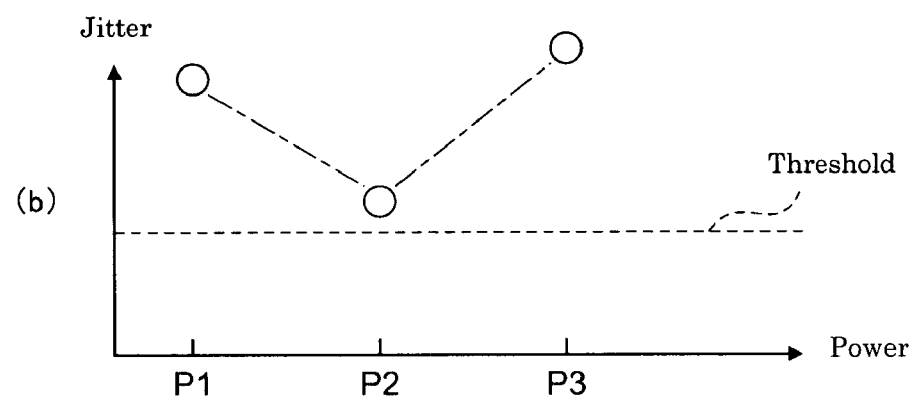
FIG.22
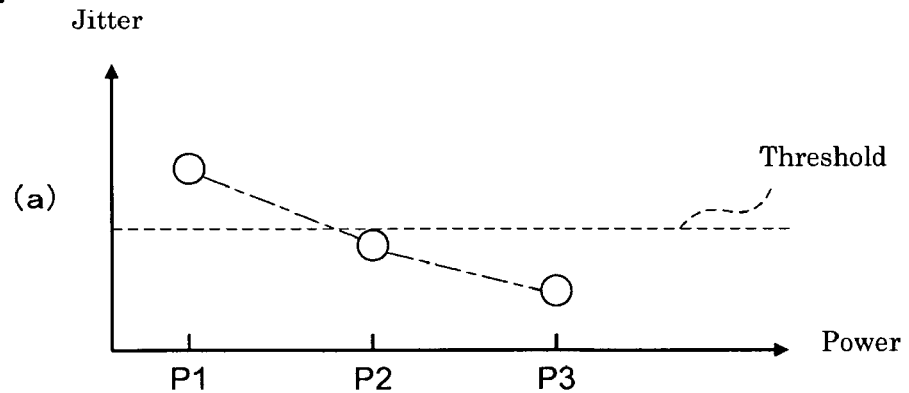
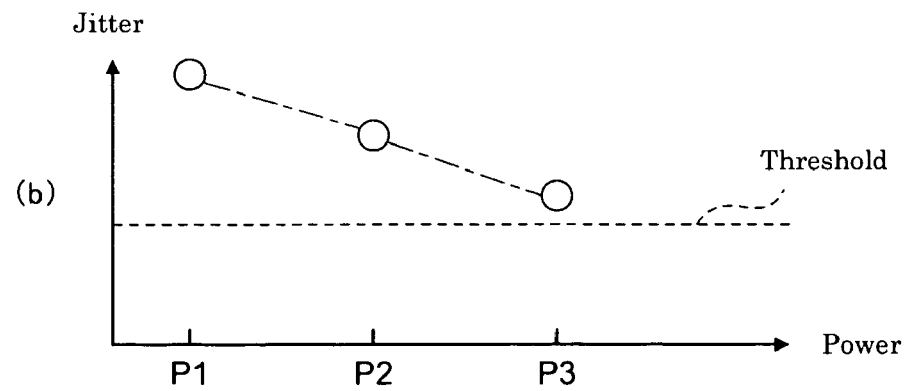

FIG.27

| Pattern | Shape | Relation with threshold | Prediction of recording characteristics | Pulse width |
|---|---|---|---|---|
| 1 | Given | Max. jitter ≤ threshold | Same sensitivity | ±0.2T |
| 2 | Downwardly convex | Min. jitter ≤ threshold | Same sensitivity | ±0.1T |
| 3 | Downwardly convex | Min. jitter > threshold | Same sensitivity and large difference in feature | ±0.2T |
| 4 | Downward-sloping | Min. jitter ≤ threshold | Slightly lower sensitivity | +0.1T, +0.2T |
| 5 | Downward-sloping | Min. jitter > threshold | Significantly lower sensitivity | +0.2T, +0.4T |
| 6 | Upward-sloping | Min. jitter ≤ threshold | Slightly higher sensitivity | -0.1T, -0.2T |
| 7 | Upward-sloping | Min. jitter > threshold | Significantly higher sensitivity | -0.2T, -0.4T |
| 8 | Upwardly convex | Max. jitter > threshold | NG | ±0.2T |

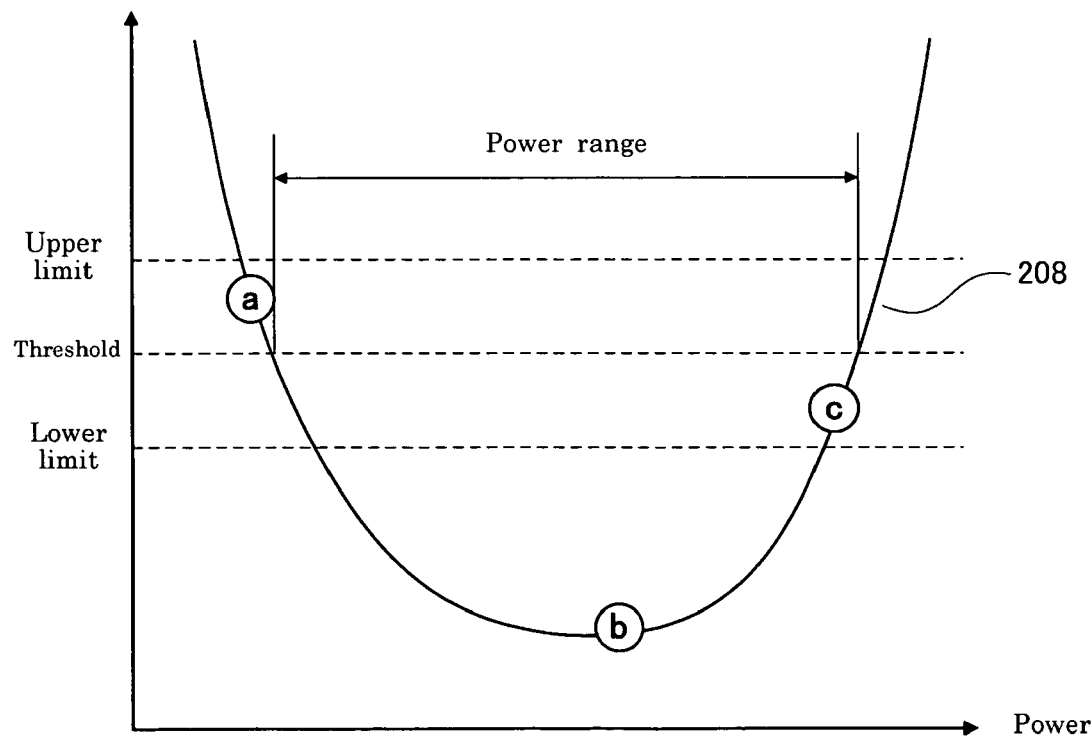

FIG.28

Determination flow of last pulse

Determination flow of intermediate pulse (a) Recording mark (b) Reproduced RF (c) Sampling (d) Amplitude level

| No | Polarity | Amplitude level |
|---|---|---|
| 1 | Mark | 5 |
| 2 | Space | 6 |
| 3 | Mark | 9 |
| 4 | Space | 8 |
| 5 | Mark | 13 |
| 6 | Space | 8 |
| . | . | . |
| . | . | . |
| . | . | . |

FIG.39
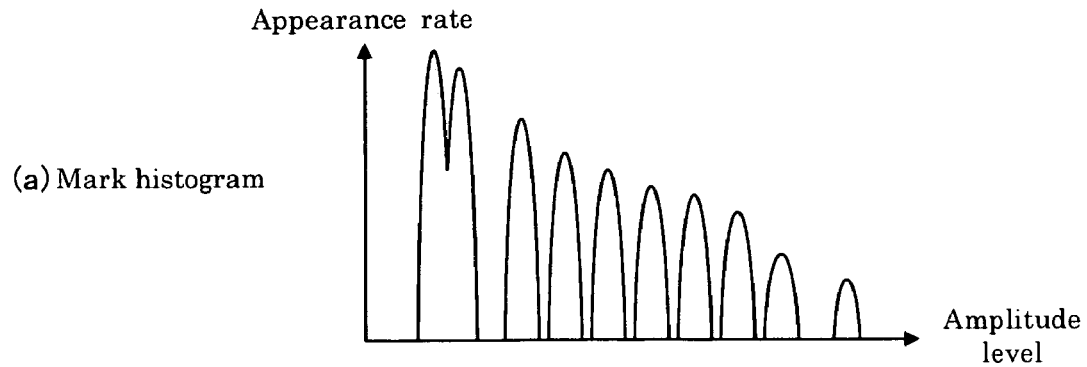
(a) Mark histogram
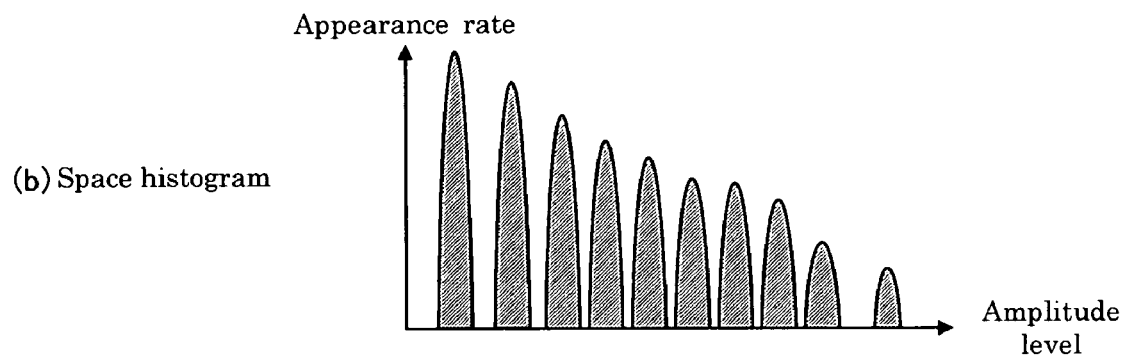
(b) Space histogram
FIG.40
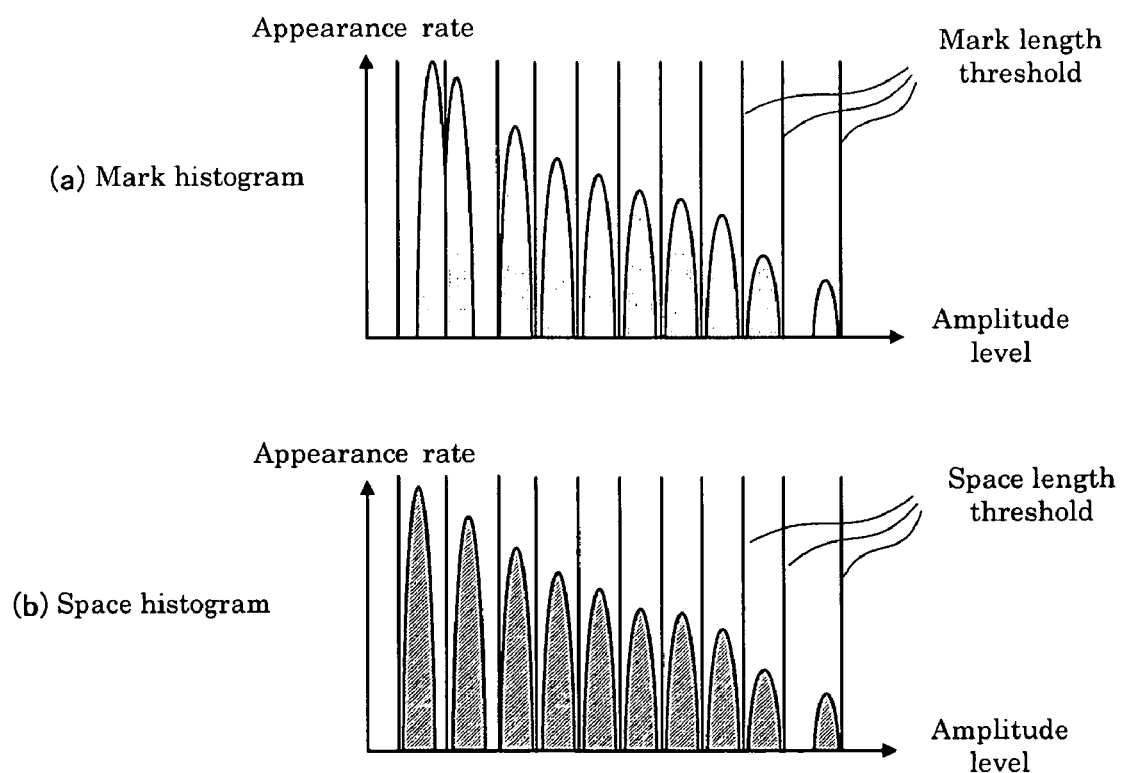
(a) Mark histogram
(b) Space histogram (a) Mark length threshold

| DATA | Amplitude level |
|---|---|
| 2T-3T | 2 |
| 3T-4T | 9 |
| 4T-5T | 18 |
| 5T-6T | 26 |
| 6T-7T | 35 |
| . | . |
| . | . |
| . | . |
| 14T-15T | 100 |

(b) Space length threshold

| DATA | Amplitude level |
|---|---|
| 2T-3T | 2 |
| 3T-4T | 10 |
| 4T-5T | 18 |
| 5T-6T | 26 |
| 6T-7T | 35 |
| . | . |
| . | . |
| . | . |
| 14T-15T | 100 |

FIG.45

(a) Phase shift detection on front side of mark

FPS

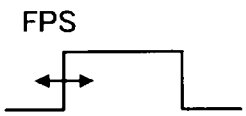

| Search pattern | MxT threshold | | SyT threshold | | MzT threshold | |
|---|---|---|---|---|---|---|
| | min | max | min | max | min | max |
| ≥M6 − S4 − M3 | 26 | 100 | 10 | 18 | 2 | 9 |
| ≥M6 − S4 − M4 | 26 | 100 | 10 | 18 | 9 | 18 |
| ≥M6 − S4 − M5 | 26 | 100 | 10 | 18 | 18 | 26 |
| ≥M6 − S4 − M6 | 26 | 100 | 10 | 18 | 26 | 35 |
| ... | ... | ... | ... | ... | ... | ... |

(b) Phase shift detection on rear side of mark

RPS

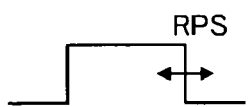

| Search pattern | MxT threshold | | SyT threshold | | MzT threshold | |
|---|---|---|---|---|---|---|
| | min | max | min | max | min | max |
| M3 − S4 − ≥M6 | 2 | 9 | 10 | 18 | 26 | 100 |
| M4 − S4 − ≥M6 | 9 | 18 | 10 | 18 | 26 | 100 |
| M5 − S4 − ≥M6 | 18 | 26 | 10 | 18 | 26 | 100 |
| M6 − S4 − ≥M6 | 26 | 35 | 10 | 18 | 26 | 100 |
| ... | ... | ... | ... | ... | ... | ... |

FIG.46

HID

| Search pattern | SxT threshold | | MyT threshold | | SzT threshold | |
|---|---|---|---|---|---|---|
| | min | max | min | max | min | max |
| S3 − M4 − ≥S6 | 2 | 9 | 10 | 18 | 26 | 100 |
| S4 − M4 − ≥S6 | 9 | 18 | 10 | 18 | 26 | 100 |
| S5 − M4 − ≥S6 | 18 | 26 | 10 | 18 | 26 | 100 |
| S6 − M4 − ≥S6 | 26 | 35 | 10 | 18 | 26 | 100 |
| ... | ... | ... | ... | ... | ... | ... |

Ttopr, Tlastf determination flow (a) Ttopr correction amount

| Space before mark | Mark to be corrected | | | | | | | | | |
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

(b) Tlastf correction amount

| Space after mark | Mark to be corrected | | | | | | | | | |
|---|---|---|---|---|---|---|---|---|---|---|
| | 3T | 4T | 5T | 6T | 7T | 8T | 9T | 10T | 11T | 14T |
| 3T | 3-3 | 3-4 | 3-5 | 3-6 | 3-7 | 3-8 | 3-9 | 3-10 | 3-11 | 3-14 |
| 4T | 4-3 | 4-4 | 4-5 | 4-6 | 4-7 | 4-8 | 4-9 | 4-10 | 4-11 | 4-12 |
| ... | ... | ... | ... | ... | ... | ... | ... | ... | ... | ... |

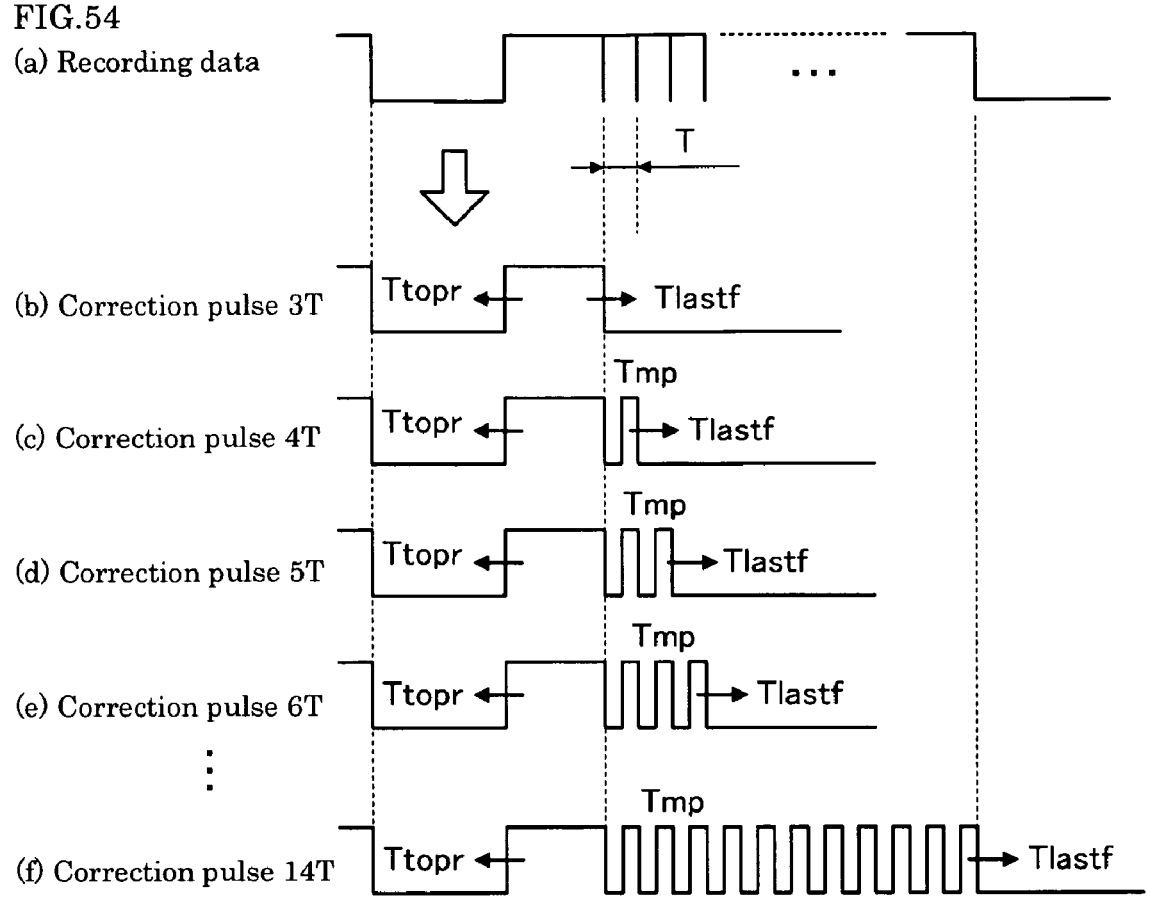

OPTICAL INFORMATION RECORDING DEVICE, OPTICAL INFORMATION RECORDING METHOD, AND SIGNAL PROCESSING CIRCUIT

BACKGROUND OF THE INVENTION

1. Field of the Invention

The present invention relates to a device and a method for optical recording and a signal processing circuit, and more particularly, to a device and a method for optical recording and a signal processing circuit in which a recording condition can be optimized depending on the compatibility between a drive and a medium.

2. Description of the Related Art

For recording onto optical information recording media such as CD-R or DVD-R (hereinafter referred to as "media" or a "medium"), the compatibility between a medium to be recorded on and a device to be used for recording (hereinafter referred to as a "drive") depends on each combination of them. This may be caused by the medium side factor wherein an optimum recording condition is varied by the difference in a recording material comprising the medium or the film formation variation during production, or by the drive side factor wherein the optimum recording condition is varied by the difference in a pickup device and/or a semiconductor laser comprising the drive or assembly variation during production. In fact, a suitable recording condition exists for each combination of a medium and a drive due to the combination of those factors.

Accordingly, in a conventional method, ID information of a medium type identifiable by a drive is stored in the medium as well as a recording condition prepared for each medium type is stored in the drive. When recording is actually conducted, the ID information stored in the medium is read from the medium loaded to the drive, and a recording condition related to the ID information (hereinafter referred to as a "write strategy") is used.

However, in the conventional method, suitable recording conditions can be selected for pre-verified known media, but prepared recording conditions may not be adequate to accommodate unknown media that are not pre-verified. Further, depending on the changes in recording environments such as a recording speed, disturbance, and change over time, the prepared recording conditions may not be adequate even for known media.

A method contemplated to accommodate such an unknown medium is described in Japanese Unexamined Patent Publication No. 2003-30837 and Japanese Unexamined Patent Publication No. 2004-110995.

As described in the paragraph [0020] of Japanese Unexamined Patent Publication No. 2003-30837 " . . . a phase error relative to a channel clock is detected for every recording pattern. A recording compensation parameter adjustment section 12 optimizes an emission waveform rule on the basis of the detection result at the phase error detection section 11," a method for detecting a phase error by comparing with a channel clock and for correcting the phase error is disclosed.

Also, the paragraph [0024] of this document describes that "Next, a test pattern for determining an emission waveform rule is recorded. The area wherein the test pattern is recorded is reproduced, and the relationship between a prepared emission waveform rule and a phase error amount is examined. In other words, the phase error amount in the combination of the length of each mark and the length of each space immediately before the mark is measured. An emission waveform rule wherein the phase error amount becomes zero is estimated from the measured phase error amount, whereby a desired emission waveform rule is determined . . . ", disclosing a method for measuring a phase error amount for every combination of a mark and a space, and then estimating an emission waveform rule wherein the phase error amount becomes zero (see FIG. 16 and FIG. 20).

The method disclosed in Japanese Unexamined Patent Publication No. 2003-30837 is effective for optimizing a strategy because correction is made based on a phase error of a recording pattern.

Also, the paragraph [0045] of Japanese Unexamined Patent Publication No. 2004-110995 describes that " . . . a top pulse corresponding to a 3T period and a non-multipulse corresponding to an 8T period are generated integrally (consecutively) . . . " and the paragraph [0046] of the document describes that " . . . the laser power for a write pulse is adjusted in two levels, and when the ratio between a laser power (a height value of the top pulse) Ph and a laser power (a height value of the non-multipulse) Pm is optimum, an optimum power can be obtained . . . ", suggesting the effectiveness of optimizing the Ph/Pm ratio.

On the other hand, as a code identification method for a high density recording system using a blue laser, adoption of PRML (Partial Response and Maximum Likelihood) method has been considered. Since code identification is performed based on amplitude information of an RF signal obtained by reproducing a recording pattern in the PRML method, in order to provide high-quality recording, a recording condition should be configured using a metrics different from that used in a conventional slice method.

A method for configuring a recording condition based on amplitude information of an RF signal is described in the following patent documents:

Japanese Unexamined Patent Publication No. 2004-13978,
Japanese Unexamined Patent Publication No. 2004-280876,
Japanese Unexamined Patent Publication No. 2003-15129,
Japanese Unexamined Patent Publication No. 2004-63024,
Japanese Unexamined Patent Publication No. 2004-213759, and
Japanese Unexamined Patent Publication No. 2004-152473.

The Patent Documents 2004-13978 and 2004-280876 disclose methods for determining a top pulse, an intermediate pulse, and a last pulse using an asymmetry as an indicator. The Patent Documents 2003-15129, 2004-63024, and 2004-213759 disclose a method for determining a condition of a recording pulse based on the difference between an ideal waveform on the assumption of PRML and a reproduction waveform obtained from actual recording. Japanese Unexamined Patent Publication No. 2004-152473 discloses a method for determining a start position of a top pulse using an asymmetry as an indicator as well as widths of a top pulse and an intermediate pulse using a jitter as an indicator.

An example of performing code determination using a Viterbi decoder is disclosed in Japanese Unexamined Patent Publication No. 2002-197660. This document discloses a method for performing code identification of a reproduction signal as well as detecting amplitude and asymmetry of the reproduction signal by synchronizing an output from a Viterbi decoder to which a digitally-sampled reproduction signal is input with the digital reproduction signal of which timing is adjusted using a delay device.

However, because the method disclosed in the Japanese Unexamined Patent Publication No. 2003-30837 involves, as conventional methods, a fine adjustment of a prepared strategy stored in a drive, it is difficult to provide favorable recording quality for media to which prepared strategies are not applicable.

In the method disclosed in Japanese Unexamined Patent Publication No. 2004-110995, as described in the paragraph [0067] of the document, initial values of Ph and Pm are tentatively set based on values stored in a drive or a medium, and then the Ph/Pm ratio is calculated. Accordingly, as in the case of the Patent Document 1, it is difficult to provide favorable recording quality for media to which the tentatively set values are not applicable.

In the methods disclosed in the Patent Documents 2004-13978 and 2004-280876, because conditions of a top pulse and a last pulse are simultaneously determined using the same indicator, a shortest pulse in which an error is most likely to occur is not optimized. Thus, the methods are vulnerable to a disturbance and more likely to cause errors, and therefore cannot easily provide a high-quality recording system with a large recording margin.

In the methods disclosed in the Patent Documents 2003-15129, 2004-63024, and 2004-213759, because correction is made only for generally known pulse shapes, it is difficult to specify which part of a pulse shape is effective for which indicator. Thus, it is difficult to provide a high-quality recording system with a large recording margin just as in the methods disclosed in the Documents 2004-13978 and 2004-280876 described above.

The method disclosed in the Japanese Unexamined Patent Publication No. 2004-152473 also cannot easily provide a high-quality recording system with a large recording margin, similarly to the methods in the Documents 2004-13978 and 2004-280876, because the widths of a top pulse and an intermediate pulse are simultaneously determined using a jitter as an indicator although a start position of the top pulse is determined using an asymmetry as an indicator.

In the method disclosed in the Japanese Unexamined Patent Publication No. 2002-197660, reproduction signal quality is supposed to be high enough for Viterbi decoding. However, if the reproduction signal quality is low, there is a problem that an error occurs in code identification, resulting in a failure of detecting an amplitude level of a desired data code. Especially, in unknown media for which a recording strategy is not pre-stored in a memory of a recording device, an error in code identification is more likely to occur.

Further, to accommodate the increase of a channel bit rate with increasing the density of recording data, there are problems that when a low-speed A/D converter is used, obtaining an adequate number of samples for level detection becomes more difficult as the length of a signal becomes shorter, and when a high-speed A/D converter is used, it causes a significant increase in cost.

It is therefore an object of the present invention to provide a method to optimize recording conditions depending on the compatibility between a drive and a medium, which is especially effective for the case where a code identification method is used, such as PRML, in which codes are identified based on amplitude information of an RF signal.

SUMMARY OF THE INVENTION

In one embodiment, the invention comprises an optical information recording device for recording information onto an optical information recording medium by irradiating a laser beam onto the recording medium to record a code stream thereon, the code stream comprising multiple types of codes. The optical information recording device comprises a photodetector configured to obtain a reproduction signal produced by laser beam irradiation onto the medium, a decoder configured to produce a detected code stream derived from the reproduction signal; and timing adjustment circuitry for synchronizing at least a portion of the recorded code stream with a corresponding portion of the reproduction signal using the detected code stream.

In another embodiment, the invention comprises an optical information recording method for recording information onto an optical recording medium by irradiating a laser beam onto the recording medium to record a code stream thereon, the code stream comprising multiple types of codes. The optical information recording method comprises the steps of obtaining a reproduction signal by irradiating a laser beam onto the medium, producing a detected code stream derived from the reproduction signal; and synchronizing at least a portion of the recorded code stream with a corresponding portion of the reproduction signal using the detected code stream.

In some embodiments, the methods may additionally include specifying a part to be detected in the reproduction signal; detecting an amplitude level of the reproduction signal within the part to be detected; and configuring a condition for the recording pulses based on the detected amplitude level.

In another embodiment, the invention includes a signal processing circuit for incorporation into an optical information recording device configured to record information onto an optical recording medium by irradiating a laser beam onto the recording medium to record a code stream thereon, the code stream comprising multiple types of codes. The signal processing circuit comprises a first input for receiving a reproduction signal produced by irradiating a laser beam onto the medium, a decoder configured to produce a detected code stream derived from the reproduction signal; and timing adjustment circuitry for synchronizing at least a portion of the recorded code stream with a corresponding portion of the reproduction signal using the detected code stream.

In some embodiments, the signal processing circuit may comprise pattern specification circuitry configured to specify a part to be detected in the reproduction signal, peak detection circuitry configured to detect an amplitude level of the reproduction signal corresponding to the part to be detected, and recording pulse correction circuitry configured to modify a condition for the recording pulses based on the detected amplitude level.

BRIEF DESCRIPTION OF THE DRAWINGS

FIG. 17 is a flowchart showing the details of a reference threshold determination step shown in FIG. 16.

FIG. 18 is a schematic diagram showing an example of the flow shown in FIG. 17.

FIG. 19 is a schematic diagram showing an example of the flow shown in FIG. 17.

FIG. 20 is a schematic diagram exemplifying a case wherein a threshold is calculated for each drive.

FIG. 21 is a schematic diagram showing an example wherein a concave pattern is obtained as a result of examining recording quality in the step S120 of FIG. 16.

FIG. 22 is a schematic diagram showing an example wherein a downward-sloping pattern is obtained as a result of examining recording quality in the step S120 in FIG. 16.

FIG. 27 is a diagram showing an example wherein the step S120 in FIG. 16 is conducted with eight patterns.

FIG. 28 is a schematic diagram showing a method for obtaining a power range used for the step S122 in FIG. 16 by curve approximation.

FIG. 39 is a schematic diagram showing an image of generating a histogram shown in FIG. 36.

FIG. 40 is a schematic diagram showing an image of determination of a threshold shown in FIG. 36.

FIG. 45 is a schematic diagram showing a table configuration for searching a specific pattern used in the detection of a front-side or backside phase shift length.

FIG. 46 is a schematic diagram showing a table configuration for searching a specific pattern used in the detection of a shift length of a mark due to heat interference.

FIG. 54 is a schematic diagram showing an example of a corrected multipulse.

DETAILED DESCRIPTION OF THE PREFERRED EMBODIMENTS

Embodiments of the present invention will hereinafter be described in detail with reference to accompanying drawings. The present invention may be modified from time to time and shall not be limited to the embodiments described herein.

Figure 1:
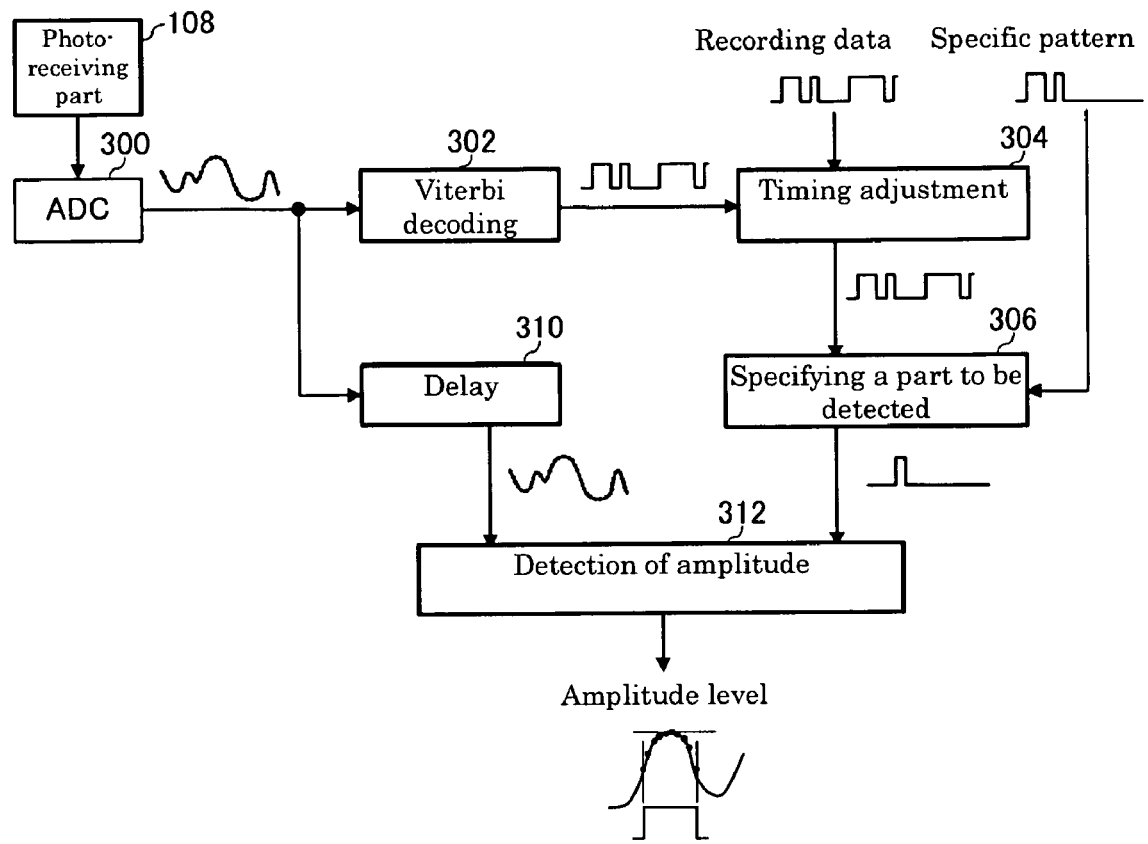
FIG. 1 is a block diagram showing a configuration for detecting amplitude information according to an embodiment of the present invention.

FIG. 1 is a block diagram showing a configuration for detecting amplitude information according to an embodiment of the present invention. As shown in the figure, in the amplitude detection block, an RF signal received from a photo-receiving part 108 of a pickup device is decoded in a Viterbi decoder 302, and a code included in a reproduction signal is determined by synchronizing resulting pulse data with a recording pulse, and then amplitude of a specified part is detected. Each device is described in detail below.

An A/D converter 300 converts the RF signal received from the photo-receiving part 108 of the pickup into digital data at a predetermined sampling frequency and then outputs the data to the Viterbi decoder 302 and a delay device 310. Assuming that a recording system is configured to have a reference clock of 64.8 MHz and to use a 2T code of 32.4 MHz, the sampling frequency is configured to, for instance, be 72 MHz. The A/D converter converts the RF signal converted into a digital signal.

The Viterbi decoder 302 performs code determination based on the sampled data received from the A/D converter 300 and outputs a result to a timing adjuster 304. In addition, to the Viterbi decoder 302, a configuration disclosed in the Japanese Unexamined Patent Publication No. 2002-197660 may be applied. By the Viterbi decoder, code information included in the RF signal is reproduced and output as pulse data comprised of a code stream.

The timing adjuster 304 synchronizes the recording data with the timing of a reproduction signal by performing pattern matching between a signal received from the Viterbi decoder 302 and recording data, and then outputs the timing-adjusted recording data to a unit for specifying a part to be detected 306.

The pattern matching between the output data of the Viterbi decoder and the recording data is performed by specifying a predetermined code stream defined as a synchronization pattern in each data and then matching the timing of these synchronization patterns. As the synchronization pattern, it is preferable to select a code pattern of which the result of Viterbi decoding is not affected by a recording state.

The unit for specifying a part to be detected 306 extracts a specific pattern from the timing-adjusted recording data and outputs a gate signal for specifying a part to be detected to an amplitude detection part 312. As the specific pattern, a unique code pattern pre-stored for each detection element, such as asymmetry detection, phase shift detection, or thermal interference detection, is configured.

For example, when the specific pattern is defined by a code stream of successive 3 codes X, Y, and Z, the asymmetry detection pattern includes a pattern in which Y in the center of the pattern has a specific length while X and Z on each side of the pattern has any length, and the phase shift detection pattern or the thermal interference detection pattern includes a pattern in which any one of X, Y, or Z is varied while other two codes are fixed. The specific pattern will hereinafter be described in detail.

The delay device 310 delays the data received from the A/D converter 300 and outputs the delayed data to the amplitude detection part 312. The output from the delay device 310 is delayed by an amount such that it synchronizes with the output from the unit for specifying a part to be detected 306.

The amplitude detection part 312 sequentially accumulates the amplitude data of codes specified by the unit for specifying a part to be detected 306 from the reproduction signal received from the delay device 310, and outputs a maximum amplitude among the accumulated data as an amplitude level of the specified code.

Figure 2:
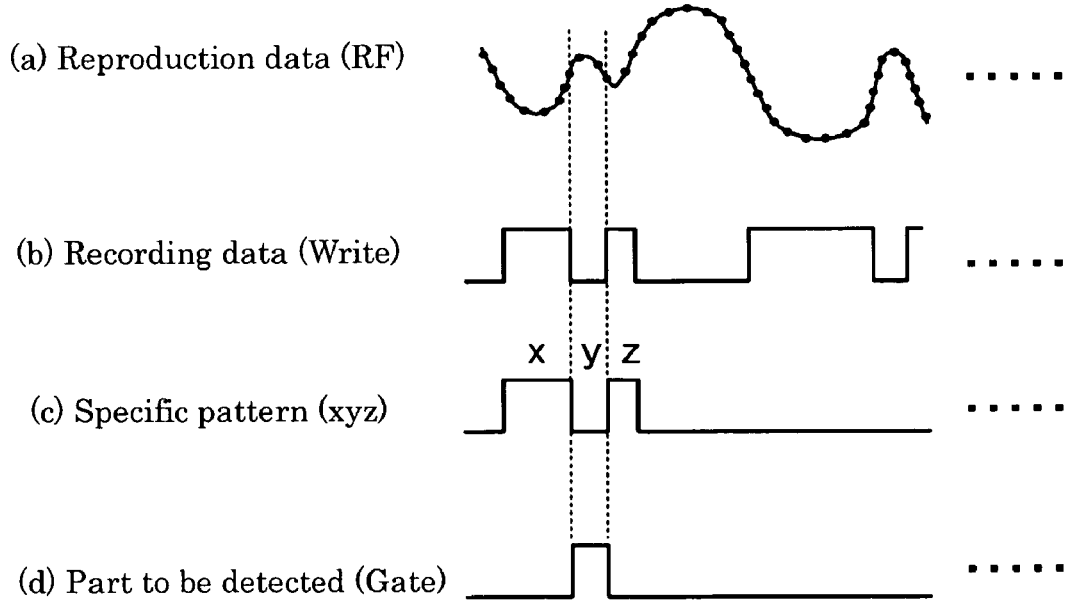
FIG. 2 is a timing diagram exemplifying an operation of the amplitude detection block shown in FIG. 1.

FIG. 2 is a timing diagram exemplifying an operation of the amplitude detection block shown in FIG. 1. As shown in FIG. 2(*a*), the RF signal detected in the photo-receiving part of the pickup is sampled by the A/D converter, and points indicated by black dots in the figure are taken as data and sequentially converted into digital data.

As shown in FIG. 2(*b*), the timing-adjusted recording data are output at a phase synchronized with the reproduction data shown in FIG. 2(*a*), and parts specified by the specific patterns x, y, and z shown in FIG. 2(*c*) are identified. Then, as shown in FIG. 2(*d*), a part to be detected y is output as a gate signal. As a result, among the sampled data in FIG. 2 (*a*), data corresponding to the part to be detected y are retrieved as amplitude information of the specified code.

Figure 3:
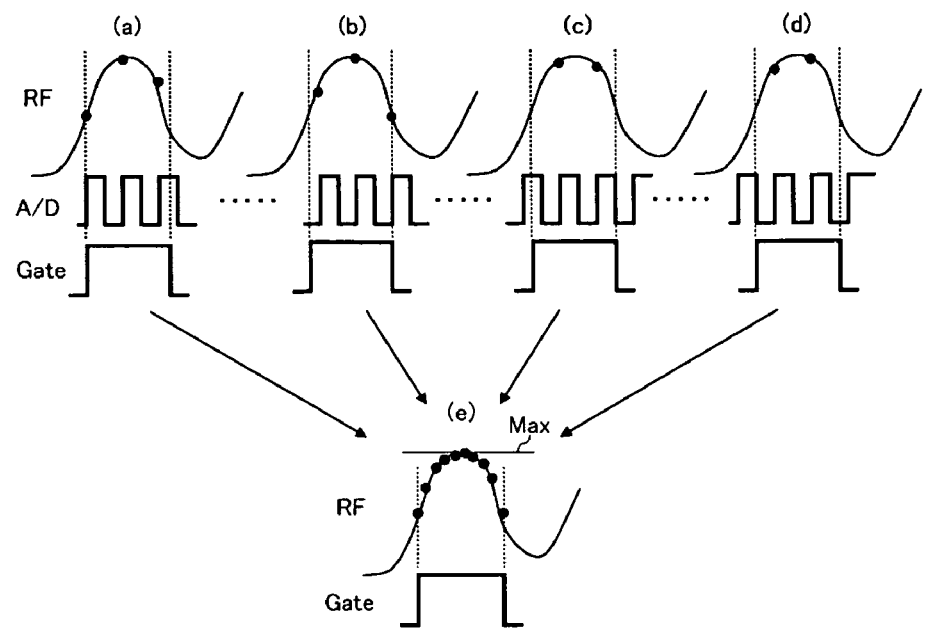
FIG. 3 is a schematic diagram showing a concept of detecting an amplitude level performed by the amplitude detection part shown in FIG. 1.

FIG. 3 is a schematic diagram showing a concept of detecting an amplitude level in the amplitude detection part shown in FIG. 1. As shown in FIGS. 3(*a*) to (*d*), a value of an amplitude level to be detected is varied even for the same specified code, depending on the relation between an appearance position of the code in a reproduction signal and a sampling timing of the A/D converter.

Consequently, as shown in FIG. 3(*e*), sampling data of codes of the same kind existing in specific patterns of the same kind are collected until the total number of samples reaches a predetermined value, and accurately retrieve a peak value of a reproduction RF signal by configuring a maximum or minimum value of the collected sampling results as an amplitude level of the code. In addition, the decision of using a maximum value or a minimum value is made based on a polarity of the signal.

Figure 4:
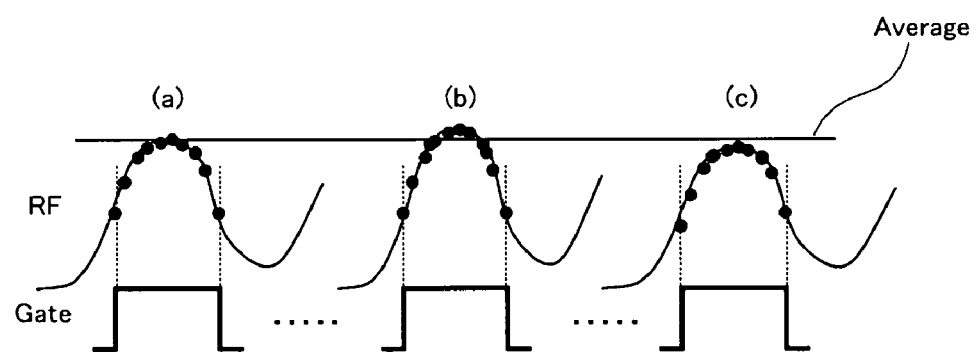
FIG. 4 is a schematic diagram showing an example of performing more precise amplitude detection by repeating several times the collection of sample data shown in FIG. 3.

FIG. 4 is a schematic diagram showing an example of performing more precise amplitude detection by repeating several times the collection of sample data shown in FIG. 3. As shown in FIGS. 4(*a*) to (*c*), since a recording state or a detection state is varied even for codes of the same kind, a predetermined number of samplings shown in FIG. 3 may be repeated several times, and an average of maximum values or minimum values in the sampling results can be set as an amplitude level for the codes.

Figure 5:
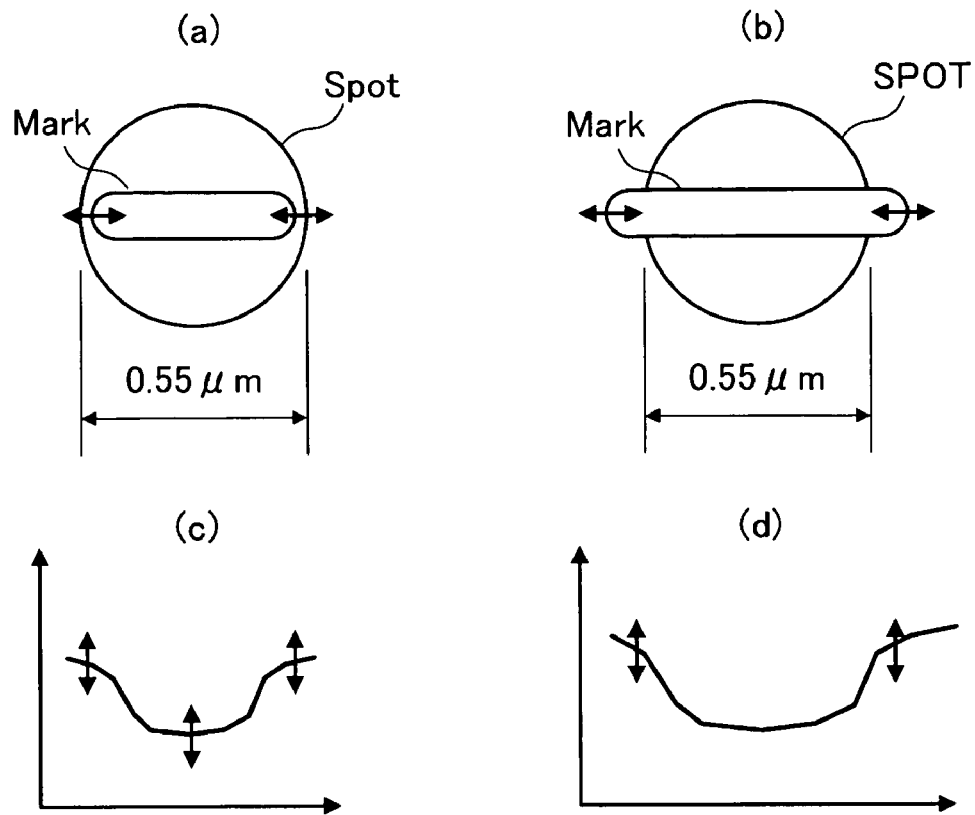
FIG. 5 is a schematic diagram showing a concept of configuring specific patterns to be used for a phase shift correction or a thermal interference correction.

FIG. 5 is a schematic diagram showing a concept of configuring specific patterns to be used for a phase shift correction or a thermal interference correction. As shown in FIGS. 5(*a*) to (*d*), depending on the size of a mark in relation to an effective diameter of a laser spot, the change of the front-end or back-end of the mark, that is, a phase change of a reproduction RF signal is varied. Accordingly, when configuring a specific pattern, it is preferable to consider the relation between an effective diameter of a spot and a code length.

More specifically, as shown in FIG. 5(*a*), when a phase of a mark smaller than an effective diameter of a spot is changed, an obtained RF signal is affected by the phase change throughout its profile as shown in FIG. 5(*c*) since the mark stays inside of the spot.

On the other hand, as shown in FIG. 5(*b*), when a phase of a mark larger than an effective diameter of a spot is changed, a profile around the edges of an obtained RF signal is affected by the phase change, but the amplitude level is hardly affected as shown in FIG. 5(*d*) since the edges of the mark reach outside of the spot.

Consequently, as a part to be detected of a specific pattern to be used for a phase shift correction, it is preferable to use a mark or a space shorter than an effective diameter of a laser spot, and further, it is preferable to use a code such as 4T or 5T code that is longer than a shortest code such as 2T or 3T that is difficult to be recorded.

For example, assuming that an effective diameter of a laser spot used for an HD-DVD system is 0.55 μm, it is preferable to use a 4T code having a length of 0.41 μm or a 5T code having a length of 0.51 μm as a part to be detected.

Figure 6:
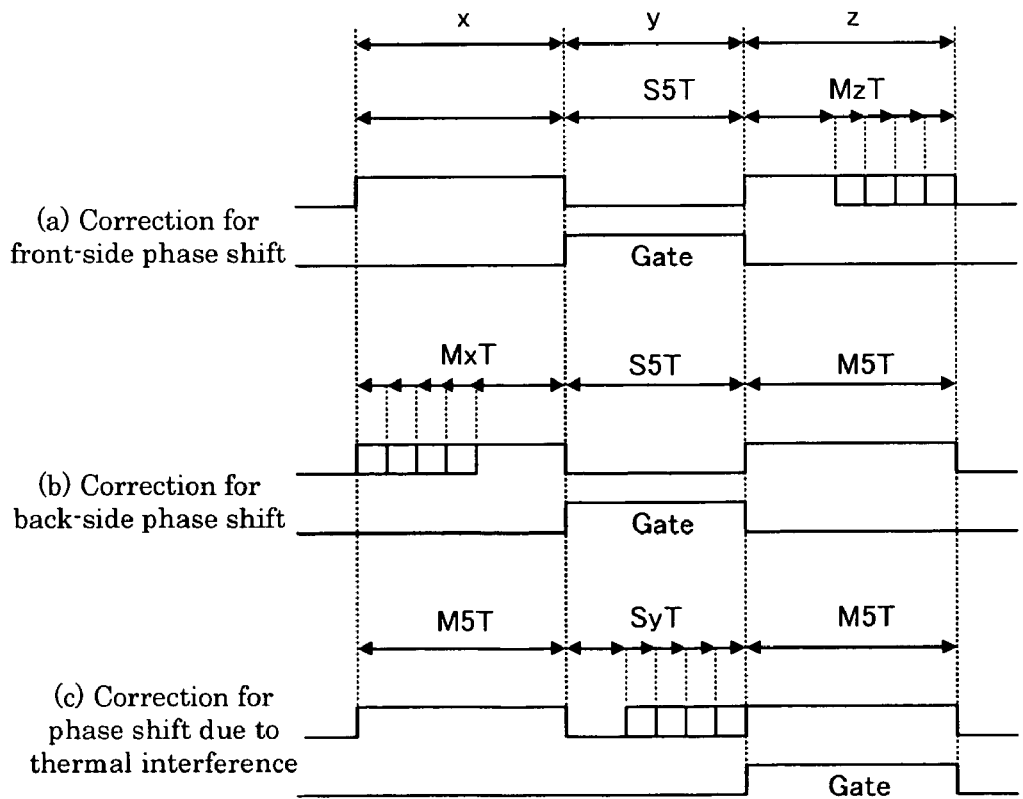
FIG. 6 is a schematic diagram exemplifying specific patterns used for a phase shift correction or a thermal interference correction.

FIG. 6 is a schematic diagram exemplifying specific patterns used for a phase shift correction and a thermal interference correction. As shown in FIG. 6(*a*), when a front-side phase is corrected, a specific pattern comprised of a code stream xyz is configured to have a 5T space as a part to be detected y specified by a gate signal Gate, a fixed length mark (preferably longer than 5T) as a preceding mark x, and a variable length mark having a length of MzT (z=2 to 11) as a succeeding mark z.

Subsequently, a test recording is conducted using the above-described specific pattern, and based on an amplitude change obtained by reproducing the 5T space, which is a part to be detected, a front-end part of each succeeding mark 2T to 11T, which is to be a start position of a laser irradiation, is adjusted. At this time, it is preferable to use a code, an 8T code for instance, having a signal modulation comparable to that of a sparse mark like 11T, as a reference mark and to configure the difference as an amplitude shift amount.

As shown in FIG. 6(*b*), when a backside phase is corrected, a specific pattern comprised of a code stream xyz is configured to have a 5T space as a part to be detected y specified by a gate signal Gate, a fixed length mark (preferably longer than 5T) as a succeeding mark z, and a variable length mark having a length of MxT (x=2 to 11) as a preceding mark x.

Subsequently, a test recording is conducted using the above-described specific pattern, and based on an amplitude change obtained by reproducing the 5T space, which is a part to be detected, a back-end part of each preceding mark 2T to 11T, which is to be an end position of a laser irradiation, is adjusted. At this time, it is preferable to use a code, an 8T code for instance, having a signal modulation comparable to that of a sparse mark like 11T, as a reference mark and to configure the difference as an amplitude shift amount.

As shown in FIG. 6(*c*), when a shift due to thermal interference is corrected, a specific pattern comprised of a code stream xyz is configured to have a 5T mark as a part to be detected z specified by a gate signal Gate, a variable length space having a length of SyT (y=2 to 11) as a preceding space y, and a fixed length mark (preferably longer than 5T) as a preceding mark x.

Subsequently, a test recording is conducted using the above-described specific pattern, and based on an amplitude change obtained by reproducing a 5T mark, which is a part to be detected, a front-end part of each mark 2T to 11T, which is a start position of a laser irradiation, is adjusted. At this time, it is preferable to use a code, an 8T code for instance, having a signal modulation comparable to that of a sparse space like 11T, as a reference space and to configure the difference as an amplitude shift amount.

Figure 7:
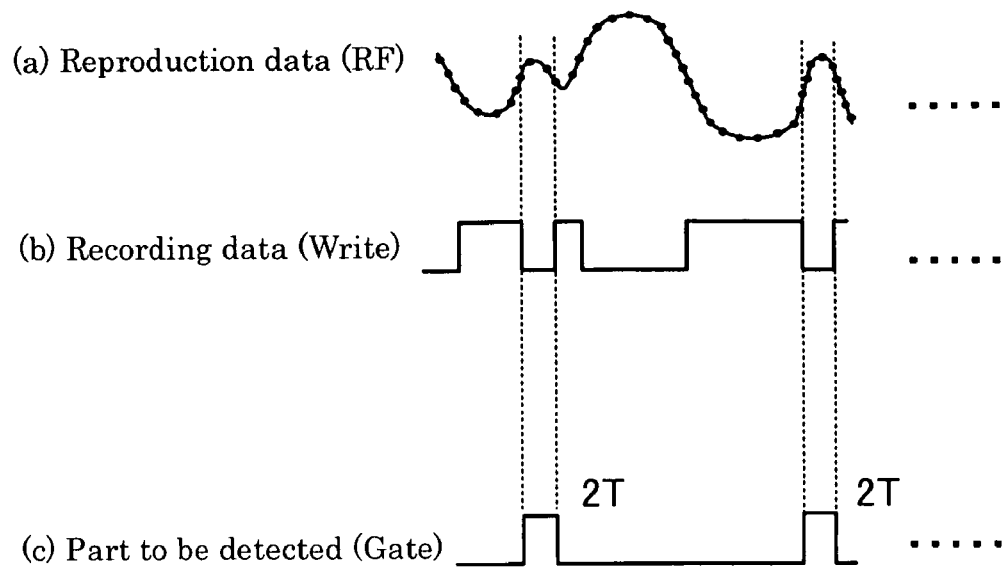
FIG. 7 is a timing diagram exemplifying a specific pattern to be used for detecting an amplitude level for detection of an asymmetry.

FIG. 7 is a timing diagram showing an example of a specific pattern to be used for detecting an amplitude level for detection of an asymmetry. As shown in FIGS. 7(*a*) to (*c*), in order to detect an amplitude level for an asymmetry, instead of extracting the part from recording data that matches the specific pattern, all parts that match a code to be detected are extracted using a gate signal shown in FIG. 7(*c*) regardless of codes in front and back of the code.

For instance, in the case of detecting an asymmetry 2T3T, pulses corresponding to 2T and 3T are independently extracted from recording data shown in FIG. 7 (*b*), and a gate signal just as shown in FIG. 7(*c*) is generated. Using such gate signal, sampling data of parts corresponding to 2T and to 3T are respectively collected from reproduction data shown in FIG. 7(*a*), and then an asymmetry property between an amplitude level of 2T and that of 3T detected by using such data is evaluated.

Figure 8:
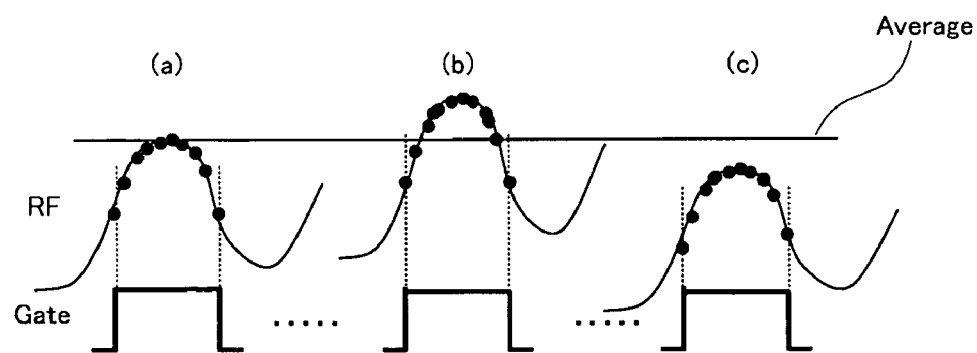
FIG. 8 is a schematic diagram showing appearances of the amplitude levels detected by using the gate signal shown in FIG. 7(c).

FIG. 8 is a schematic diagram showing appearances of the amplitude levels detected by using the gate signal shown in FIG. 7(*c*). As shown in FIGS. 8(*a*) to (*c*), in the case of detecting an amplitude level of a certain code regardless of the lengths of codes in front and back of the code, variation in the amplitude level becomes wider, compared to the case of detecting only codes included in specific patterns of the same kind. However, obtaining an average of the variation enables an amplitude level for asymmetry detection to be determined.

Figure 9:
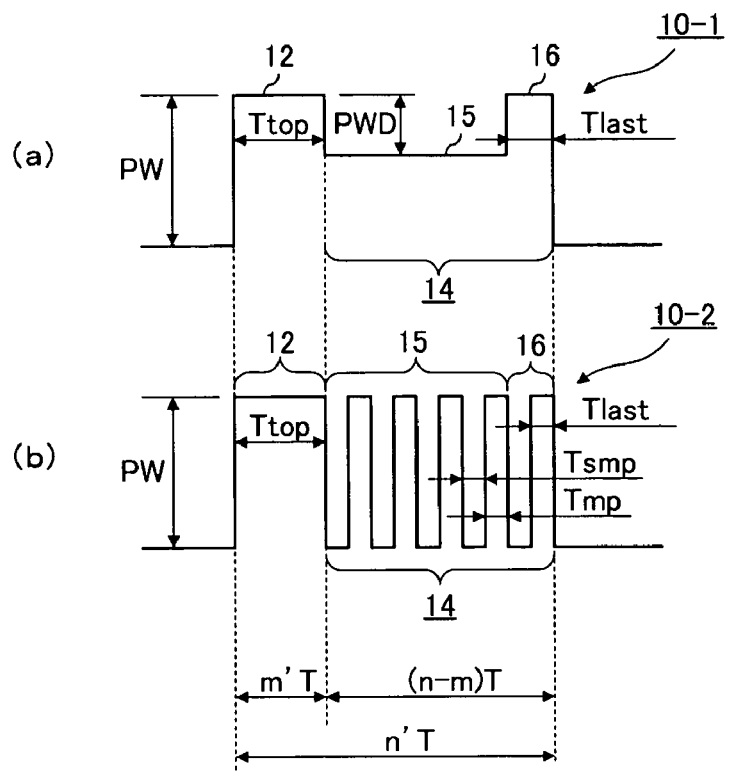
FIG. 9 is a schematic diagram showing a configuration of a recording pulse according to an embodiment of the present invention.

FIG. 9 is a schematic diagram showing a configuration of a recording pulse according to an embodiment of the present invention. FIG. 9(*a*) is an example of using a single pulse comprised of a single pulse pattern, and (*b*) an example of using a multipulse comprised of a plurality of pulse patterns. As shown in the figure, a single pulse 10-1 and multipulse 10-2 are comprised of a top pulse 12 located at the front of a recording pulse and a succeeding pulse 14 that follows the top pulse, wherein the succeeding pulse 14 has an intermediate pulse 15 that follows the top pulse 12 and a last pulse 16 located at the end of the recording pulse.

Assuming that each of the recording pulses 10-1 and 10-2 has a length of n'T, the top pulse 12 has a length of m'T and the succeeding pulse 14 has a length of (n−m)T, and n and m take the values of m=2 and n=2 to 11, where T is a unit time defined by an optical disk system of which frequency is determined by a clock signal.

A condition for the recording pulse 10-1 or 10-2 is determined by conducting a test recording under the condition of loading an optical information recording medium (hereinafter referred to as a "medium" or a "disk") into an optical information recording device (hereinafter referred to as a "recording device" or a "drive").

An energy amount of the entire recording pulse is defined by the height of a main power PW, and an initial energy amount supplied to the initial position of a recording mark is defined by the length of a top pulse width Ttop. The main power PW preferably has the highest value in the recording pulse 10-1 or 10-2, and the top pulse width Ttop has a width that corresponds to the shortest recording mark having a length of 2T. Since the recording pulse having the shortest width has the highest appearance rate and significantly affects recording quality, it is preferable to first determine an optimum condition for the power PW and the pulse width Ttop of the top pulse 12.

As a condition for the intermediate pulse 15, in the case of the single pulse 10-1 shown in FIG. 9(*a*), a lower-power area where the power is lower than the main power PW by PWD is defined, and defining the amount allows a recording mark to be prevented from forming a tear drop shape. Similarly, in the case of the multipulse 10-2 shown in FIG. 9 (*b*), defining the width Tmp of the intermediate pulse 15 located between the top pulse 12 and the last pulse 16 or a duty ratio between Tmp and Tsmp allows a recording mark to be prevented from forming a tear drop shape.

A condition for the last pulse 16 is determined by adjusting the width Tlast of the last pulse 16 located at the back end of the recording pulse. The condition for the succeeding pulse comprised of the intermediate pulse 15 and the last pulse 16 is determined based on the top pulse condition.

Figure 10:
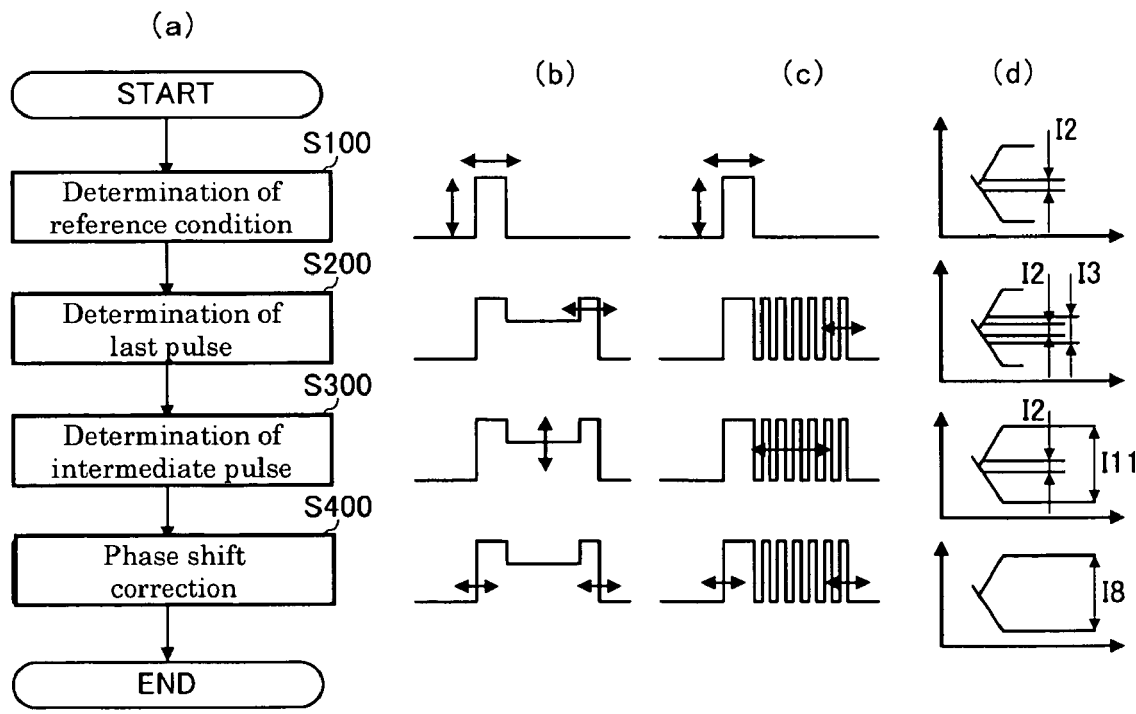
FIG. 10 is a schematic diagram showing a first method for determining a recording pulse condition.

FIG. 10 is a schematic diagram showing a first method for determining a recording pulse condition. FIG. 10(*a*) is a flowchart showing a determination procedure of a recording pulse condition, and regarding each of the steps shown in FIG. 10(*a*), FIG. 10(*b*) shows parts to be adjusted in the case of a single pulse, FIG. 10(*c*) shows parts to be adjusted in the case of a multiple pulse, and FIG. 10(*d*) shows parameters used as indicators.

As shown in FIG. 10(*a*), when determining a recording pulse condition by this method, a reference recording pulse condition corresponding to each code is determined first (step S100). The reference condition is, as shown in the step S100 of FIG. 10(*b*), (*c*), or (*d*), configured by adjusting the power and the width of the top pulse to obtain a condition under which a shift amount of an amplitude value I2 of the shortest code 2T becomes zero.

In addition, for the above-described amplitude shift amount, an error value obtained in a detection pattern around a 2T pattern selected from the recording result obtained using a random or specific pattern may be used as an indicator, or an amplitude shift amount corresponding to the specific pattern as explained using FIGS. 1 and 2 may be used as an indicator. Alternatively, an amplitude shift amount obtained from all the codes to be detected, regardless of a specific pattern, as explained using FIGS. 7 and 8 may be used as an indicator.

Subsequently, conducting a test recording under the reference condition allows a recording condition for the last pulse to be determined (step S200). The last pulse condition is, as shown in the step S200 of FIG. 10(*b*), (*c*), or (*d*), configured by adjusting the width of the last pulse to obtain a condition under which an asymmetry 2T3T which indicates an asymmetry property between an amplitude value I2 of the shortest code 2T and that I3 of the second shortest code 3T becomes zero, while fixing the intermediate pulse condition to a predetermined condition.

Subsequently, conducting a test recording using the reference condition obtained in the step S100 and the last pulse obtained in the step S200 allows an intermediate pulse condition to be determined (step S300). The intermediate pulse condition is, as shown in the step S300 of FIG. 10(*b*), (*c*), or (*d*), configured by adjusting the power of the intermediate pulse in the case of a single pulse, or by adjusting the widths of divided pulses comprising the intermediate pulse in the case of a multi pulse, to obtain a condition under which an asymmetry 2T11T which indicates an asymmetry property between an amplitude value I2 of the shortest code 2T and that I11 of the longest code 11T becomes zero.

Since the recording pulse conditions are determined by conducting the above-described steps S100 to S300, further conducting a test recording using the recording pulse allows a phase shift of the recording pulse to be corrected (step S400). The phase shift is, as shown in the step S400 of FIG. 10(*b*), (*c*), or (*d*), corrected by adjusting the start and end positions of the recording pulse to obtain a condition under which a shift amount of an amplitude value I8 of an appropriate code, i.e., an 8T code in this example, becomes zero. In addition, an amplitude shift amount corresponding to a pattern around the 8T code is preferably used as the shift amount.

Figure 11:
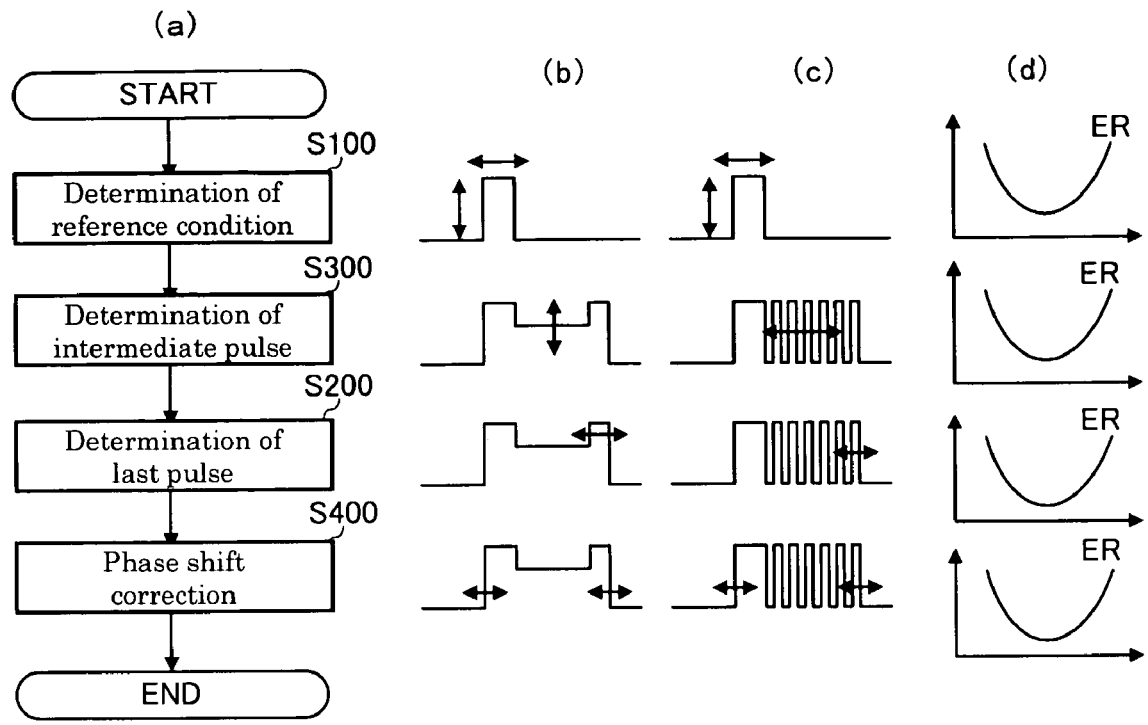
FIG. 11 is a schematic diagram showing a second method for determining a recording pulse condition.

FIG. 11 is a schematic diagram showing a second method for determining a recording pulse condition. FIG. 11(*a*) is a flowchart showing a determination procedure of a recording pulse condition, and regarding each step shown in FIG. 11(*a*), FIG. 11(*b*) shows parts to be adjusted in the case of a single pulse, FIG. 11(*c*) shows parts to be adjusted in the case of a multiple pulse, and FIG. 11(*d*) shows parameters used as indicators.

As shown in FIG. 11(*a*), when determining a recording pulse condition by this method, a reference recording pulse condition corresponding to each code is determined first (step S100). The reference condition is, as shown in the step S100 of FIG. 11(*b*), (*c*), or (*d*), configured by adjusting the power and the width of the top pulse to obtain a condition under which an error rate is minimized.

Subsequently, conducting a test recording under the reference condition allows a recording condition for the intermediate pulse to be determined (step S300). The intermediate pulse condition is, as shown in the step S300 of FIG. 11(*b*), (*c*), or (*d*), configured by adjusting the power of the intermediate pulse in the case of a single pulse, or by adjusting the width of divided pulses comprising the intermediate pulse in the case of a multipulse, to obtain a condition under which an error rate is minimized.

Subsequently, conducting a test recording using the reference condition obtained in the step S100 and the intermediate pulse obtained in the step S300 allows a last pulse condition to be determined (step S200). The last pulse condition is, as shown in the step S200 of FIG. 11(*b*), (*c*), or (*d*), configured by adjusting the width of the last pulse to obtain a condition under which an error rate is minimized, while fixing the intermediate pulse condition to a predetermined condition.

Since the recording pulse conditions are determined by conducting the above-described steps S100 to S300, further conducting a test recording using the recording pulse allows a phase shift of the recording pulse to be corrected (step S400). The phase shift is, as shown in the step S400 of FIG. 11(*b*), (*c*), or (*d*), corrected by adjusting the start and end positions of the recording pulse to obtain a condition under which an error rate is minimized.

In addition, all the steps in the above description are explained using an example wherein an error rate is used as an indicator, however, an optional indicator such as an asymmetry for last pulse and intermediate pulse adjustments or an amplitude shift amount for a phase shift correction may be used in each step. Further, a recording condition under which a recording characteristic is most stabilized within the power margin determined using an error rate as an indicator may be configured.

Figure 12:
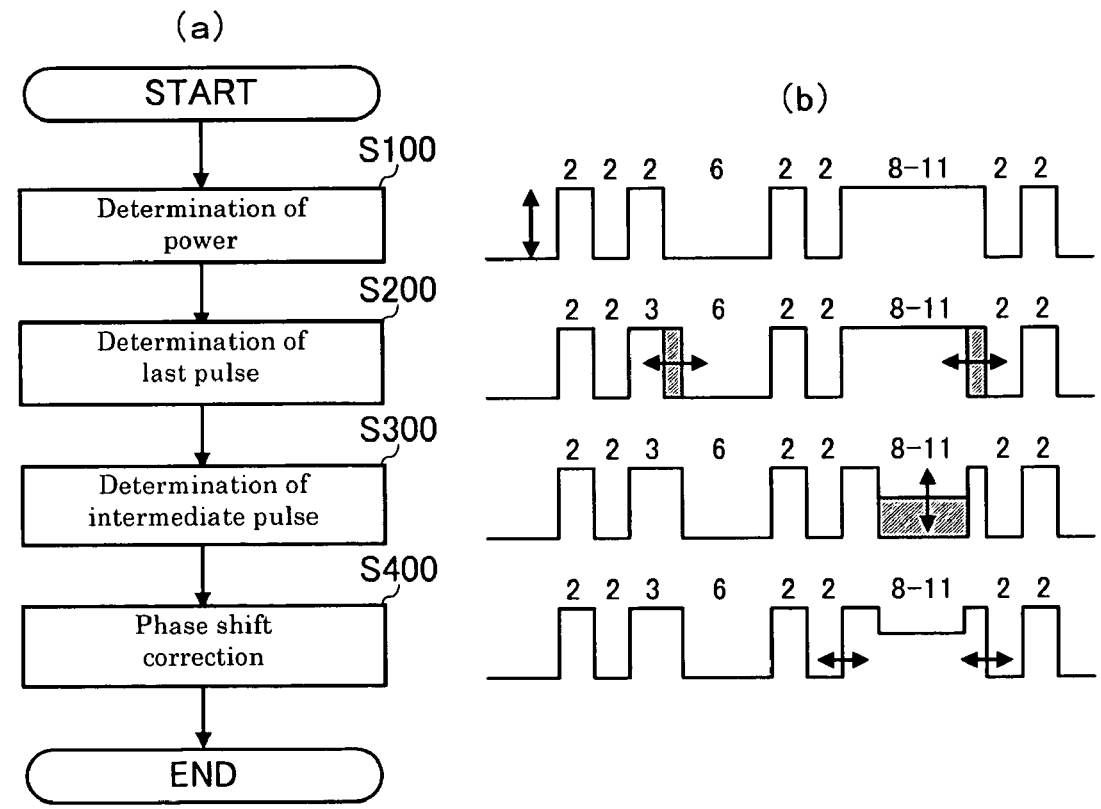
FIG. 12 is a schematic diagram showing a third method for determining a recording pulse condition.

FIG. 12 is a schematic diagram showing a third method for determining a recording pulse condition. The method shown in the figure is an example of determining a recording condition based on the result of a test recording using a recording pattern including multiple types of codes. FIG. 12(*a*) is a flowchart showing a determination procedure of a recording pulse condition, and regarding each step of FIG. 12(*a*), FIG. 12(*b*) shows parts to be adjusted of a recording pulse comprised of a single pulse. In addition, a numerical value in FIG. 12(*b*) represents a mark length or a space length corresponding to each code as a unit time length, and the representation of "8-11" means any code between 8T and 11T.

As shown in FIG. 12(*a*), when determining a recording pulse condition by this method, a power condition of a recording pattern comprised of multiple types of codes is determined first (step S1100). The power condition is configured by adjusting the power of the entire recording pattern as shown in the step S100 of FIG. 12(*b*). As an indicator of the power adjustment, a condition under which a shift amount of an amplitude value I2 of the shortest code 2T becomes zero or a condition under which an error rate is minimized may be obtained. Further, a power condition under which a recording characteristic is most stabilized within a power margin determined using an error rate as an indicator may be configured.

It is preferable that the recording pattern is prepared in a drive, and as top pulse, intermediate pulse, and last pulse conditions used in the recording pattern, standard values stored in the drive may be used, or the conditions may be obtained from a test recording.

Subsequently, conducting a test recording under the power condition determined in the step S100 allows a recording condition of the last pulse to be determined (step S200). The last pulse condition is configured by adjusting the width of the last pulse while the top pulse and intermediate pulse conditions are fixed to a predetermined condition, as shown in the step S200 of FIG. 12(b).

In this example, since a code having a length of 3T or longer uses the last pulse, the back ends of pulses respectively corresponding to a 3T mark and an 8-11T mark are adjusted as shown in FIG. 12(b). As an indicator of the last pulse adjustment, a condition under which an asymmetry 2T3T that indicates an asymmetry property between an amplitude value I2 of the shortest code 2T and that I3 of the second shortest code 3T becomes zero or a condition under which an error rate is minimized may be obtained.

Subsequently, conducting a test recording using the power condition obtained in the step S100 and the last pulse obtained in the step S200 allows a recording condition of the intermediate pulse to be determined (step S300). The intermediate pulse condition is configured by adjusting the power of the intermediate pulse as shown in the step S300 of FIG. 12(b).

In this example, since a code having a length of 4T or longer uses the intermediate pulse, an intermediate power of a pulse corresponding to an 8-11T mark is adjusted as shown in FIG. 12(b). As an indicator of the intermediate pulse adjustment, a condition under which an asymmetry 2T11T that indicates an asymmetry property between an amplitude value I2 of the shortest code 2T and that I11 of the longest code 11T becomes zero or a condition under which an error rate is minimized may be obtained.

Since a condition for each of the recording pulses included in a recording pattern is determined by conducting the above-described steps S100 to S300, further conducting a test recording using the determined recording pulse allows a phase shift of the recording pulse to be appropriately corrected (step S400). The phase shift is corrected by adjusting the start and end positions of a recording pulse to be corrected as shown in the step S400 of FIG. 12(b).

The recording pulse to be corrected is specified by a test recording using multiple types of recording patterns, and in the pattern shown in FIG. 12(b) for instance, an 8-11T code is to be corrected. In addition, as an indicator of the phase shift correction, an asymmetry value or an error rate may be used.

Figure 13:
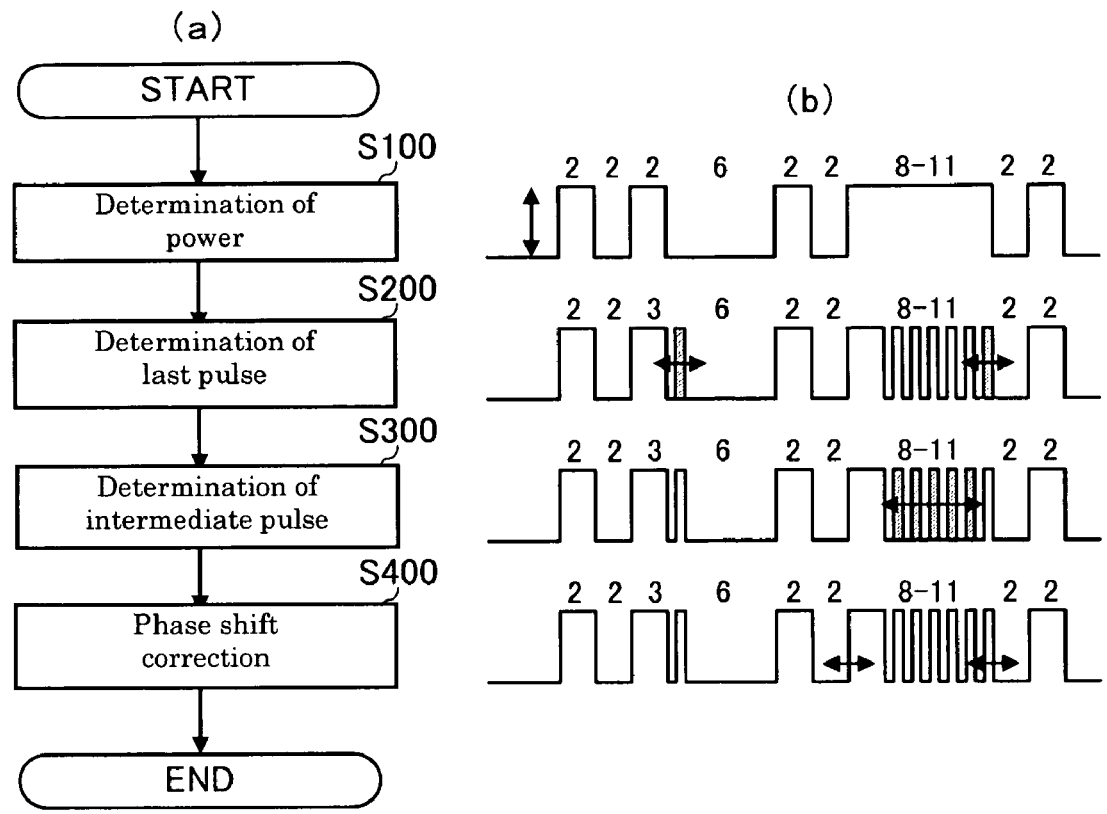
FIG. 13 is a schematic diagram showing a forth method for determining a recording pulse condition.

FIG. 13 is a schematic diagram showing a fourth method for determining a recording pulse condition. The method shown in the figure is an example of determining a recording condition based on the result of a test recording using a recording pattern including multiple types of codes, similarly to the case shown in FIG. 12. FIG. 13(a) is a flowchart showing a determination procedure of a recording pulse condition, and regarding each of the steps shown in FIG. 13(a), FIG. 13(b) shows parts to be adjusted of a recording pattern comprised of a multipulse. In addition, a numerical value in FIG. 13(b) represents a mark length or a space length corresponding to each code as a unit time length, and the representation of "8-11" means any code between 8T and 11T.

As shown in FIG. 13(a), when determining a recording pulse condition by this method, a power condition of a recording pattern comprised of multiple types of codes is determined first (step S100). The power condition is configured by adjusting the power of the entire recording pattern as shown in the step S1100 of FIG. 13(b). As an indicator of the power adjustment, a condition under which a shift amount of an amplitude value I2 of the shortest code 2T becomes zero or a condition under which an error rate is minimized may be obtained. Further, a power condition under which a recording characteristic is most stabilized within a power margin determined using an error rate as an indicator may be configured.

It is preferable that the recording pattern is prepared in a drive, and as top pulse, intermediate pulse, and last pulse conditions used in the recording pattern, standard values stored in the drive may be used, or the conditions may be obtained from a test recording.

Subsequently, conducting a test recording under the power condition determined in the step S100 allows a recording condition of the last pulse to be determined (step S200). The last pulse condition is configured by adjusting the width of the last pulse while fixing the top pulse and intermediate pulse conditions to a predetermined condition as shown in the step S200 of FIG. 13(b).

In this example, since a code having a length of 3T or longer uses the last pulse, the back ends of pulses respectively corresponding to a 3T mark and an 8-11T mark are adjusted as shown in FIG. 13(b). As an indicator of the last pulse adjustment, a condition under which an asymmetry 2T3T that indicates an asymmetry property between an amplitude value I2 of the shortest code 2T and that I3 of the second-shortest code 3T becomes zero or a condition under which an error rate is minimized may be obtained.

Subsequently, conducting a test recording using the power condition obtained in the step S100 and the last pulse obtained in the step S200 allows a recording condition of the intermediate pulse to be determined (step S300). The intermediate pulse condition is configured by adjusting the width of divided pulses comprising the intermediate pulse as shown in the step S300 of FIG. 13(b).

In this example, since a code having a length of 4T or longer uses the intermediate pulse, the widths of divided pulses corresponding to 8-11T marks are adjusted as shown in FIG. 13(b). As an indicator of the intermediate pulse adjustment, a condition under which an asymmetry 2T11T that indicates an asymmetry property between an amplitude value I2 of the shortest code 2T and an that I11 of the longest code 11T becomes zero or a condition under which an error rate is minimized may be obtained.

Since a condition for each of the recording pulses included in a recording pattern is determined by conducting the above-described steps S100 to S300, further conducting a test recording using the determined recording pulse allows a phase shift of the recording pulse to be appropriately corrected (step S400). The phase shift is corrected by adjusting the start and end positions of a recording pulse to be corrected as shown in the step S400 of FIG. 13(b).

The recording pulse to be corrected is specified by a test recording using multiple types of recording patterns, and in the pattern shown in FIG. 13(b) for instance, an 8-11T code is to be corrected. In addition, as an indicator of the phase shift correction, an asymmetry value or an error rate may be used.

Figure 14:
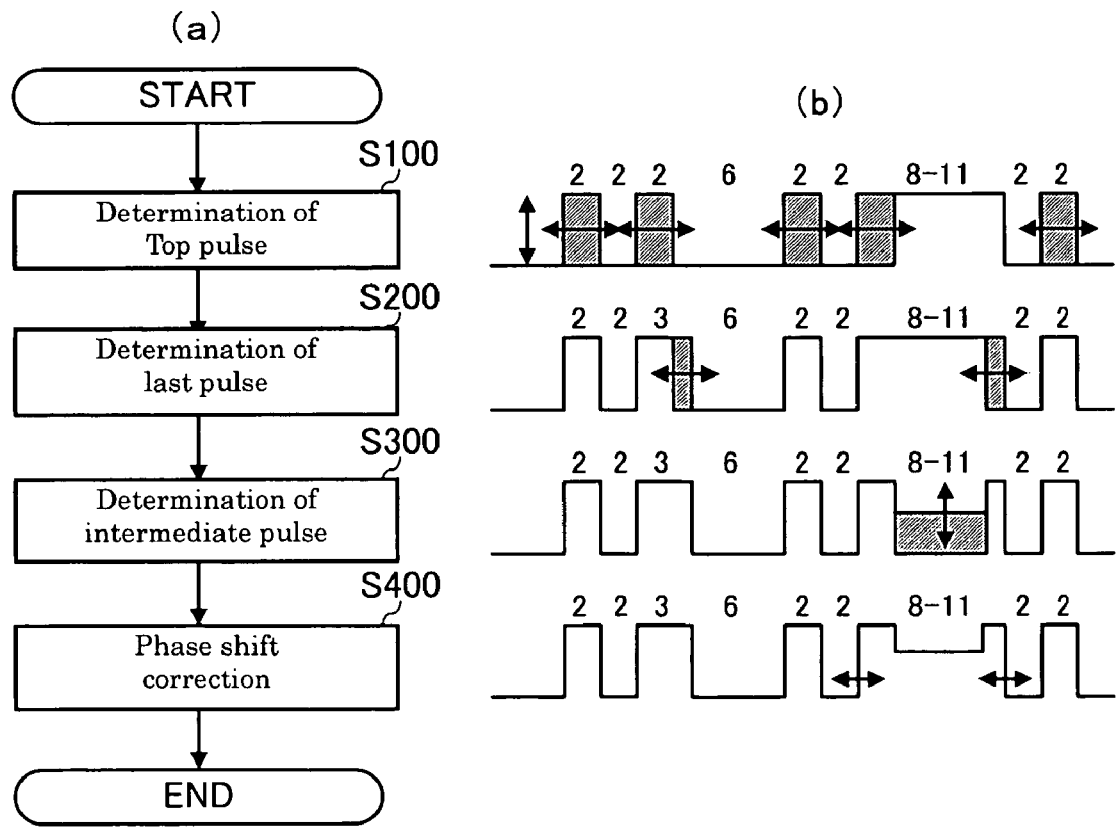
FIG. 14 is a schematic diagram showing a fifth method for determining a recording pulse condition.

FIG. 14 is a schematic diagram showing a fifth method for determining a recording pulse condition. The method shown in the figure is an example of determining a recording condition based on a result obtained by conducting a test recording using a recording pattern including multiple types of codes, similarly to the case shown in FIG. 12. FIG. 14(a) is a flowchart showing a determination procedure of a recording pulse condition, and regarding each of the steps shown in FIG. 14(a), FIG. 14(b) shows parts to be adjusted of a recording pattern comprised of a single pulse. In addition, a numerical value in FIG. 14(b) represents a mark length or a space length corresponding to each code as a unit time length, and the representation of "8-11" means any code between 8T and 11T.

As shown in FIG. 14(a), when determining a recording pulse condition by this method, a top pulse condition of a recording pattern comprised of multiple types of codes is determined first (step S100). The top pulse condition is configured by adjusting the power and the width of the top pulse of each code comprising the recording pattern as shown in the step S100 of FIG. 14(b). As an indicator of the top pulse adjustment, a condition under which a shift amount of an amplitude value I2 of the shortest code 2T becomes zero or a condition under which an error rate is minimized may be obtained. Other steps of the procedure are same as in the case shown in FIG. 12.

The effect of each of the above-described methods on an HD-DVD system has been inspected. As a result, it has been confirmed that as only a last pulse is varied stepwise, the value of an asymmetry 2T3T changes substantially linearly with relation to the width of the last pulse. At this time, a PRSNR value and an SbER value that indicate recording characteristics have been measured, and as a result, it has been confirmed that both values exhibit a preferable recording margin for an asymmetry 2T3T.

Subsequently, the change of an asymmetry 2T11T has been observed while varying only an intermediate pulse stepwise, and it has been confirmed that the asymmetry 2T11T changes substantially linearly with relation to the width of the intermediate pulse. At this time, a PRSNR value and a SbER value that indicate recording characteristics have been measured, and as a result, it has been confirmed that both values exhibit a preferable recording margin for an asymmetry 2T11T.

Further, after determining the last pulse with which an asymmetry value 2T3T becomes zero, the intermediate pulse with which an asymmetry value 2T11T becomes zero has been determined. As a result, it has been confirmed that the asymmetry value 2T3T obtained by adjusting the last pulse is maintained while an asymmetry value 3T11T also becomes zero.

Figure 15:
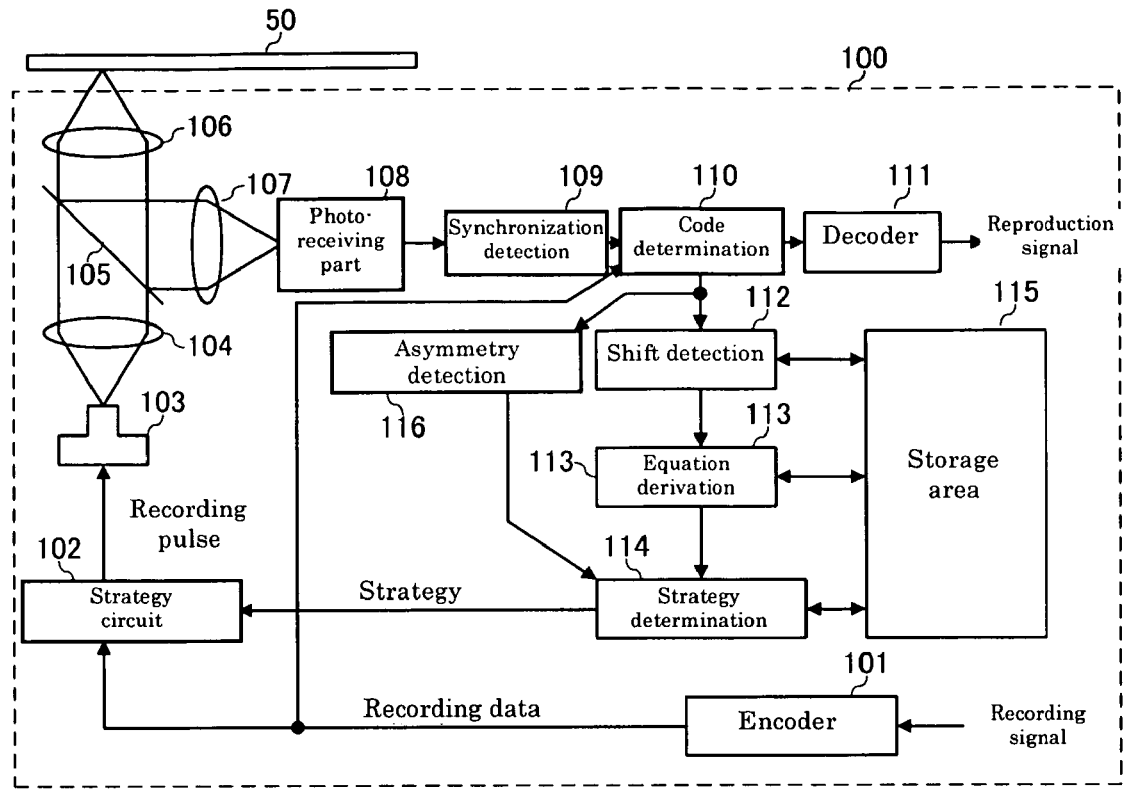
FIG. 15 is a block diagram showing an internal configuration of a drive according to an embodiment of the present invention.

FIG. 15 is a block diagram showing an internal configuration of a drive according to an embodiment of the present invention. As shown in FIG. 15, a drive 100 records/reproduces information to/from a medium 50 using a laser beam emitted from a laser oscillator 103.

When information is recorded onto the medium 50, a recording signal corresponding to the information desired to be recorded is encoded by an encoder 101 using an EFM method, and the encoded recording data are transmitted to a strategy circuit 102.

In the strategy circuit 102, various setting parameters are configured for a certain strategy. The circuit controls the intensity and pulse width of a laser beam emitted from the laser oscillator 103 by correcting the parameters, and generates a recording pulse with which a desired recording state may be obtained.

The recording pulse generated in the strategy circuit 102 is transmitted to the laser oscillator 103, where an output laser beam is controlled according to the recording pulse, and the controlled laser beam is irradiated via a lens 104, a half mirror 105, and a lens 106 to the medium 50 that is rotating at a constant linear velocity or at a constant rotational speed. Consequently, a recording pattern comprised of a mark/space stream corresponding to the desired recording data is recorded onto a recording layer of the medium 50.

In contrast, when reproducing the information recorded on the medium 50, a homogeneous reproduction laser beam emitted from the laser oscillator 103 is irradiated via the lens 104, the half mirror 105, and the lens 106 to the medium 50 that is rotating at a constant linear velocity or at a constant rotational speed.

The reproduction laser beam has lower intensity than the recording laser beam emitted from the oscillator 103 upon recording, and a reflected beam of the reproduction laser beam from the medium 50 is received at the photo-receiving part 108 via the lens 106, the half mirror 105, and a lens 107, and transformed into an electrical signal.

The electrical signal output from the photo-receiving part 108 corresponds to the recording pattern comprised of the marks and spaces recorded on the medium 50. A synchronizing signal detection circuit 109 generates a clock signal with a certain cycle based on a wobble component included in the electrical signal output from the photo-receiving part 108. Subsequently, the electrical signal is encoded by a code determination circuit 110 comprising the circuit block shown in FIG. 1, then decoded by a decoder 111, and output as a reproduction signal. In addition, as shown in the above-described FIG. 1, the code determination circuit 110 detects an amplitude level, and the detected amplitude level is output to a recording shift detection part 112 and an asymmetry detection circuit 116. A configuration for determining a recording condition will be described later.

As described, since recording quality of a recording system comprised of a drive and a medium is affected by the variation between optical information recording devices and by the variation between optical information recording media, absorbing such effect with the strategy enables the recording quality to be improved. In addition, various media including dye type media represented by CD-R or DVD-R, and phase-change media represented by CD-RW or DVD-RW may be applied to the medium.

The determination flow for a recording pulse condition as shown in FIG. 10(a), which is conducted by the above-described drive, is hereinafter described in detail.

Determination of Reference Condition

Figure 16:
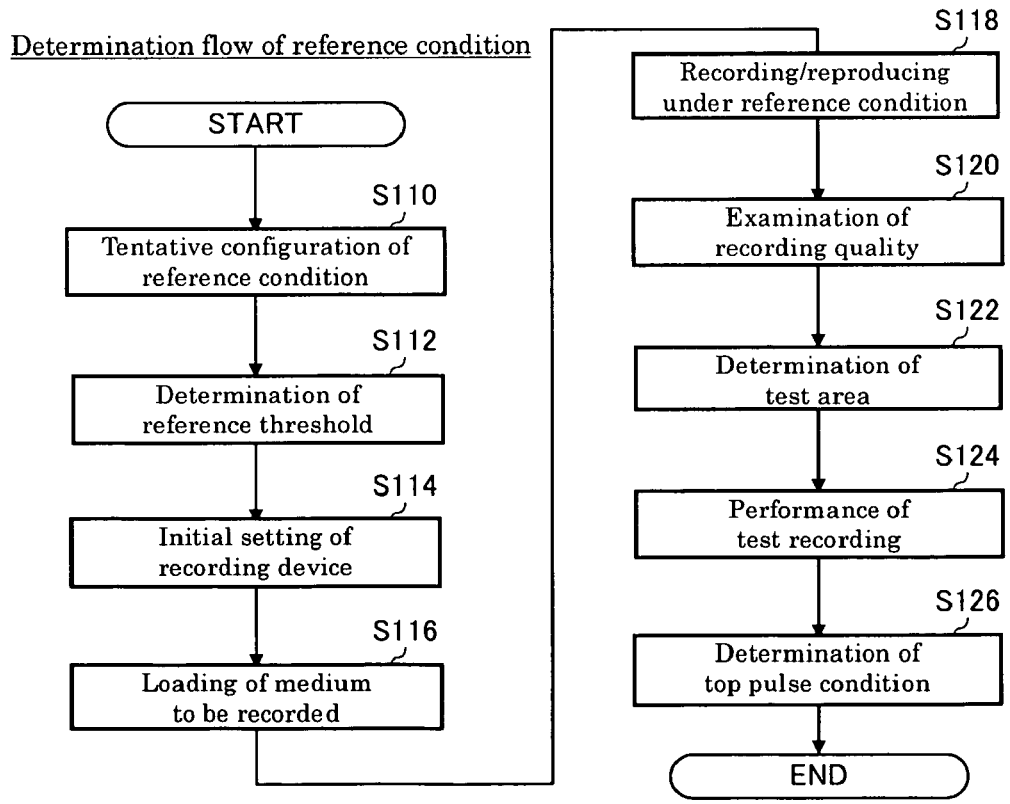
FIG. 16 is a flowchart showing a detailed execution procedure of the determination step of a reference condition shown in FIG. 10(a).

FIG. 16 is a flowchart showing a detailed execution procedure of the determination step of a reference condition shown in FIG. 10(a). As shown in the figure, the drive 100 conducts steps S110 to S114 to configure an initial setting, steps S116 to S122 to determine a condition for a test recording, a step S124 to conduct the test recording under the determined condition, and a step S126 to determine a top pulse condition based on the result of the test recording. The details of each step are described below.

Tentative Determination of Reference Condition

In the step S110 in FIG. 16, a test recording onto any typical medium is conducted while varying a recording speed, whereby one pulse width and three power values are obtained as a reference condition. As the three power values, based on the result of the test recording, a power value with which an error rate of a pattern including a 2T is minimized and two other power values before and after the power value are preferably used. As the two other power values, it is preferable to use values around a threshold that provides a criterion for determining whether or not the error rate is acceptable. The reference condition obtained in this step is later used for the verification of recording quality.

Determination of Criterial Threshold

As described later in detail, in order to set a region that satisfies a predetermined recording margin (hereinafter referred to as a "test area") as a range of a test recording condition, a criterial threshold should be determined. As the threshold value, a standard value for each drive or medium type may be prepared, but the threshold that indicates a minimum limit of an acceptable error rate is varied depending on optical components comprising the pickup shown in FIG. 16 or on the other elements as well as on a recording speed for a medium.

Consequently, it is recommended to set up a more accurate test area to provide a more accurate criterion by obtaining such threshold for each combination of a drive and a medium that are actually used.

However, since setting the threshold for each combination of a drive and a medium causes the number of recording steps to be increased, the threshold suitable for each drive may be stored in a storage area 115 during manufacturing of drives, assuming that the variation in a drive is a main cause of the variation of the threshold.

FIG. 17 is a flowchart showing the details of a determination step of a reference threshold shown in FIG. 16. As shown in FIG. 17, the reference threshold is determined in such a way that recording/reproducing under a predetermined recording condition is conducted, then a preliminary threshold based on the recording/reproducing result is determined, and the value ensuring a certain margin to the preliminary threshold is set as a threshold to be used for determining a test area. Hereinafter, each step is sequentially described.

First, a recording condition is configured by conducting a step S150. In this step, certain patterns of conditions necessary for recording/reproducing including a pulse width, power, recording/reproduction speed, and recording address are prepared. After those recording conditions are configured in a drive, a reference medium is loaded into the drive. As the reference medium, it is preferable to select one that has typical characteristics from various media.

Next, conducting a recording/reproducing step S152 to the reference medium loaded under the recording conditions configured by the above-described step S150 allows recording/reproduction characteristic values for each of the recording condition, such as an error rate, jitter, amplitude, and C/N value to be obtained. In this step, a value that indicates recording quality is selected as the characteristic value to be obtained. An example using a jitter as an indicator of the recording quality is hereinafter described.

Subsequently, a system reference value is determined by conducting a step S154, wherein an optimum value, such as a minimum jitter value, is obtained from the recording/reproducing characteristic values obtained in the above-described step S152. Consequently, a jitter value considered to be closer to the optimum value for the drive is set as a reference value. In addition, instead of the optimum jitter value, a mean of two values at which a predetermined threshold intersects with an approximated curve for jitter values, that is, a mean value of a power margin may be used as the reference value.

Finally, a step S156 is conducted, wherein a threshold is calculated by multiplying the system reference value obtained in the above-described step S154 by a predetermined coefficient $\alpha$ (preferably $\alpha>1$). This enables a determination under the condition where the system reference value has the predetermined margin. Specifically, the calculation of the threshold is conducted by multiplying the system reference value by $\alpha$, where the coefficient $\alpha$ preferably be a value around 1.5. In addition, the coefficient $\alpha$ may be a suitable value corresponding to a type of a drive or a medium, for instance, a value approximate to the system reference value such as $\alpha=0.8$ to 1.2 or a larger value such as $\alpha=2.0$ to 3.0 is applicable.

FIG. 18 is a schematic diagram showing an example of the flow shown in FIG. 17. The example shown in FIG. 18 illustrates a case where reproduction characteristics 202-1 to 202-4 are obtained by applying a power P1 to P6 to respective pulse widths W1 to W4 while using a jitter value as a characteristic value that indicates recording quality. In the example, the pulse width W1 to W4 and the power P1 to P6 are set as the recording conditions, and an extremal value of the recording characteristic 102-3 that exhibits a minimum jitter value is set as the system reference value. The threshold may be obtained by multiplying the system reference value by, for instance, 1.5. In addition, arrows in a matrix table of the figure indicate the direction of changing a test condition and are hereinafter used as the same meaning.

FIG. 19 is a schematic diagram showing an example of the flow shown in FIG. 17. The example shown in FIG. 19 illustrates a case where reproduction characteristics 202-1 to 202-4 are obtained by applying a power P1 to P6 to respective pulse widths W1 to W4 while using a jitter value as a characteristic value that indicates recording quality. In the example, an extremal value of the reproduction characteristic 202-2 that exhibits a minimum jitter value is the system reference value. The threshold may be obtained by multiplying the system reference value by, for instance, 1.5. As described, the threshold may be determined by changing a power condition for each pulse width.

FIG. 20 is a schematic diagram showing an example of a case wherein a threshold is calculated for each drive. If setting a threshold correspondingly to the variation of a drive is desired, as shown in the diagram, a common reference medium 50 is used for recording/reproduction in each of the drives 100-1 to 100-5, and thresholds 1 to 5 unique to the respective drives are stored.

In addition, when a simplified procedure for setting a threshold is desired, an average of thresholds 1 to 5, which are obtained by recording/reproducing onto/from a common reference medium with several typical drives, is calculated, and the average threshold may be used as a threshold for other drives.

The drives used for obtaining the average threshold described above may have an identical or similar design. Further, the average threshold can be used for those drives as a threshold. In addition, the obtained average threshold can be used as a general threshold for drives having an identical or similar design to be manufactured. Also, multiple drives having variations each other are meaningfully prepared, and then an average of thresholds obtained for the drives may be used as the average threshold.

Initial Setting of Recording Device

In a storing step S114, the reference condition and reference threshold obtained in the steps S110 and S112 of FIG. 16 respectively are stored in a recording area 115 of the drive 100. This step S114 is preferably conducted during manufacturing of the derive 100.

Load of Medium for Recording

Subsequently, a step S116 is conducted to load a medium 50, onto which information is to be recorded, into the drive 100 wherein the initial setting is completed in the step S114.

Recording/Reproduction Using Reference Condition

Next, a step S118 is conducted to record information onto the medium 50 loaded at the step S116 under the condition set in the step S114. Specifically, three jitter values are obtained by recording/reproducing the information with one pulse width and three different power values defined as the reference condition. By plotting those three jitter values against a power axis, the tendency of recording characteristics corresponding to the combination of the drive 100 and the medium 50 becomes apparent.

Examination of Recording Quality

FIG. 21 is a schematic diagram showing an example wherein a concave pattern is obtained as a result of examining recording quality in the step S120 of FIG. 16. As shown in FIG. 21, the examination of the recording quality is conducted using jitter values and thresholds for each of the reference conditions obtained in the above-described steps. The figure exemplifies a case wherein power values P1, P2, and P3 are used respectively as the reference conditions, and a virtual line connecting the jitter values obtained at each power value forms a concave pattern. Such a concave pattern means that the reference medium used in the step S110 and the medium for recording loaded at the step S116 have the same sensitivity and similar recording qualities.

FIG. 21(a) shows an example wherein a minimum value of the concave pattern is equal to or less than a threshold, and FIG. 21(b) an example wherein a minimum value of the concave pattern is more than a threshold. In either pattern, the reference medium and the medium for recording are considered to have the same sensitivity. In such a case where the reference medium and the medium for recording have the same sensitivity, a condition used for a test recording is defined as a plane region of (power)×(pulse width) centering on the reference condition as described below.

In comparison between FIGS. 21(a) and (b), the difference between the reproduction value and the reproduction reference value obtained at each of the recording points P1, P2, or P3, i.e., the difference between the jitter value and the jitter threshold is varied, and the obtained reproduction value in FIG. 21(a) is closer to the reproduction reference value than that in FIG. 21(b).

This suggests that the detection of an optimum condition is easier in the case of FIG. 21(a) than in the case of FIG. 21(b). Accordingly, when the recording characteristic shown in FIG. 21(a) is obtained, compared to the case of FIG. 21(b), a smaller number of testings can be set, which allows more suitable solution to be found.

That is, an optimum condition is closer to the reference value when the difference between the reproduction value and the reproduction reference value is smaller, whereas an optimum condition is further from the reference value when the difference between the reproduction value and the reproduction reference value is larger. Thus, when a smaller number of testings is desired, it is preferable to change the number of testings depending on the difference between the reproduction value and the reproduction reference value.

FIG. 22 is a schematic diagram showing an example wherein a downward-sloping pattern is obtained as a result of examining recording quality in the step S120 of FIG. 16. In the example shown in FIG. 22, a downward-sloping pattern wherein a jitter value decreases as a power increases from P1 to P3 is obtained. Such a downward-sloping pattern means that the medium for recording has lower sensitivity than the reference medium.

FIG. 22(a) shows an example wherein a minimum value of the downward-sloping pattern is equal to or less than a threshold, and FIG. 22(b) an example wherein a minimum value of the downward-sloping pattern is more than a threshold. In either pattern, the medium for recording is considered to have lower sensitivity than the reference medium. In such a case where the medium for recording has lower sensitivity than the reference medium, a test recording is conducted under the condition of shifting the test area, which is defined as a plane region of (power)×(pulse width) centering on a reference condition, in the direction of a region with a higher power and a wider pulse width as described below.

Also, when the downward-sloping pattern in FIG. 22 is obtained, recording at a power higher than P3 enables the recording characteristic to be reconfirmed since a minimum jitter value is considered to be present on the higher-power side. In such a case, although the number of testings is increased by 1, accuracy in examining the recording quality can be improved. In addition, in the case that a downward-sloping pattern is obtained, just as in the case of the concave pattern, the number of testings may be changed depending on the difference between the reproduction value and the reproduction reference value.

Further, when the downward-sloping pattern in FIG. 22 is obtained, an optimum solution is considered to be further from the reference condition than in the case of the concave pattern in FIG. 21. Consequently, it is preferable to set a larger number of testings in the case of FIG. 22 compared to the concave pattern.

Figure 23:
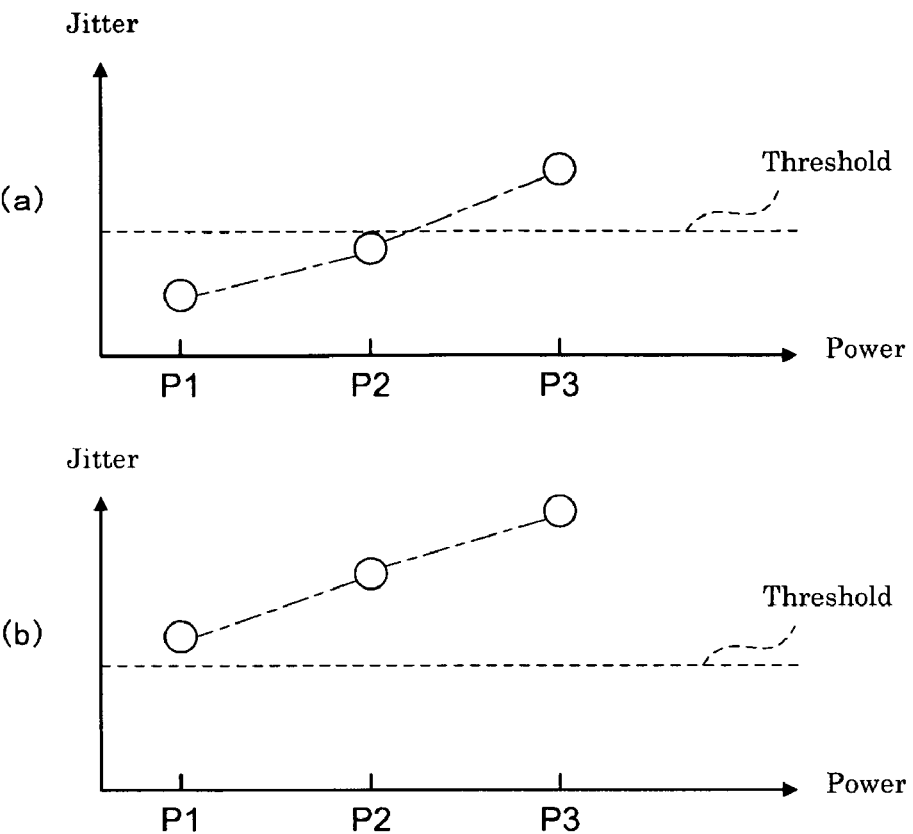
FIG. 23 is a schematic diagram showing an example wherein an upward-sloping pattern is obtained as a result of examining recording quality in the step S120 in FIG. 16.

FIG. 23 is a schematic diagram showing an example wherein an upward-sloping pattern is obtained as a result of examining recording quality in the step S120 of FIG. 16. In the example in FIG. 23, an upward-sloping pattern wherein a jitter value increases as a power increases from P1 to P3 is obtained. Such an upward-sloping pattern means that the medium for recording has higher sensitivity than the reference medium.

FIG. 23(a) shows an example wherein a minimum value of the upward-sloping pattern is equal to or less than a threshold, and FIG. 23(b) an example wherein a minimum value of the upward-sloping pattern is more than a threshold. In either pattern, the medium for recording is considered to have higher sensitivity than the reference medium. In such a case where the medium for recording has higher sensitivity than the reference medium, a test recording is conducted under the condition of shifting the test area, which is defined as a plane region of (power)×(pulse width) centering on a reference condition, in the direction of a region with a lower power and a narrower pulse width as described below.

Also, when an upward-sloping pattern as shown in FIG. 23 is obtained, since a minimum jitter value is considered to be present on the lower-power side, the recording characteristic can be reconfirmed by recording at a power lower than P1. In such a case, although the number of testings is increased by 1, accuracy in examining the recording quality can be improved. In addition, in the case that a downward-sloping pattern is obtained, just as in the case of the concave pattern, the number of testings may be changed depending on the difference between the reproduction value and the reproduction reference value.

Further, when an upward-sloping pattern as shown in FIG. 23 is obtained, an optimum solution is considered to be further from the reference condition than in the case of the concave pattern shown in FIG. 21. Consequently, it is preferable to set a larger number of testings in the case of FIG. 23 compared to the concave pattern.

Determination of Test Area

Figure 24:
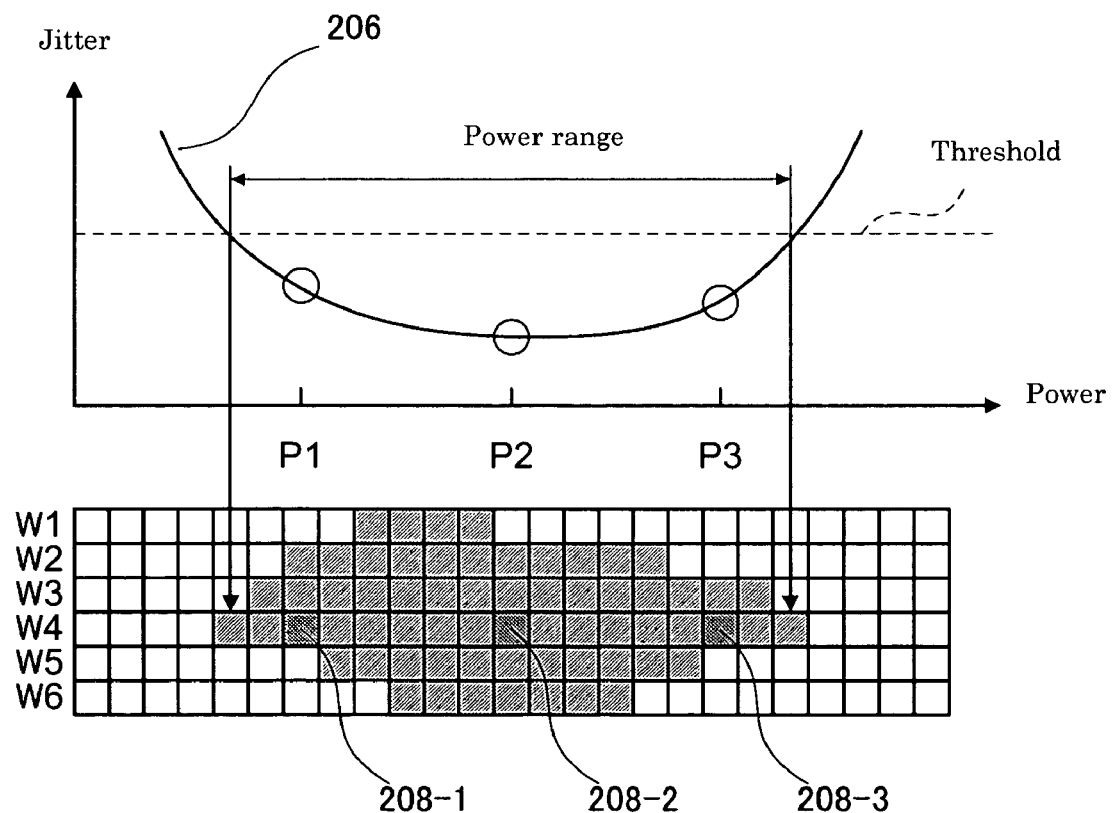
FIG. 24 is a schematic diagram showing an example of determining a test area as conducted in the step S122 in the case that a concave pattern is obtained in the step S120 in FIG. 16.

FIG. 24 is a schematic diagram showing an example of determining a test area as conducted in the step S122 in the case wherein a concave pattern is obtained in the step S120 of FIG. 16. As shown in FIG. 24, when a concave pattern is obtained, a power range between two intersections of an approximated curve 206, which represents jitter values obtained at P1 to P3 respectively, with a threshold is defined as a range of changing power used for a test recording. Note that, in the present invention, a range of power used for an actual test recording is defined as a "power range," and a range of power with which a jitter value becomes equal to or less than a threshold is defined as a "power margin."

Since the approximated curve 206 varies for each pulse width, recording is conducted for each pulse width at power values of P1 to P3, and intersections of the resulting approximated curve 206 for jitter values with the threshold are obtained. For instance, if the pulse width used as the reference condition is W4, recording is conducted for each of the pulse widths W1 to W6 centering on W4 to find the intersections. As shown in a matrix image of the figure, the power range that is equal to or less than the threshold is obtained for each of the pulse widths, resulting in the test area indicated by a hatched area of the image. In the image, 208-1, 208-2, and 208-3 show the cases wherein recordings are conducted respectively at three power values of P1 to P3, which are used as the reference conditions, for the pulse width W4. The determined test area is defined as a plane region of (power)×(pulse width) centering on the reference condition.

As described, since the area where a jitter value is equal to or less than the threshold is intensively tested to enable the power range for each of the pulse widths to be found, more suitable condition can be found with a smaller number of testings.

Also, the number of testings can be reduced by setting larger steps for power variation when a wider power margin is obtained, or by setting smaller steps for power variation when a narrower power margin is obtained. For instance, when a margin of 10 mW is obtained, testings with 2 mW step may be run five times, assuming that an optimum value can be obtained even by rough testings, and when a margin of 1 mW is obtained, testings with 1 mW step may be run ten times, considering that more precise testings are required.

Figure 25:
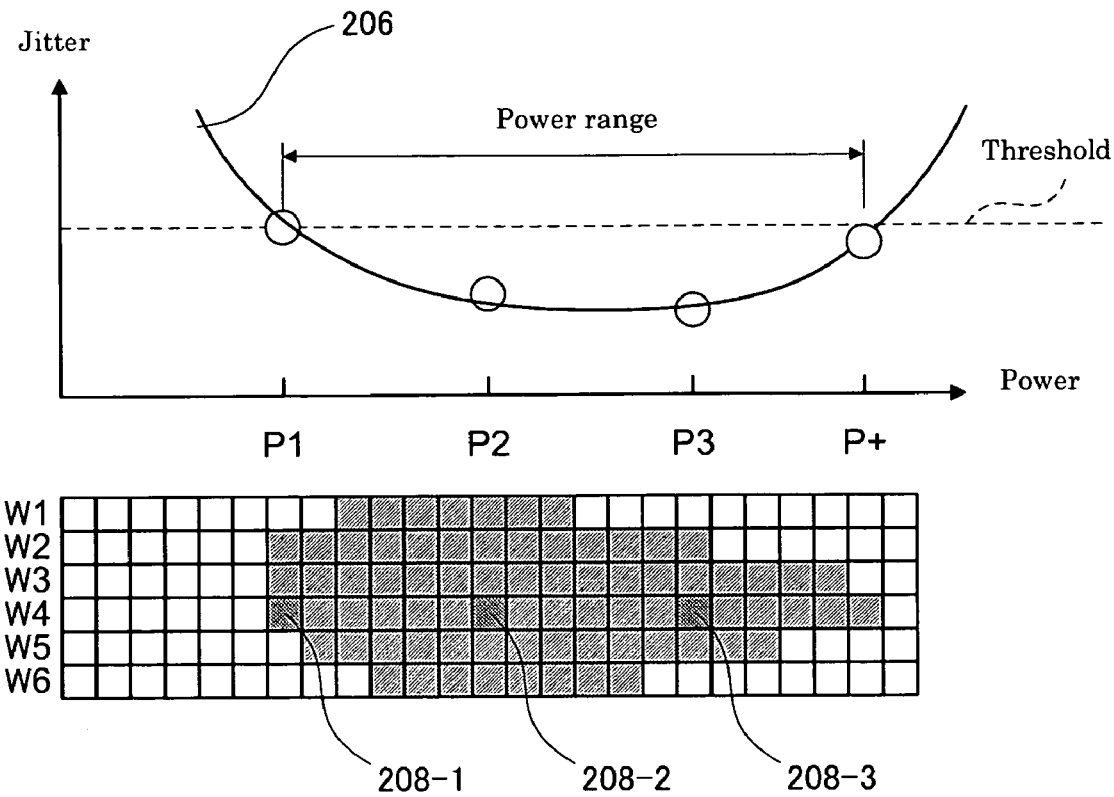
FIG. 25 is a schematic diagram showing an example of determining a test area as conducted in the step S122 in the case that a downward-sloping pattern is obtained in the step S120 in FIG. 16.

FIG. 25 is a schematic diagram showing an example of determining a test area as conducted in the step S1122 in the case wherein a downward-sloping pattern is obtained in the step S120 of FIG. 16. As shown in FIG. 25, when a downward-sloping pattern is obtained, an optimum condition is considered to be present on a higher-power side. Accordingly, an additional recording is conducted with a power value of P+ (>P3), and a range between two intersections of an approximated curve 206, which represents jitter values obtained at P1 to P3 and P+ respectively, with a threshold is defined as a power range. Conducting this procedure for each pulse width W1 to W6 allows the test area shown in a matrix image of the figure to be obtained.

The test area determined by the above-described procedure is just as a plane region of (power)×(pulse width) centering on a reference condition 208-1, 208-2, and 208-3 shifted to the higher-power side. The pulse widths W1 to W6 used in the case of the concave pattern are also used in this example, but since the medium for recording tends to have lower sensitivity in the downward-sloping pattern, a power range may be shifted to a region with a wider pulse width.

Figure 26:
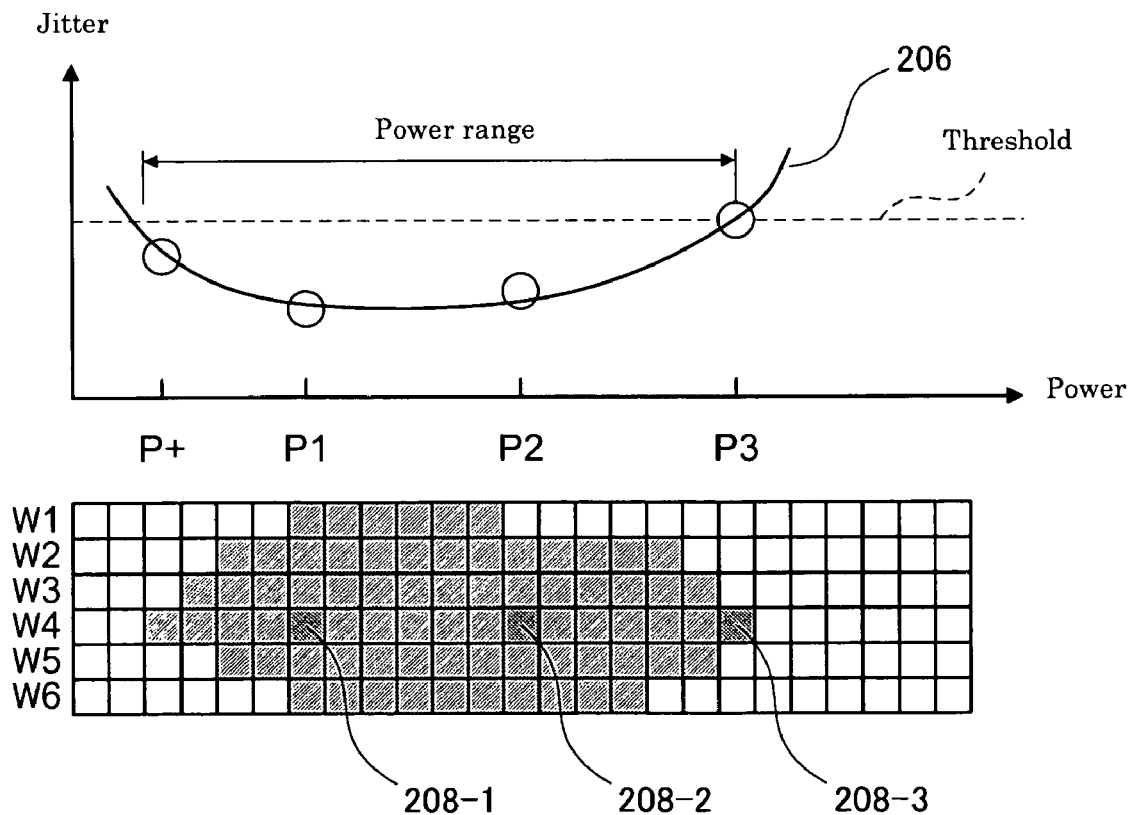
FIG. 26 is a schematic diagram showing an example of determining a test area as conducted in the step S122 in the case that an upward-sloping pattern is obtained at the step S120 in FIG. 16.

FIG. 26 is a schematic diagram showing an example of determining a test area as conducted in the step S122 in the case wherein an upward-sloping pattern is obtained in the step S120 of FIG. 16. As shown in FIG. 26, when an upward-sloping pattern is obtained, an optimum condition is considered to be present on a lower-power side. Accordingly, an additional recording is conducted with a power value of P+ (<P1), and a range between two intersections of an approximated curve 206, which represents jitter values obtained at P+ and P1 to P3 respectively, with a threshold is defined as a power range. Conducting this procedure for each pulse width W1 to W6 allows the test area shown in a matrix image of the figure to be obtained.

The test area determined by the above-described procedure is just as a plane region of (power)×(pulse width) centering on a reference condition 208-1, 208-2, and 208-3 shifted to the lower-power side. The pulse widths W1 to W6 used in the case of the concave pattern are also used in this example, but since the medium for recording tends to have higher sensitivity in the upward-sloping pattern, a power range may be shifted to a region with a narrower pulse width.

Since the above-described method involves examining recording quality for each pulse width and determining the number of testings for each pulse width based on the examination result, reduction in the number of testings can be expected. The examination of recording quality described hereinabove is an example wherein the jitter variation during recording under the reference condition is patterned, and more preferably, it is recommended that the following eight patterns be used.

FIG. 27 is a diagram showing an example wherein the step S120 in FIG. 16 is conducted with eight patterns. As shown in FIG. 27, a pattern 1 is applied to any patterns including the concave, upward-sloping, and downward-sloping patterns when a maximum jitter value is equal to or less than a threshold. When this pattern is obtained, the medium for recording is considered to have comparable sensitivity to the reference medium as well as a wider margin in which jitter values are equal to or less than the threshold can be obtained, and therefore a power condition is extended to both lower- and higher-power sides. In other words, an additional recording is conducted on both lower- and higher-power sides in the pattern 1 because values approximate to the threshold are not obtained.

Subsequently, a curve approximation is conducted to the jitter characteristics obtained as a result of the above-described additional recording, and the interval between the large and small values at which the approximated curve intersects with the jitter threshold is set as a reference power range.

Further, when the pattern 1 is obtained, a pulse width area with a reference value±0.2T is defined as a test area, and upon a test recording, an optimum recording condition is detected while varying the pulse width within the test area by 0.2T at one time. In addition, T represents a unit time of a recording mark.

Assuming that a pulse width to be a reference value is a pulse condition 1 and the two extended points are pulse conditions 2 and 3 respectively, the pulse conditions 2 and 3 of the pattern 1 are the pulse widths obtained by extending the pulse condition 1 by ±0.2T. Along with this variation in the pulse width condition, the power range used as a test condition should be slightly modified.

That is, when the pulse width is varied by 0.1T, the power range for the pulse width is set as (the reference power range)×(1−0.05×1) mW, and when the pulse width is varied by 0.2T, the power range for the pulse width is set as (the reference power range)×(1−0.05×2) mW. Further, when the pulse width is varied by −0.1T, the power range for the pulse width is set as (the reference power range)×(1−0.05×(−1)) mW.

Accordingly, test conditions in the case of the pattern 1 are comprised of the following three sets.

(1) A reference pulse width and a reference power range
(2) A reference pulse width −0.2T and (a reference power range)×(1−0.05×(−2)) mW
(3) A reference pulse width +0.2T and (a reference power range)×(1−0.05×(+2)) mW In the present invention, the reference condition provided in the above (1) is not necessarily used for an actual test recording.

A pattern 2 is the case in which a concave pattern is obtained, and is applied when a minimum jitter value is equal to or less than a threshold. When this pattern is obtained, the medium for recording is considered to have the same sensitivity as the reference medium, and therefore (a reference value±0.1T) is selected as a pulse width condition. Subsequently, a power range is defined for each pulse condition by the same procedure as in the case of the pattern 1. Consequently, test conditions in the case of the pattern 2 are comprised of the following three sets.
- (1) A reference pulse width and a reference power range
- (2) A reference pulse width −0.1T and (a reference power range)×(1−0.05×(−1)) mW
- (3) A reference pulse width +0.1T and (a reference power range)×(1−0.05×(+1)) mW A pattern 3 is the case in which a concave pattern is obtained, and is applied when a minimum jitter value is more than a threshold. When this pattern is obtained, the medium for recording is considered to have the same sensitivity as the reference medium and large difference each other, and therefore (a reference value±0.2T) is selected as a pulse width condition, followed by defining a power range for each pulse condition by the same procedure as in the case of the pattern 1. Consequently, test conditions in the case of the pattern 3 are comprised of the following three sets.
- (1) A reference pulse width and a reference power range
- (2) A reference pulse width −0.2T and (a reference power range)×(1−0.05×(−2)) mW
- (3) A reference pulse width +0.2T and (a reference power range)×(1−0.05×(+2)) mW A pattern 4 is the case in which a downward-sloping pattern is obtained, and is applied when a minimum jitter value is equal to or less than a threshold. When this pattern is obtained, the medium for recording is considered to have slightly lower sensitivity than the reference medium, and therefore three pulse width conditions: a reference value, +0.1T, and +0.2T, are selected. Subsequently, a power range for each pulse condition is defined by the same procedure as in the case of the pattern 1. Consequently, test conditions in the case of the pattern 4 are comprised of the following three sets.
- (1) A reference pulse width and a reference power range
- (2) A reference pulse width +0.1T and (a reference power range)×(1−0.05×(+1)) mW
- (3) A reference pulse width +0.2T and (a reference power range)×(1−0.05×(+2)) mW A pattern 5 is the case in which a downward-sloping pattern is obtained, and is applied when a minimum jitter value is more than a threshold. When this pattern is obtained, the medium for recording is considered to have significantly lower sensitivity than the reference medium, and therefore three pulse width conditions: a reference value, +0.2T, and +0.4T, are selected. Subsequently, a power range for each pulse condition is defined by the same procedure as in the case of the pattern 1. Consequently, test conditions in the case of pattern 5 are comprised of the following three sets.
- (1) A reference pulse width and a reference power range
- (2) A reference pulse width +0.2T and (a reference power range)×(1−0.05×(+2)) mW
- (3) A reference pulse width +0.4T and (a reference power range)×(1−0.05×(+4)) mW A pattern 6 is the case in which an upward-sloping pattern is obtained, and is applied when a minimum jitter value is equal to or less than a threshold. When this pattern is obtained, the medium for recording is considered to have slightly higher sensitivity than the reference medium, and therefore three pulse width conditions: a reference value, −0.1T, and −0.2T, are selected. Subsequently, a power range for each pulse condition is defined by the same procedure as in the case of the pattern 1. Consequently, test conditions in the case of the pattern 6 are comprised of the following three sets.
- (1) A reference pulse width and a reference power range
- (2) A reference pulse width −0.1T and (a reference power range)×(1−0.05×(−1)) mW
- (3) A reference pulse width −0.2T and (a reference power range)×(1−0.05×(−2)) mW A pattern 7 is the case in which an upward-sloping pattern is obtained, and is applied when a minimum jitter value is more than a threshold. When this pattern is obtained, the medium for recording is considered to have significantly higher sensitivity than the reference medium, and therefore three pulse width conditions: a reference value, −0.2T, and −0.4T, are selected. Subsequently, a power range for each pulse condition is defined by the same procedure as in the case of the pattern 1. Consequently, test conditions in the case of the pattern 7 are comprised of the following three sets.
- (1) A reference pulse width and a reference power range
- (2) A reference pulse width −0.2T and (a reference power range)×(1−0.05×(−2)) mW
- (3) A reference pulse width −0.4T and (a reference power range)×(1−0.05×(−4)) mW A pattern 8 is the case in which a convex pattern is obtained, and is applied when a minimum jitter is more than a threshold. When this pattern is obtained, it is considered as an error pattern and (a reference value±0.2T) is selected as a pulse width condition. Subsequently, a power range for each pulse condition is defined by the same procedure as in the case of the pattern 1. Consequently, test conditions in the case of the pattern 8 are comprised of the following three sets.
- (1) A reference pulse width and a reference power range
- (2) A reference pulse width −0.2T and (a reference power range)×(1−0.05×(−2)) mW
- (3) A reference pulse width +0.2T and (a reference power range)×(1−0.05×(+2)) mW In addition, when any pattern other than the pattern 2 wherein the medium for recording is closest to the reference medium is detected among the above-described 8 patterns, a jitter may be further detected by again reproducing the recording result, from which a pattern is obtained, in order to confirm that the pattern is not due to a reproduction error. When a characteristic other than the pattern 2 is again obtained by the additional reproduction, a new recording condition may be added or the existing recording condition may be extended according to the conditions shown in FIG. 27.

When the pattern 8 is obtained as a result of checking the reproduction error as described above, recording is conducted again with the reference pulse width before conducting an additional recording and a pulse width extension since a recording error may exist. When the pattern 8 is again obtained as a result of reproducing the recording, an extension of pulse condition, i.e., the extension of the pulse conditions 2 and 3 is conducted instead of conducting an additional recording, i.e., a power extension to measure the margin for the pulse condition 1. A power extension corresponding to the extension of the pulse conditions 2 and 3 can be conducted by the aforementioned procedure.

That is, when the pattern 8 is obtained, a reference power range for the extension cannot be determined since a margin cannot be ensured with the pulse condition 1. Accordingly, the initial power condition range is set as a reference power range.

Determination of Test Area: Determination of Power Range by Approximation Method Further to the above-described procedure that enables to determine the test area in which an optimum solution can be obtained by the smallest possible number of testings, a determination method of a power range, which is important for the determination of the test area, should be described below.

Since it is one object of the present invention to improve the accuracy of finding an optimum solution with the smallest possible number of testings, test conditions are concentrated in the area equal to or less than a threshold as described above. Based on the idea, a power range used for a test recording may be obtained from larger and smaller power values that indicate a margin for a threshold. The "margin for a threshold" means a range where a characteristic value equal to or less than the threshold can be obtained, and "larger and smaller power values" means two values on lower- and higher-power sides respectively that define a range of the margin.

Considering the time reduction in a test recording for each type of media and the efficient use of a test area in a medium such as a write-once medium having a limited test recording area, the smallest possible number of recording points is preferably required. However, since a power range obtained in this procedure is an important parameter to be a criterion of an optimum recording condition, the highest possible accuracy is much more required rather than the smallest possible number of testings.

Obtaining a more accurate power range means more intensive testings in a selected area, and accordingly contributes to the reduction in the number of testings. For instance, when conducting a test recording once for every 0.1 mW, the test recording is conducted 10 times for the power range of 1 mW and 20 times for the power range of 2 mW, and thus, narrowing the power range can contribute to the reduction in the number of testings.

In consideration of the recording quality of the recording/reproduction signal that shows a variation like a quadratic curve having an extremal value as an optimum point against the variation in recording power, the present invention proposes a method in which a desired margin amount is obtained by approximating a characteristic curve using several recording points. Such approximating method enables a power range to be precisely and easily obtained with several recording points and the number of testings to be reduced.

FIG. 28 is a schematic diagram showing a method for obtaining the power range used in the step S122 of FIG. 16 by curve approximation. As shown in FIG. 28, an approximation is conducted by first selecting points a, b, and c, wherein the points a and c are on a lower- and higher-power sides respectively, at which jitter values criterial for recording characteristics are in a vicinity of a threshold, and the point b is located between the points a and c, at which a jitter value is smaller than that at the point a, point c, or the threshold. Accordingly, the relation between the points a, b, and c is expressed as below.

a>b, c>b, and threshold>b

As shown in FIG. 23, the "vicinity of a threshold" is defined as a range between upper and lower limits that are away from the threshold by certain amount. Preferably, the upper limit value is set to be 40% more than the threshold, and the lower limit value to be 5% less than the threshold. Subsequently, the values at the points a, b, and c are approximated with a quadratic function, and the difference between larger and smaller points, at which the quadratic function intersects with the threshold, is defined as a power range. In addition, a range defined as the vicinity of a threshold can be modified in consideration of the interval between recording points, such as −5% to +40% or −10% to +30%.

Figure 29:
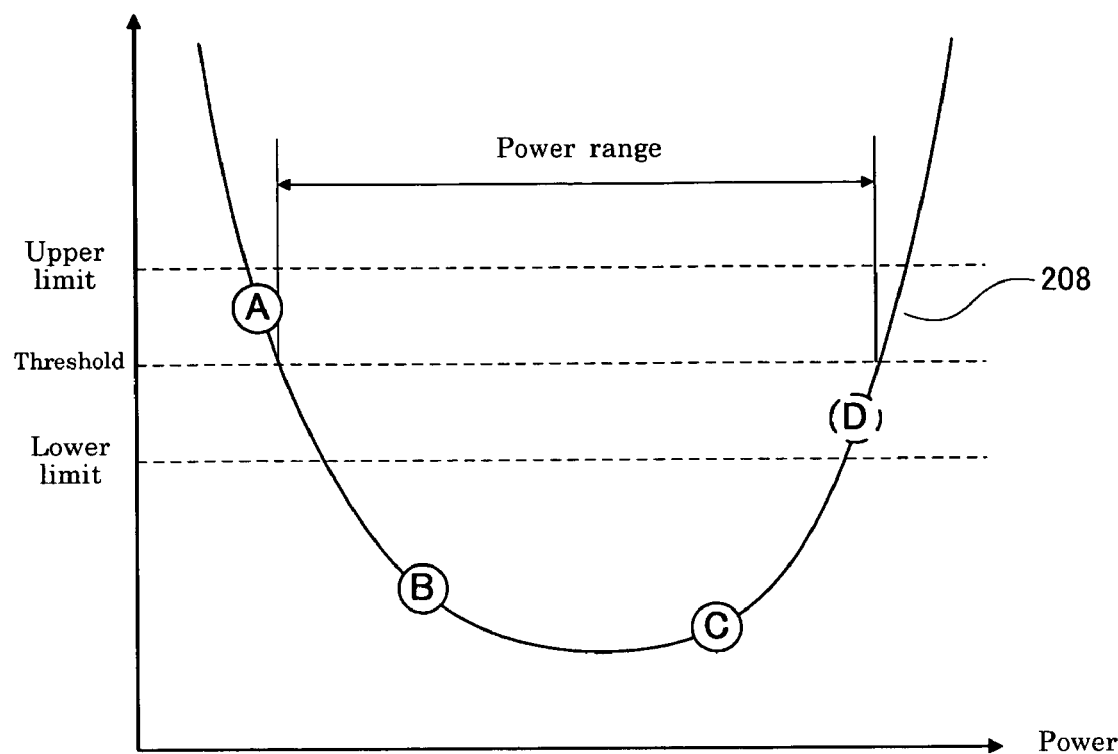
FIG. 29 is a schematic diagram showing another example of a method for obtaining the power range used for step S122 in FIG. 16 by curve approximation.

FIG. 29 is a schematic diagram showing another example of a method for obtaining the power range used in the step S122 of FIG. 16 by curve approximation. As shown in FIG. 29, when the conditions of A, B, and C are not sufficient to satisfy the above-described relationship of "a>b, c>b, and threshold>b," it is preferable to obtain another value in the vicinity of a threshold by adding a point D on a higher-power side.

Further, when the relationship of B>C exists as shown in the figure, it is preferable to obtain an approximation expression with the three points A, C, and D without the use of B.

Since the relationship between the three recording points and the threshold is "A>C, D>C, and threshold>C" that is suitable for drawing an approximation curve, a highly accurate approximated curve can be obtained by using the three points. In addition, an additional recording condition for the point D may be determined according to the relationship of the recording points A, B, and C prior to the additional recording, i.e., A>B and B>C, and a threshold.

Also, contrary to FIG. 28, recording can be conducted under a power condition lower than at the point A when a value in the vicinity of a threshold does not exist on a lower-power side. Depending on the relation between recording points and the threshold, one or more recording conditions may be added.

In addition, a power range used for the additional recording condition may have a constant variation to a predetermined power step, or a power condition may be set after preliminarily obtaining the relation between a jitter variation and a power variation.

In case that appropriate recording points for finding a power range are not obtained even by adding a recording condition as described above, recording points may be changed by further adding a recording condition with the aforementioned procedure.

In case of a medium with a limited test recording area such as a write-once medium, or in case of avoiding a use of significant amount of testing time, the number of the above-described additional recording conditions may have an upper limit. Also, a recording power may have an upper limit in order to prevent the recording power from exceeding a specified maximum laser output due to the additional recording conditions.

Further, a power range is obtained by the three-point approximation in the above-described example, but it may also be determined in such a way that two points closest to a threshold are first selected, and then the difference between two power values corresponding to those two points is obtained.

Another method for selecting two points in the vicinity of a threshold may be configured, wherein recording is repeated with power variations until larger and smaller points that are respectively located on higher and lower sides of the threshold are obtained, and two points that are closest to the threshold among all the recorded points or two points that are located on either side of the threshold are selected. The detail of the method is described below.

Determination of Test Area: Determination of Power Range by Sampling

Figure 30:
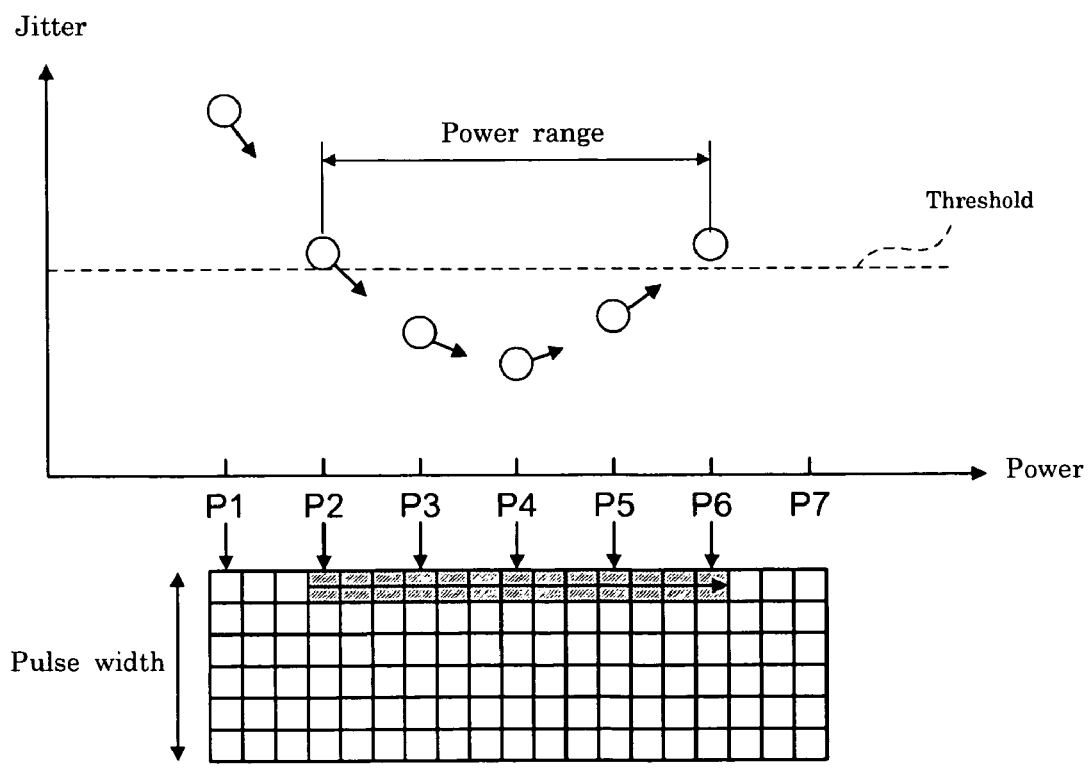
FIG. 30 is a schematic diagram showing an example of obtaining the power range used for the step S122 in FIG. 16 by sampling.

FIG. 30 is a schematic diagram showing an example of obtaining the power range used in the step S122 of FIG. 16 by sampling. As shown in FIG. 30, instead of approximating three points as described above, the power range is obtained on the basis of larger and smaller power values that are close to a threshold while gradually varying a power until values close to the threshold are obtained.

In other words, as shown in FIG. 30, recording/reproduction is repeated while varying the recording power from P1 to P2, P3, ... up to a power of P6 at which a value more than the threshold is obtained. A matrix image of this step shows that the power is varied from P1 to P6, but the power range is between P2 on a lower-power side and P6 on a higher-power side that are both closest to the threshold. Thus, a power range may be determined by selecting two points respectively located on either side of a threshold.

A method for selecting the two points, higher and lower, closest to a threshold involves selecting to use one of the followings as appropriate.

1) A method for selecting higher and lower points that define a power margin, that is, selecting two points that are in a power area wherein a reproduction reference value is satisfied, and both closest to a reproduction reference value.
2) Selecting two points closest to a reproduction reference value that are slightly outside of a power margin.
3) Selecting two points that are on either side of a reproduction reference value on a lower-power side.
4) Selecting two points that are on either side of a reproduction reference value on a higher-power side.
5) Selecting two points that are on either side of a reproduction reference value on the lower- and higher-power sides respectively, and both close to a reproduction reference value.

Also, approximating recording characteristics using two points selected by one of the above-described methods allows two points at which the approximated curve intersects with a reproduction reference value to be selected. The above-described steps allow a top pulse condition to be determined as a reference recording pulse condition.

Determination of Last Pulse

Figure 31:
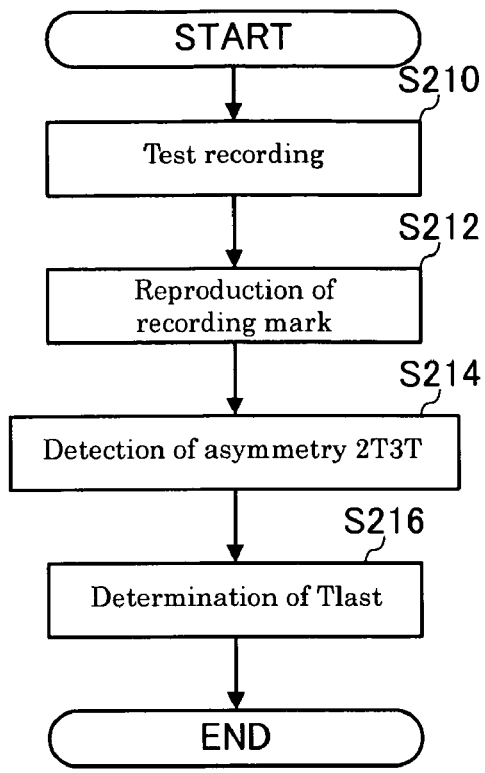
FIG. 31 is a flowchart showing a detailed execution procedure of the determination step of a last pulse condition shown in FIG. 10(a).

FIG. 31 is a flowchart showing a detailed execution procedure of the determination step of a last pulse condition shown in FIG. 10(a). As shown in FIG. 31, in the case of determining a last pulse condition, a test recording is conducted using the top pulse condition determined in the above-mentioned procedure and a tentatively configured intermediate pulse condition (step S210), and reproducing a resulting recording mark (step S212) allows a value of an asymmetry 2T3T to be detected (step S214). Subsequently, a pulse width at which the value of the asymmetry 2T3T becomes zero is specified, and the pulse width is configured as the last pulse condition (step S216).

Figure 32:
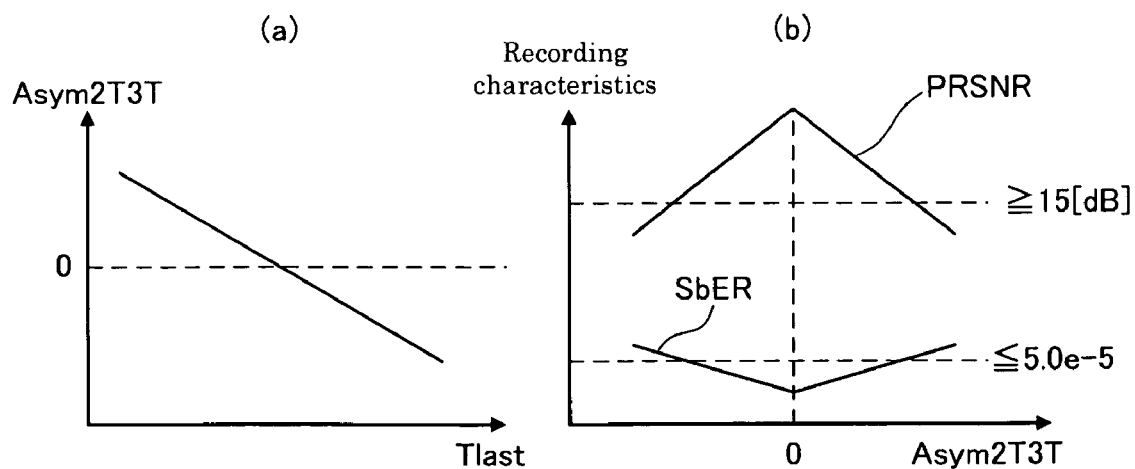
FIG. 32 is a graph showing a result of conducting the execution procedure shown in FIG. 31.

FIG. 32 is a graph showing a result of conducting the execution procedure shown in FIG. 31. FIG. 32(a) shows the value of the asymmetry 2T3T obtained by varying the width Tlast of the last pulse stepwise, and the width at which the asymmetry value becomes zero is configured as the last pulse condition. FIG. 32(b) shows recording characteristics relative to the variation of the asymmetry 2T3T. As shown in the figure, both of the recording characteristics, PRSNR and SbER, exhibit an optimum value at the point where the asymmetry 2T3T is zero. Since it is preferable that the PRSNR is equal to or more than 15 dB and the SbER is equal to or less than 5.0e-5, satisfactory recording characteristics can be obtained under the recording condition wherein the asymmetry 2T3T becomes zero.

Determination of Intermediate Pulse

Figure 33:
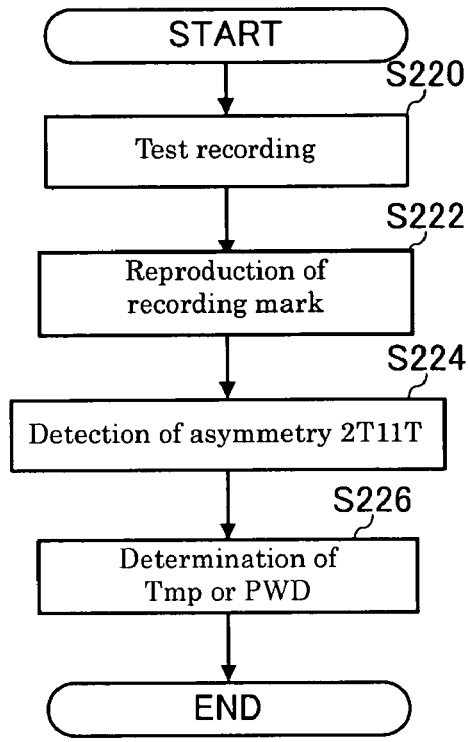
FIG. 33 is a flowchart showing a detailed execution procedure of the determination step of an intermediate pulse condition shown in FIG. 10(a).

FIG. 33 is a flowchart showing a detailed execution procedure of the determination step of an intermediate pulse condition shown in FIG. 10(a). As shown in FIG. 33, in the case of determining an intermediate pulse condition, a test recording is conducted using the top pulse condition and the last pulse condition determined in the above-mentioned procedures (step S220), and reproducing a resulting recording mark (step S222) allows a value of an asymmetry 2T11T to be detected (step S224). Subsequently, a pulse width at which the value of the asymmetry 2T11T becomes zero is specified, and the pulse width is configured as the intermediate pulse condition (step S226).

Figure 34:
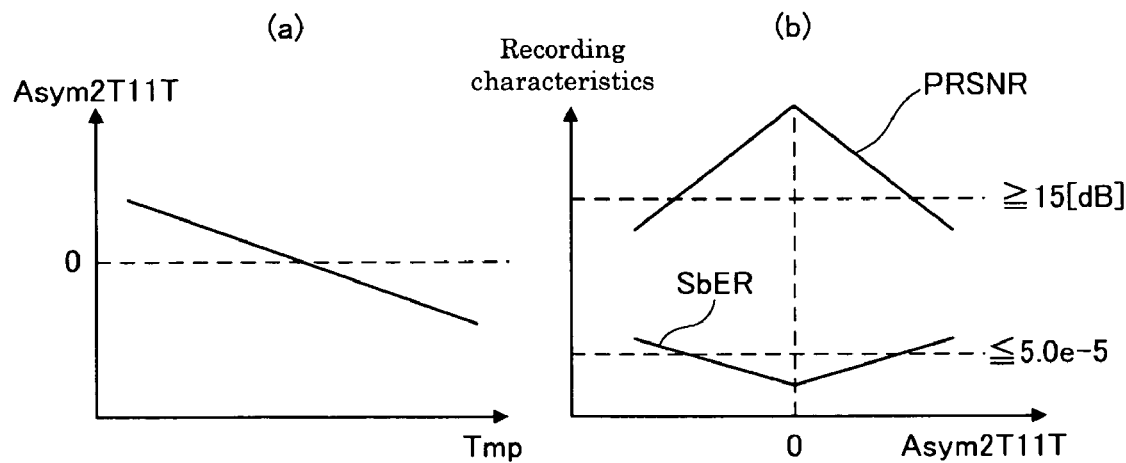
FIG. 34 is a graph showing a result of conducting the execution procedure shown in FIG. 33.

FIG. 34 is a graph showing a result of conducting the execution procedure shown in FIG. 33. FIG. 34(a) shows the value of the asymmetry 2T11T obtained by varying the width Tmp of the intermediate pulse stepwise, and the width at which the asymmetry value becomes zero is configured as the last pulse condition. FIG. 34(b) shows recording characteristics relative to the variation of the asymmetry 2T11T. As shown in the figure, both of the recording characteristics, PRSNR and SbER, exhibit an optimum value at the point where the asymmetry 2T11T is zero. Since it is preferable that the PRSNR is equal to or more than 15 dB and the SbER is equal to or less than 5.0e-5, satisfactory recording characteristics can be obtained under the recording condition wherein the asymmetry 2T11T becomes zero.

As described above, central levels of signal amplitudes of codes 2T and 3T are matched by adjusting a last pulse, and those of codes 2T and 11T are matched by adjusting an intermediate pulse. Consequently, central levels of signal amplitudes of 3T and 11T are matched inevitably. As a result, points where the asymmetry values 2T3T, 2T11T, and 3T11T, which are the indicators of the three asymmetries, become zero are substantially matched, and thus, recording characteristics are most stabilized under the condition. In addition, the adjustment of the intermediate pulse is preferably performed by controlling a power ratio between the top pulse and the intermediate pulse in the case of a single pulse or by controlling an intermediate pulse width in the case of a multipulse.

Phase Shift Correction

A phase shift is corrected in such a way that a test recording of a certain pattern is conducted using the recording pulse for each code determined in the above-described steps, a mark/space stream formed as a result of the test recording is reproduced, and a shift correction is made for obtained code information. In addition, the following description exemplifies the case using a 3T code as the shortest code, but the same is also applicable to the case wherein a 2T code is used as the shortest code.

Figure 35:
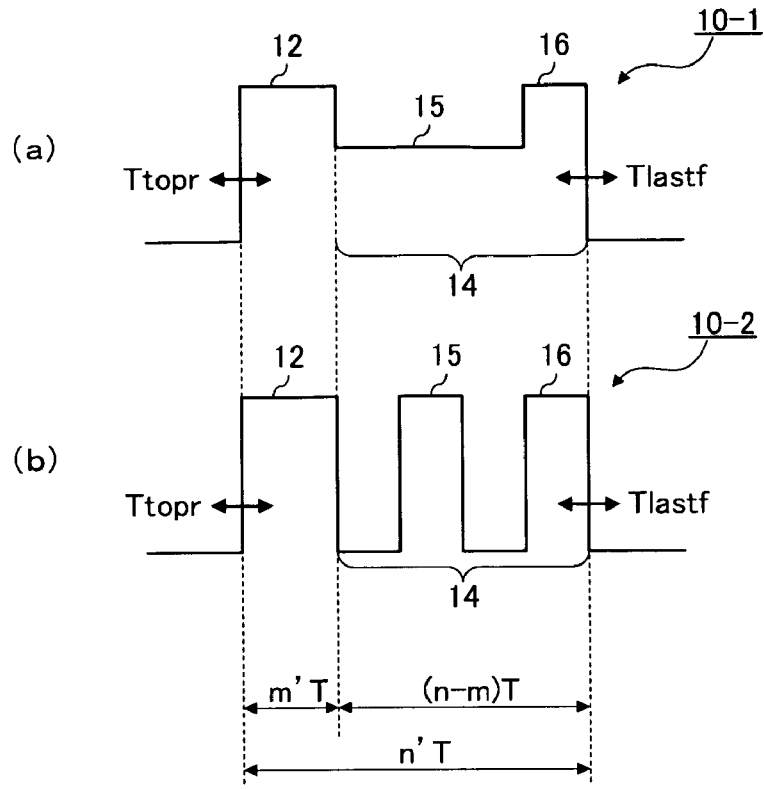
FIG. 35 is a schematic diagram exemplifying a test recording pulse that is used in a phase shift correction shown in FIG. 10(a).

FIG. 35 is a schematic diagram showing an example of a test recording pulse that is used in a phase shift correction shown in FIG. 10(a). FIG. 35(a) is an example of a case using a single pulse comprised of a single pulse pattern, and (b) a case using a multipulse comprised of a plurality of pulse patterns.

As shown in FIG. 35, in either case of the single pulse 10-1 or the multipulse 10-2, Ttopr that adjusts a start position of a top pulse 12 and Tlastf that adjusts an end position of a last pulse 16 are defined as phase conditions for a recording pulse. Adjusting these values allows a mark length after recording to be further optimized. In addition, these phase conditions are determined by conducting a test recording based on the top pulse condition and succeeding pulse condition determined with the above-described procedure.

Figure 36:
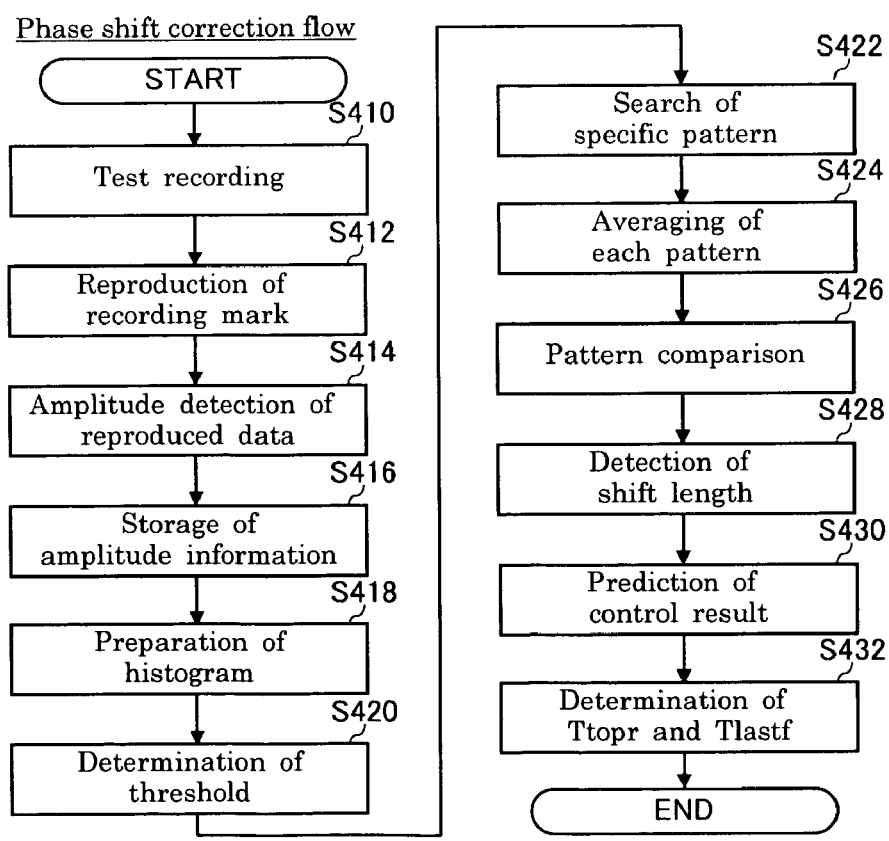
FIG. 36 is a flowchart showing an execution procedure of a phase shift correction shown in FIG. 10(a).

FIG. 36 is a flowchart showing an execution procedure of a phase shift correction shown in FIG. 10(a). As shown in FIG. 36, the drive shown in FIG. 15 first conducts a test recording onto the medium 50 using various recording patterns obtained by varying a phase condition of a recording pulse comprised of a top pulse and a succeeding pulse (step S410). In this step, the top pulse condition and succeeding pulse condition are fixed at values obtained with the above-described procedures.

Then, a recording pattern formed by the test recording is reproduced (step S412), and consequently, amplitude information of a reproduction signal is detected in the amplitude detection block shown in FIG. 1 provided in the code determination circuit 110 (step S414). The obtained amplitude data are stored into the recording area 115 (step S416).

Subsequently, the recording shift detection part 112 generates a histogram showing an appearance rate of each of the codes (step S418) using the amplitude data accumulated in the recording area 115, and a threshold for an amplitude level that provides a criterion for a mark or space length (step S420) is determined based on the histogram.

Subsequently, the recording shift detection part 112 searches various types of specific patterns including a specific mark/space pattern from the amplitude data stored in the recording area 115 on the basis of the threshold (step S422), and average levels of respective marks and respective spaces comprising the specific patterns are obtained by averaging amplitude data for the marks considered to have the same mark length included in the specific patterns as well as by averaging amplitude data for the spaces considered to have the same space length (step S424).

Subsequently, the recording shift detection part 112 sets one of the extracted specific patterns as a reference pattern, and comparing the reference pattern with other patterns (step S426) allows the following shift lengths to be detected independently (step S428):

1) Front-side phase shift length of a mark relative to the recording pulse
2) Backside phase shift length of a mark relative to the recording pulse
3) Shift length of a mark relative to the recording pulse due to heat interference Then, an equation derivation part 113 derives an equation for determining an optimum strategy based on the shift length detected by the recording shift detection part 112. A strategy determination part 114 predicts a control result of various parameters using the equation derived by the equation derivation part 113 (step S430), and then Ttopr and Tlastf shown in FIG. 35 are determined according to the prediction and set for the strategy circuit 102 (step S432).

Figures 37, 38:
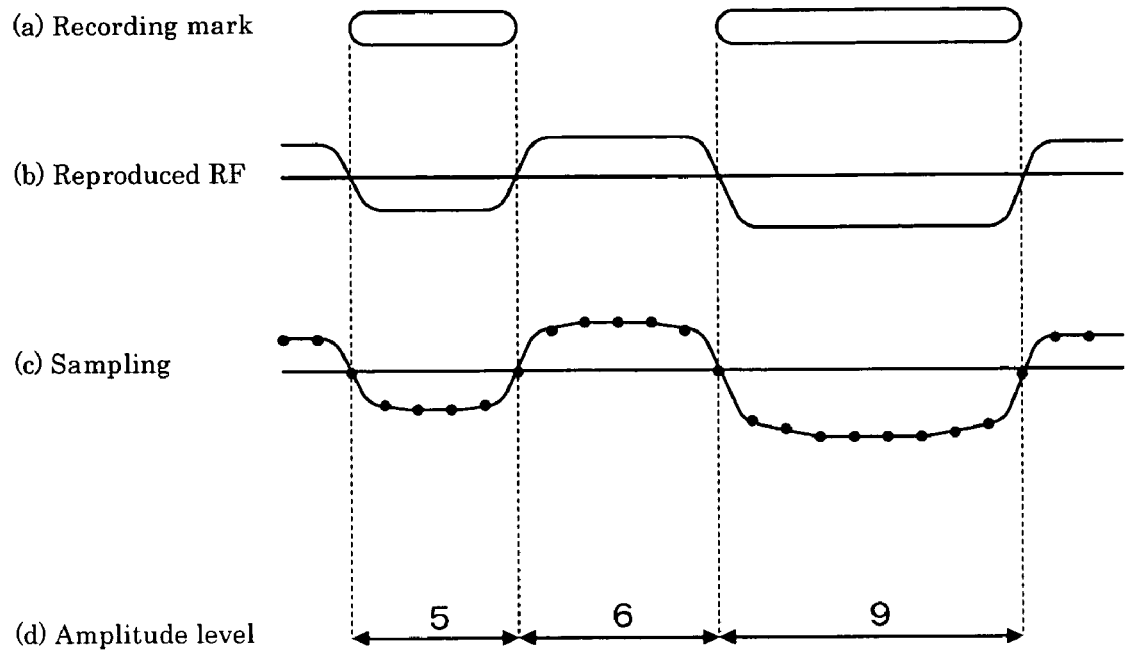
FIG. 37 is a schematic diagram showing an operation concept from a step of test recording to a step of detecting an amplitude level shown in FIG. 36.
FIG. 38 is a schematic diagram showing an image of storing the amplitude level shown in FIG. 36.

FIG. 37 is a schematic diagram showing an operational concept from the step of test recording to the step of detecting an amplitude level shown in FIG. 36. As shown in FIG. 37, a test recording forms recording marks as shown in FIG. 37(a) onto an optical disk. Then, when the recording marks are reproduced, a reproduction RF signal corresponding to the recording marks is obtained as shown in FIG. 37(b). By sampling the reproduction RF signal, sampling data indicated by black dots in FIG. 37(c) are obtained, and by taking maximum and minimum values of the sampling data, amplitude levels shown in FIG. 37(d) are obtained.

FIG. 38 is a schematic diagram showing an image of storing the amplitude information shown in FIG. 36. As shown in FIG. 38, the amplitude level for each pulse having either polarity obtained by counting the binarized signal using the clock signal is stored in a table provided in the storage area 115 in time-series order. The table shown in FIG. 38 is stored along with an address that enables later searching.

FIG. 39 is a schematic diagram showing an image of generating a histogram shown in FIG. 36. As shown in FIG. 39, a histogram is obtained by graphing appearance rates for respective detected values, and generating separate histograms for marks and spaces respectively enables two different types of histograms, that is, a mark histogram showing a detection tendency of the marks (FIG. 39(a)) and a space histogram showing that of the spaces (FIG. 39(b)) to be obtained. Thus, since each unit length nT (n=3, 4, 5, . . . 14) based on the reference clock is inevitably determined in optical disks, peaks showing the distribution of appearance rates for respective unit lengths nT are obtained.

FIG. 40 is a schematic diagram showing an image of determination of a threshold shown in FIG. 36. As shown in FIG. 40, since each valley portion formed between two adjacent peaks in each of the histograms can be used as a criterial threshold for each of unit lengths nT, a mark length threshold that provides a criterion for each of mark lengths and a space threshold that provides a criterion for each of space lengths are defined regarding the mark histogram and space histogram respectively.

Figures 41, 42:
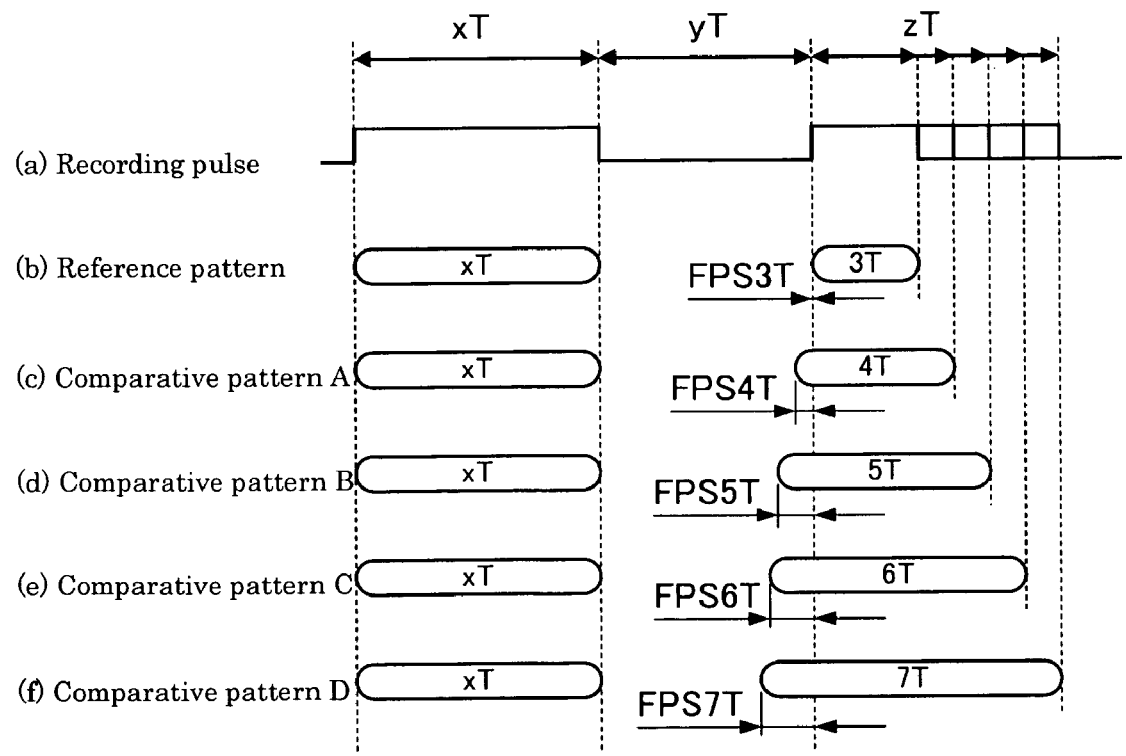
FIG. 41 is a schematic diagram showing an example of thresholds obtained by the method shown in FIG. 40.
FIG. 42 is a schematic diagram exemplifying a recording pattern and a reproduction pattern for detecting a front-side phase shift length in each mark length.

FIG. 41 is a schematic diagram showing an example of thresholds obtained by the method shown in FIG. 40. Each mark length threshold is defined for each boundary between two adjacent mark lengths as shown in FIG. 41(a), and each space length threshold for each boundary between two adjacent space lengths as shown in FIG. 41(b). The example in FIG. 41(a) shows that a threshold provided at a boundary between 2T and 3T is "amplitude level=2", between 3T and 4T is "amplitude level=9" and a threshold is defined up to the boundary between 14T and 15T. The example in FIG. 24(b) shows that a threshold provided at a boundary between 2T and 3T is "amplitude level=2" and between 3T and 4T is "amplitude level=10". Likewise, a threshold is defined up to the boundary between 14T and 15T.

Next, each of the steps shown in FIG. 36, from the step of searching a specific pattern (step S422) to the step of detecting a shift length (step S428), is described below in details. The steps are conducted in the recording shift detecting part 112, based on a principle for detecting various types of shifts.

FIG. 42 is a schematic diagram showing an example of a recording pattern and a reproduction pattern for detecting a front-side phase shift length in each mark length. As shown in FIG. 42, in the case of detecting a front-side phase shift length of each mark, a test recording is conducted using a recording pulse shown in FIG. 42(a). The recording pulse includes a pattern comprised of a fixed mark MxT, a fixed space SyT, and a variable mark MzT successively, and is generated by varying a length of the variable mark MzT from 3T to 7T while fixing lengths of the fixed mark MxT and the fixed space SyT as shown in FIGS. 42 (b) to (f). Although not shown in the figure, the length of the variable mark MzT is varied up to 14T.

When the length of each fixed space SyT in the recording pattern is measured, it should be constant under an ideal recording condition. However, if the length of the fixed space SyT is shifted from a predetermined ideal length, since the length of the mark MxT is fixed, the shift length of each fixed space SyT from the predetermined ideal length corresponds to the front-side phase shift length of each mark M3T, M4T, . . . or M14T for each unit length 3T, 4T, . . . or 14T in the recording pulse generated with a strategy during recording.

Accordingly, a pattern shown in FIG. 42(b), wherein the variable mark MzT has a length of 3T, is set as a reference pattern, and the rest of the patterns shown in FIGS. 42(c) to (f) as comparison patterns. Then, by comparing each of the comparison patterns with the reference pattern in terms of the fixed space length SyT, a front-side phase shift length FPS4T to FPS7T relative to the reference pattern is obtained as shown in the figure.

Since it is only necessary to detect each of the shift lengths FPS3T to FPS7T as a value relative to any position, the front-side phase shift length FPS3T of the reference pattern may be defined as zero or detected as a shift length from the ideal length. Also, instead of the pattern in FIG. 42(b), one of the patterns shown in FIGS. 42(c) to (f) may be selected as the reference pattern.

Figure 43:
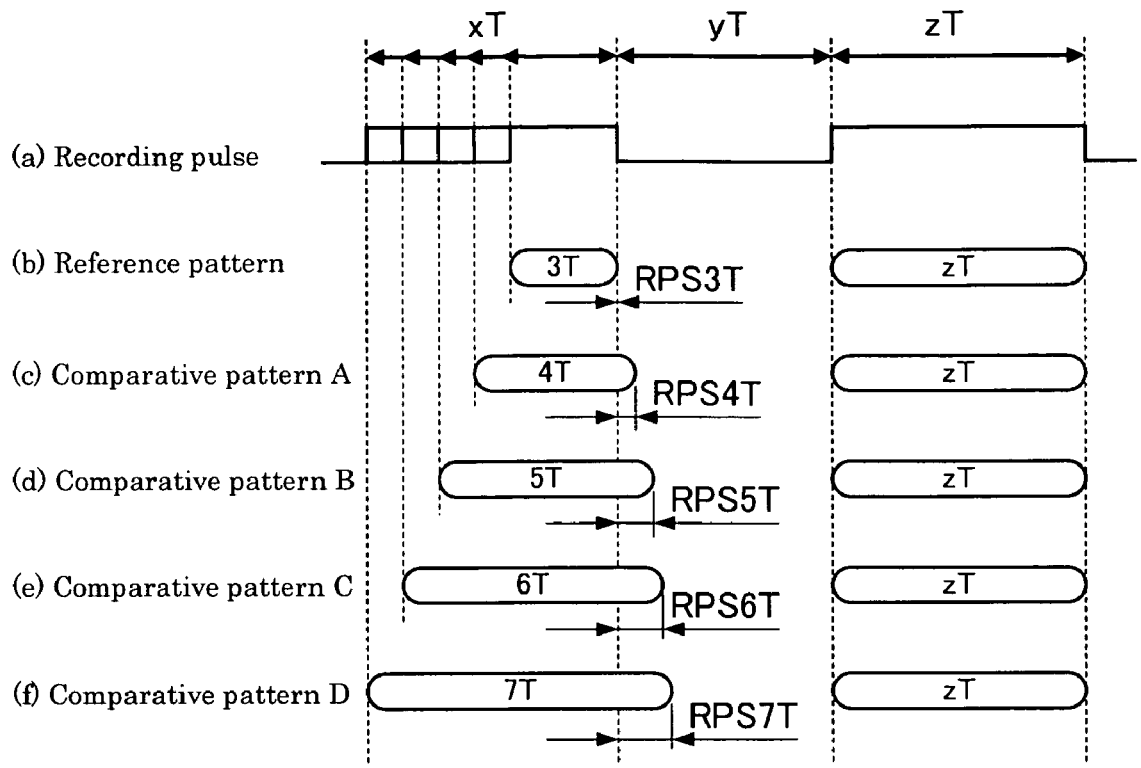
FIG. 43 is a schematic diagram exemplifying a recording pattern and a reproduction pattern that are used for detecting a backside phase shift length of each mark.

FIG. 43 is a schematic diagram showing an example of a recording pattern and a reproduction pattern that are used for detecting a backside phase shift length of each mark. As shown in FIG. 43, in the case of detecting a backside phase shift length of each mark, a test recording is conducted using a recording pulse shown in FIG. 43(a). The recording pulse includes a pattern having a variable mark MxT, a fixed space SyT, and a fixed mark MzT successively and is generated by varying a length of the variable mark MxT from 3T, 4T, ... to 7T while fixing lengths of the fixed space SyT and the fixed mark MzT as shown in FIGS. 43(b) to (f). Although not shown in the figure, the length of the variable mark MxT is varied up to 14T.

When the length of the fixed space SyT in the recording pattern is measured, it should be constant under an ideal recording condition. However, if the length of the fixed space SyT is shifted from a predetermined ideal length, since the length of the mark MzT is fixed, the shift length of each fixed space SyT from the predetermined length corresponds to the backside phase shift length of each mark, M3T, M4T, ... or M14T for each unit length 3T, 4T, ... or 14T in the recording pulse generated with a strategy during recording.

Accordingly, after a pattern shown in FIG. 43(b), wherein the variable mark MxT has a length of 3T, is set as a reference pattern and the rest of the patterns shown in FIGS. 43(c) to (f) as comparison patterns, comparing each of the comparison patterns with the reference pattern in terms of the fixed space length SyT enables backside phase shift lengths RPS4T to RPS7T relative to the reference pattern to be obtained as shown in the figure.

Since it is only necessary to detect each of the shift lengths RPS3T to RPS7T as a value relative to any position, the backside phase shift length RPS3T of the reference pattern may be defined as zero or detected as a shift length from the ideal length. Also, instead of the pattern in FIG. 43(b), one of the patterns shown in FIGS. 43(c) to (f) may be selected as the reference pattern.

Figure 44:
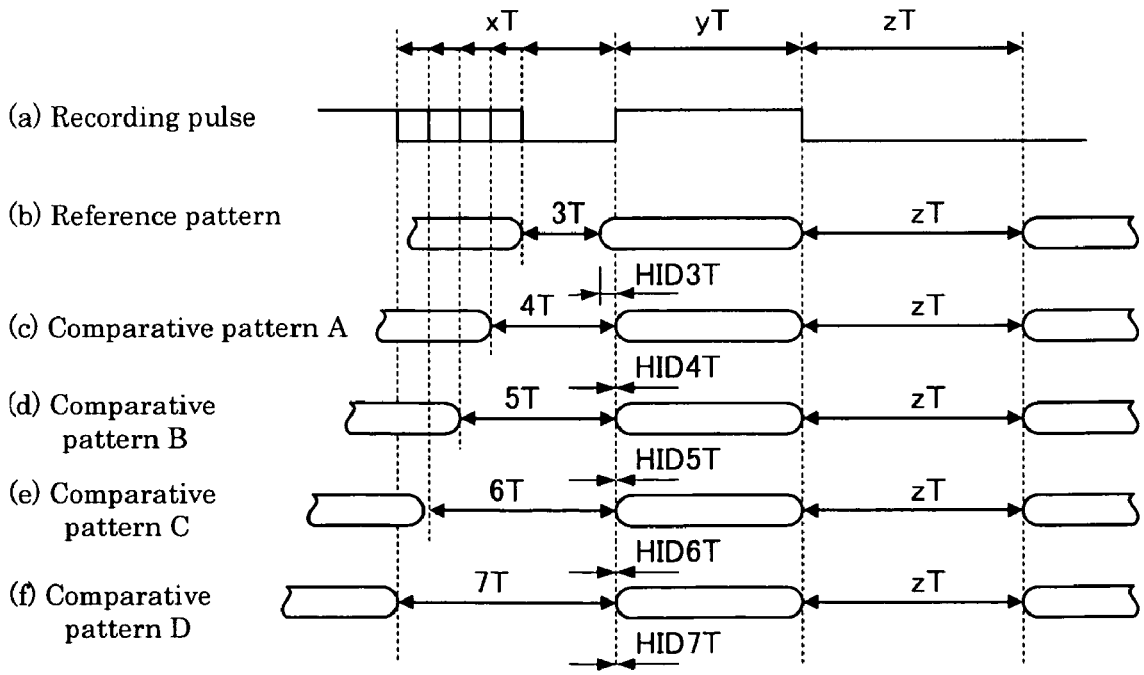
FIG. 44 is a schematic diagram exemplifying a recording pattern for detecting a shift length of each mark due to heat interference.

FIG. 44 is a schematic diagram showing an example of a recording pattern for detecting a shift length of each mark due to heat interference. As shown in FIG. 44, in the case of detecting a shift length of a mark due to heat interference, a test recording is conducted using a recording pulse shown in FIG. 44(a). The recording pulse includes a pattern having a space SxT, a mark MyT, and a space SzT successively and is generated by varying a length of the variable space SxT from 3T, 4T, ... or 7T while fixing lengths of the fixed mark MyT and the fixed space SzT as shown in FIGS. 44(b) to (f). Although not shown in the figure, the length of the variable space SxT is varied up to 14T.

When the length of the fixed mark MyT in the recording pattern is measured, it should be constant under an ideal recording condition. However, if the length of the fixed mark MyT is shifted from a predetermined ideal length, since the length of the space SzT is fixed, the shift length of the fixed mark MyT from the predetermined length corresponds to the shift length due to heat interference arising from a mark formed right before the variable space SxT.

Accordingly, after a pattern shown in FIG. 44(b), wherein the variable space SxT has a length of 3T, is set as a reference pattern and the rest of the patterns shown in FIGS. 44(c) to (f) as comparison patterns, comparing each of the comparison patterns with the reference pattern in terms of the fixed mark length MyT enables a front-side phase shift length HID3T to HID7T relative to the reference pattern to be obtained as shown in the figure.

Since it is only necessary to detect each of the shift lengths HID3T to HID7T as a value relative to any position, the front-side phase shift length HID3T of the reference pattern may be defined as zero or detected as a shift length from an ideal length. Also, instead of the pattern in FIG. 44(b), one of the patterns shown in FIGS. 44(c) to (f) may be selected as the reference pattern.

FIG. 45 is a schematic diagram showing a table configuration for searching a specific pattern used in the detection of a front-side or backside phase shift length. In the case of detecting a front-side phase shift of a mark, data stored in the storage area 115 shown in FIG. 15 are searched according to the threshold range shown in FIG. 45(a) for a mark MxT, a space SyT, or a mark MzT defined for each specific pattern (step S422 in FIG. 36), and a data stream that satisfies the threshold range is extracted.

Subsequently, amplitude levels for each of the mark MxT, space SyT, and mark MzT are sorted and averaged (step S424 in FIG. 36). Conducting the above-described pattern comparison using the averages of the amplitude levels allows a front-side phase shift length of each of the marks to be obtained. FIG. 45(b) shows an example of a threshold in the case of detecting a backside phase shift of a mark, and the concept and operations in the case are the same as in the case of a front-side phase shift of a mark.

FIG. 46 is a schematic diagram showing a table configuration for searching a specific pattern used in the detection of a shift length of a mark due to heat interference. As shown in FIG. 46, a detection of a shift due to heat interference is conducted by the same procedures as in the case of detecting a front-side or backside phase shift of a mark described in FIG. 45.

Figure 47:
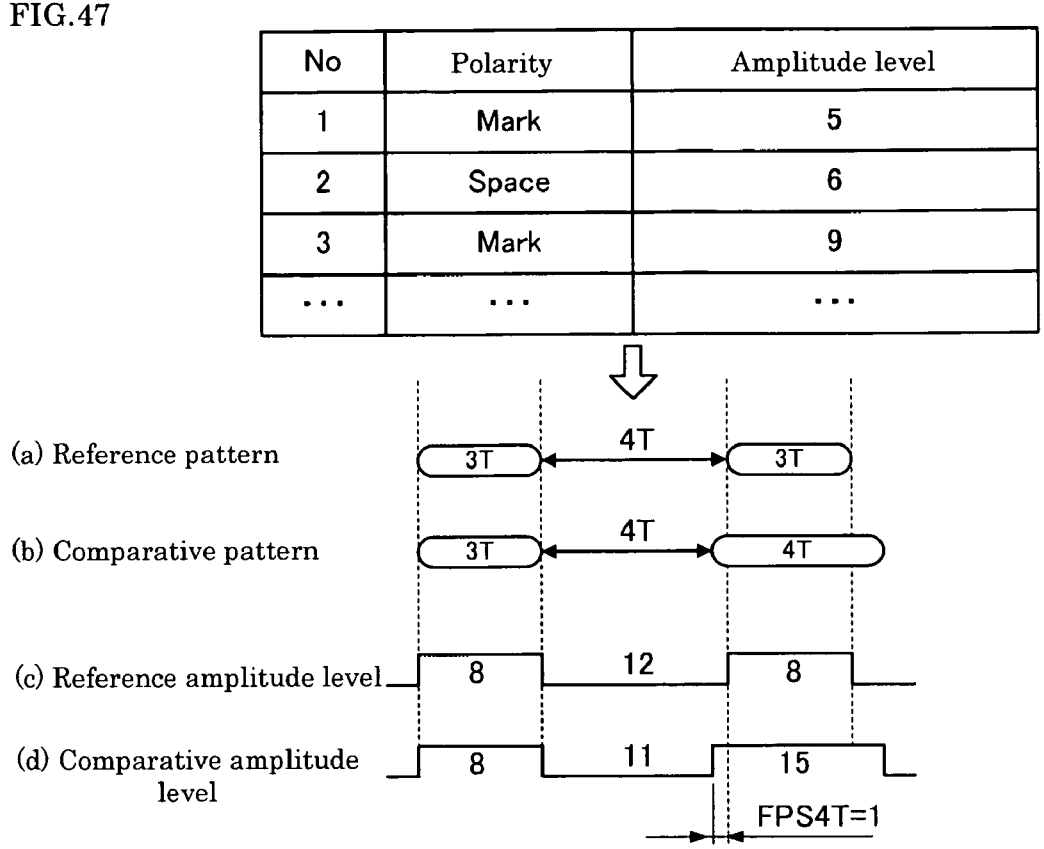
FIG. 47 is a schematic diagram showing a specific example of detecting a shift length by a comparison of amplitude levels.

FIG. 47 is a schematic diagram showing a specific example of detecting a shift length by a comparison of amplitude levels. The diagram shows an example of detecting a front-side phase shift of a mark, but the same method is also applied to the detection of other shift lengths. In the case of detecting a shift length, a reference pattern and a comparison pattern shown in FIGS. 47(a) and (b) respectively are searched in and extracted from data stored in the storage area, and then amplitude levels for a part supposed to have a fixed length are compared. In the example shown in the figure, a space SyT is used as a reference length for the comparison. Thus, the amplitude level of "12" shown in FIG. 47(c) for the reference pattern and that of "11" shown in FIG. 47(d) for the comparison pattern are compared with each other to obtain the difference, and the obtained difference of "1" is the value of a shift length FPS4T.

Figure 48:
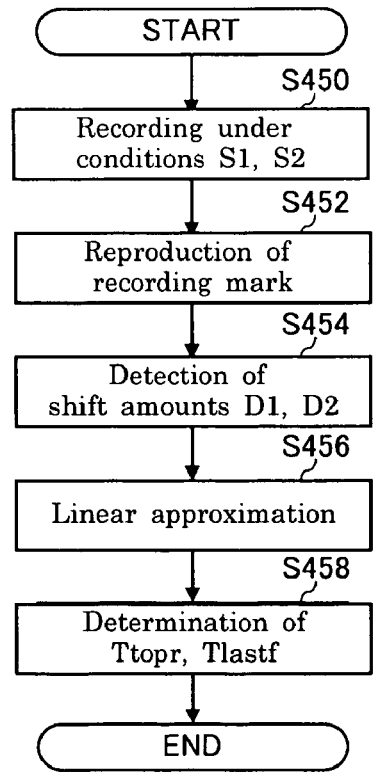
FIG. 48 is a flowchart showing an example of the determination of Ttopr and Tlastf by predicting a control amount shown in FIG. 36.

FIG. 48 is a flowchart showing an example of the determination of Ttopr and Tlastf by predicting a control amount shown in FIG. 36. As shown in FIG. 48, a control amount is predicted by implementing a series of steps of: conducting a test recording under two or more types of recording conditions including S1 and S2 (step S450); reproducing recording marks obtained by the test recording (step S452); comparing the obtained reproduction patterns in order to find a shift length D1 under the condition of S1 and a shift length D2 under the condition of S2 (step S454); then linearly approximating the relationship between (S1, D1) and (S2, D2) (step S456); and finally determining optimum Ttopr and Tlastf using the linearly approximated line (step S458).

Figure 49:
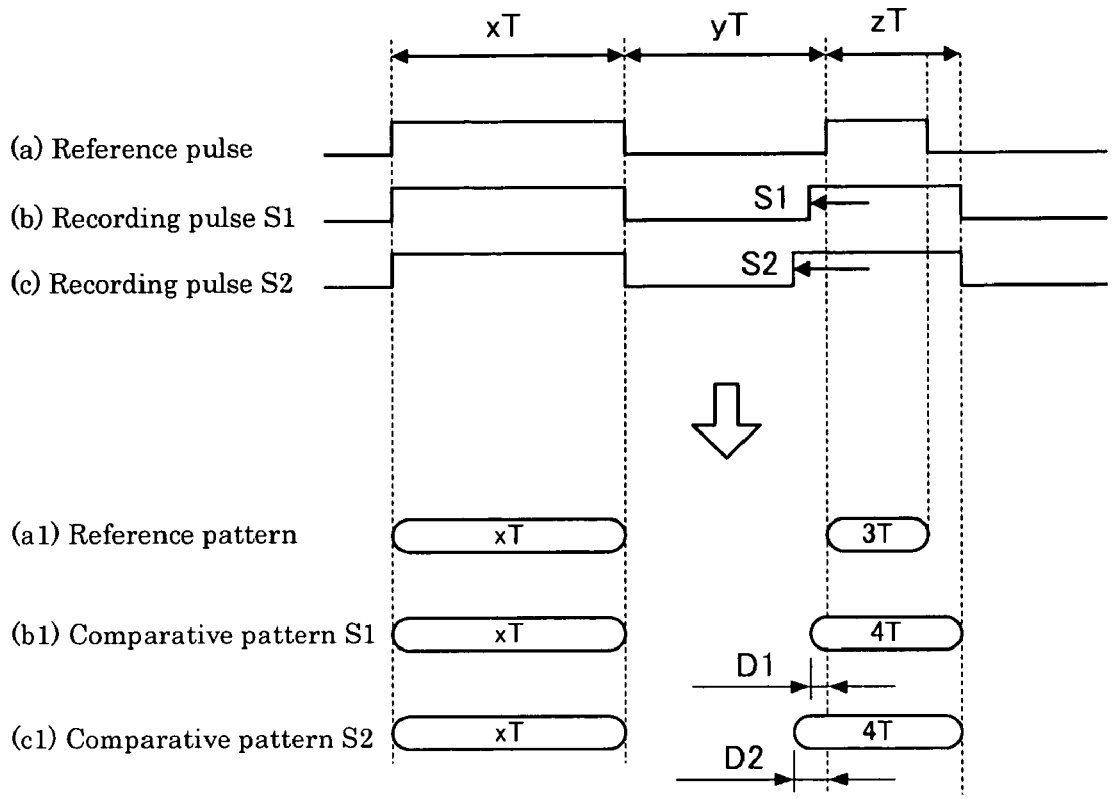
FIG. 49 is a schematic diagram showing the relationship between the variation in recording conditions (S1 and S2) and corresponding shift lengths (D1 and D2).

FIG. 49 is a schematic diagram showing the relationship between the variation in recording conditions (S1 and S2) and the corresponding shift lengths (D1 and D2). A recording pulse having "MzT=3T" is used as a reference pulse, and two recording pulses of "MzT=4T," which are obtained by shifting front edges of MzTs by S1 and S2 respectively as shown in FIGS. 49(b) and (c), are used as recording pulses to be compared. Then, test recordings are conducted using these recording pulses.

As a result, a reference pattern shown in FIG. 49(*a*1) is obtained correspondingly to a recording pulse shown in FIG. 49(*a*), and a comparison pattern S1 in FIG. 49(*b*1) correspondingly to a recording pulse in FIG. 49(*b*), and a comparison pattern S2 in FIG. 49(*c*1) correspondingly to a recording pulse in FIG. 49(*c*). A shift length D1 is caused by the control amount S1 in the comparison pattern S1, and a shift length D2 by the control amount S2 in the comparison pattern S2.

When the shift lengths D1 and D2 corresponding to the control amounts S1 and S2 respectively are obtained, a shift length caused by applying a control amount to any of the parameters becomes predictable. Accordingly, a prediction of a control amount and a determination of a correction value are conducted using the relationship between the control amount and the shift length.

Figure 50:
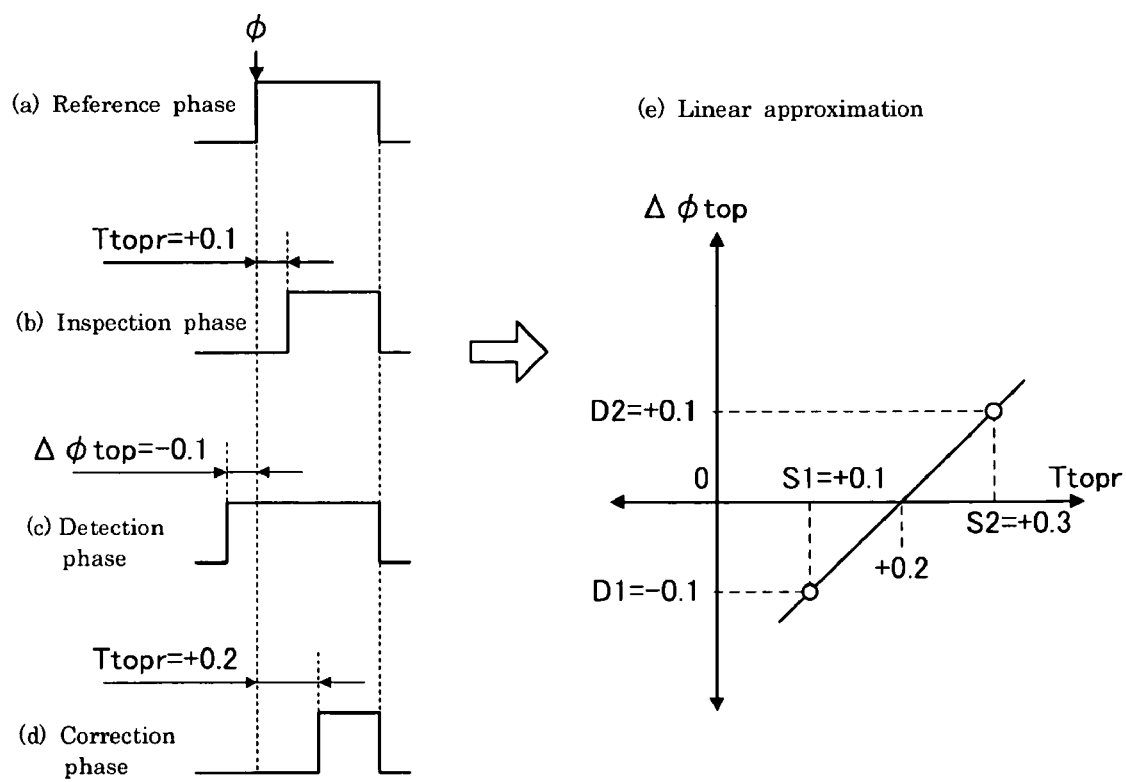
FIG. 50 is a schematic diagram showing an example of correcting a front-side phase shift using a linear approximation.

FIG. 50 is a schematic diagram showing an example of correcting a front-side phase shift using a linear approximation. In the case of determining a correction amount Ttopr for a front-side phase shift, a test recording is conducted first with a pulse shape having a pulse position shifted relative to a reference phase φ as shown in FIG. 50(*a*) by an amount of Ttopr as shown in FIG. 50(*b*) (recording condition S1 or S2). Consequently, as shown in FIG. 50(*c*), a phase shift Δφtop for the obtained reproduction signal is detected (shift length D1 or D2).

In the example shown in FIG. 50, varying the control amount Ttopr from S1=+0.1 to S2=+0.3 results in the variation of a phase shift Δφtop as D1=−0.1 to D2=+0.1. Then, using the obtained (S1, D1) and (S2, D2), the relationship between the control amount Ttopr and the resulting phase shift Δφtop is linearly approximated as shown in FIG. 50(*e*), and the approximated line is used to find a correction phase Ttopr=+0.2 as an optimum correction amount, with which a phase shift is canceled.

As described above, a linear or curve approximation can be applied to the relationship between the variations in strategy (S1 and S2) and in shift length (D1 and D2) when at least two points for each of the variations are obtained, and the approximated line (curve) enables an optimum correction amount with which a shift length becomes zero to be found.

Specifically, obtaining several shift lengths D by varying a strategy S; substituting several sets of the strategy S and the corresponding shift length D into a general expression of "D=a·S+b"; and solving simultaneous equations obtained by the substitution enable the constants a and b in the expression to be determined, resulting in the determination of a strategy S for an ideal shift length D. Applying the strategy S to the strategy circuit 102 shown in FIG. 15 enables a recording pulse to be optimally corrected.

For instance, assuming that the recording shift detection part 112 shown in FIG. 15 detects a shift length as D1 from a reproduction pattern of a test recording using a strategy S1 and that as D2 using the other strategy S2, the following simultaneous equations are obtained:

$D1 = a \cdot S1 + b$, and $D2 = a \cdot S2 + b$.

From the above equations, the constants a and b are deduced, whereby the following relationship between S and D is obtained:

$S = (D - b)/a$.

Substituting an output shift length D for improving recording quality, for instance, an output shift length for correcting an initial output shift length arising in an equalizer or the like, into the above relationship enables an optimum strategy S to be determined.

In addition, the relationship to determine an optimum strategy S may be obtained for each of the marks M3T, M4T, . . . and M14T having the length of 3T, 4T, . . . and 14T respectively. Further, it may also be obtained for each recording speed.

Figures 51, 52:
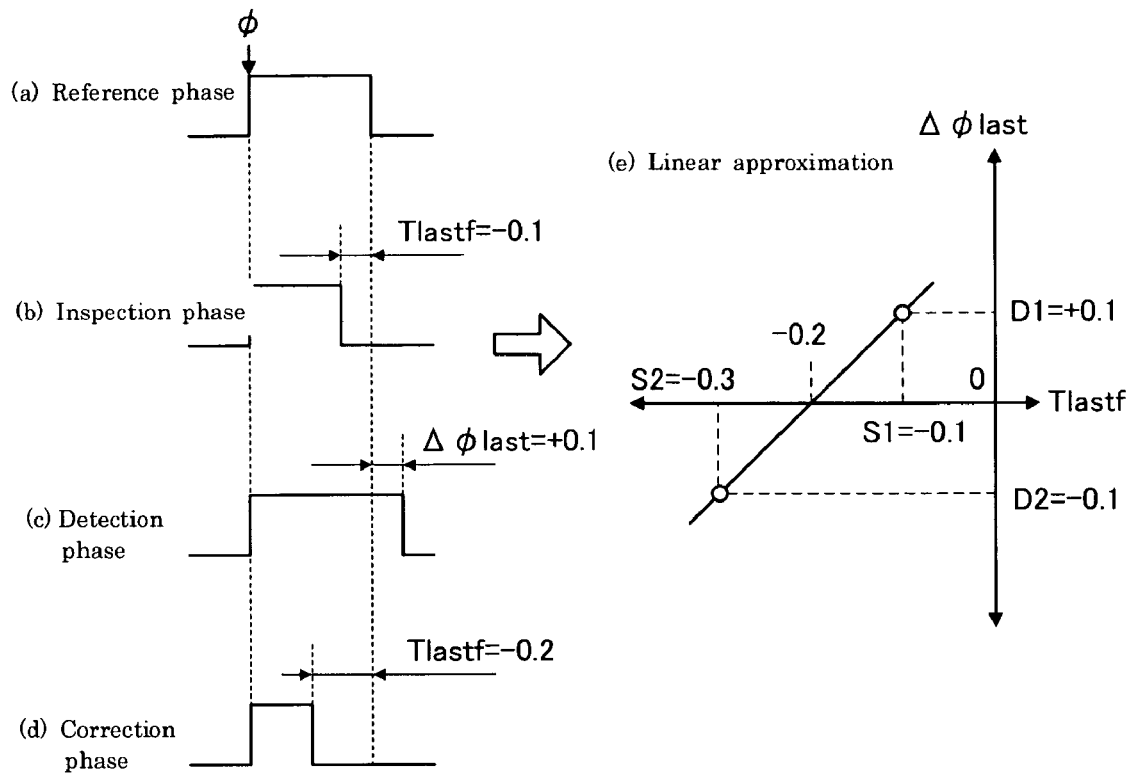
FIG. 51 is a schematic diagram showing an example of correcting a backside phase shift using a linear approximation.
FIG. 52 is a schematic diagram showing a table configuration for storing correction amounts Ttopr and Tlastf.

FIG. 51 is a schematic diagram showing an example of correcting a backside phase shift using a linear approximation. In the case of determining a correction amount Tlastf for a backside phase shift, a test recording is conducted first with a pulse shape having a pulse position shifted relative to a reference phase φ as shown in FIG. 51(*a*) by an amount of Tlastf as shown in FIG. 51(*b*). Consequently, a phase shift Δφlast for a reproduction signal is detected as shown in FIG. 51(*c*).

In the example shown in FIG. 51, varying the correction amount Tlastf from S1=−0.1 to S 2=−0.3 results in the variation of a phase shift Δφlast as D1=+0.1 to D2=−0.1. Then, using the obtained (S1, D1) and (S2, D2), the relationship between the control amount Tlastf and the resulting phase shift Δφlast is linearly approximated as shown in FIG. 51(*e*), and the approximated line is used to find a correction phase Tlastf=−0.2 as an optimum correction amount, with which a phase shift is canceled.

FIG. 52 is a schematic diagram showing a table configuration for storing correction amounts Ttopr and Tlastf. As shown in FIG. 52(*a*), the correction amount Ttopr is defined for each mark length to be corrected in combination with a space length located before the mark. For instance, when a mark to be corrected has a length of 3T and a space before the mark has a length of 3T, a correction amount is stored in an area indicated as "3-3" in FIG. 52(*a*). Similarly, when a mark to be corrected has a length of 4T and a space before the mark has a length of 3T, a correction amount is stored in an area indicated as "3-4" in the figure. In the same manner as the case of 3T or 4T, for each of the mark lengths 5T to 14T, a correction amount Ttopr is stored correspondingly to a space length located before the mark.

Further, as shown in FIG. 52(*b*), the correction amount Tlastf is defined for each mark length to be corrected in combination with a space length located after the mark. For instance, when a mark to be corrected has a length of 3T and a space after the mark has a length of 3T, a correction amount is stored in an area indicated as "3-3" in FIG. 52(*b*). Similarly, when a mark to be corrected has a length of 4T and a space after the mark has a length of 3T, a correction amount is stored in an area indicated as "3-4" in FIG. 52(*b*). In the same manner as the case of 3T or 4T, for each mark length 5T to 14T, a correction amount Tlastf is stored correspondingly to a space length after the mark.

Figure 53:
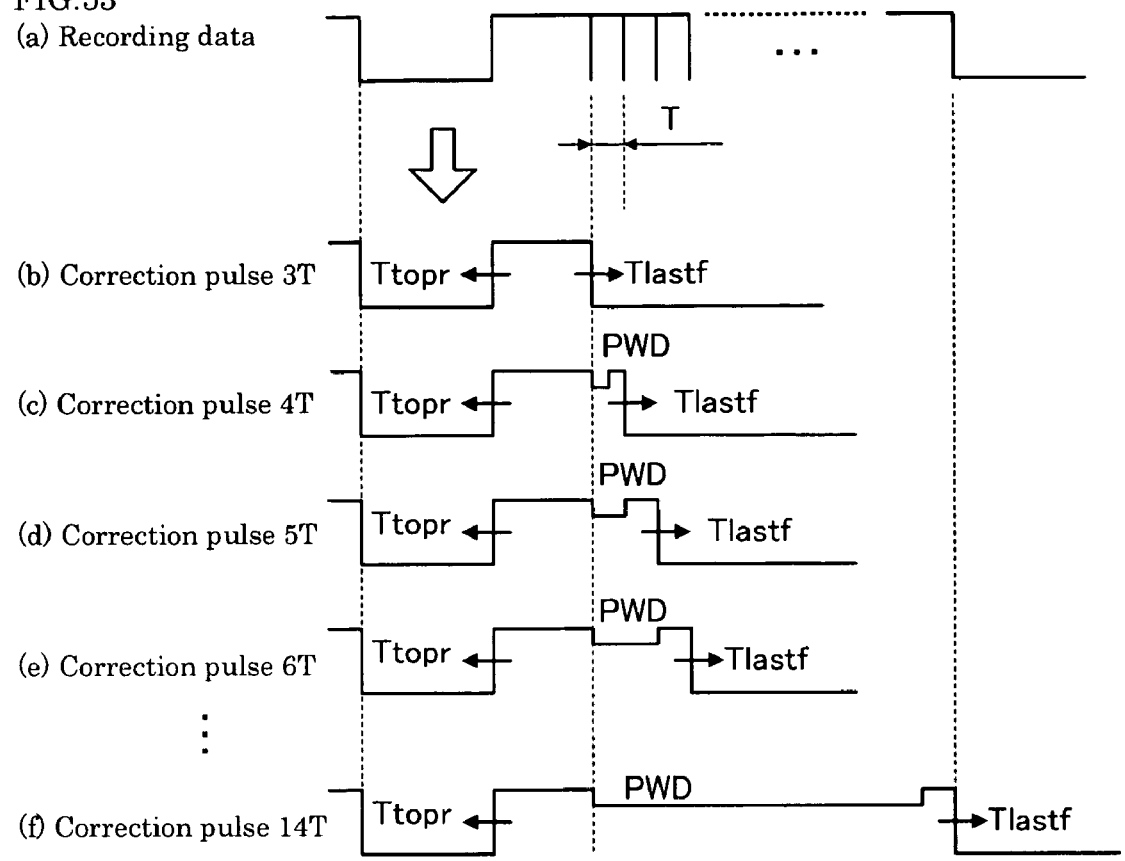
FIG. 53 is a schematic diagram showing an example of a corrected single pulse.

FIG. 53 is a schematic diagram showing an example of a corrected single pulse. As shown in FIGS. 53(*a*) to (*f*), when recording data in FIG. 53(*a*) are recorded onto an optical disk, a strategy to which an optimum correction value is applied is set for each mark length. For instance, in the case of recording a 3T mark as shown in FIG. 53(*b*), a front correction value Ttopr of the 3T mark is read out correspondingly to the length of a space before the mark as well as a rear correction value Tlastf of the 3T mark is read out correspondingly to the length of a space after the mark from the table shown in FIG. 53. Then, the front and rear ends of the recording pulse are corrected with the Ttopr and Tlastf respectively.

Also, in the case of correcting marks having a length of 4T or longer, as shown in FIGS. 53(*c*) to (*f*), a PWD correction value for each mark length is read out from a predetermined table in addition to the Ttopr and Tlastf, and a pulse shape is corrected correspondingly to the PWD value.

FIG. 54 is a schematic diagram showing an example of a corrected multipulse. In the case of correcting a multipulse as shown in FIG. 54, instead of the PWD correction value used for correcting a single pulse as described above, a Tmp correction value is read out from a predetermined table, and a pulse shape is corrected correspondingly to the Tmp value. Other steps are the same as in the single pulse case.

In addition, the above-described embodiment shows the case wherein an optimum strategy S is determined by substituting the shift length D into the relationship to find the optimum strategy, however, the optimum strategy S may be determined by using a correction table preliminary obtained with the relationship.

Further, the above-described procedure of setting an optimum strategy may be conducted every time the type of optical disk is changed, or as a recording speed is changed. Also, under the condition that optimum strategy conditions for various types of optical disks or recording speeds, which are determined by the above-described procedure of setting an optimum strategy, are preliminarily stored in a memory, when recording onto one of the optical disk types or at one of the recording speeds stored in the memory, a corresponding optimum strategy stored in the memory may be read out and used.

The present invention enables an optimum possible recording condition to be obtained even for a medium unknown to a drive, and thus could be applied to severer recording environments.

What is claimed is:

1. An optical information recording device for recording information onto an optical information recording medium by irradiating a laser beam onto said recording medium to record a code stream thereon, the code stream comprising multiple types of codes, the optical information recording device comprising:
   a photodetector configured to obtain a reproduction signal produced by laser beam irradiation onto the medium;
   a decoder configured to produce a detected code stream derived from the reproduction signal;
   timing adjustment circuitry for synchronizing at least a portion of the recorded code stream with a corresponding portion of the reproduction signal using the detected code stream;
   pattern specification circuitry specifying a part to be detected in the reproduction signal using recording data synchronized with the reproduction signal; and
   peak detection circuitry configured to detect an amplitude level of the reproduction signal corresponding to the part to be detected.

2. The optical information recording device according to claim 1, additionally comprising an analog to digital converter configured to produce digital data obtained by sampling the reproduction signal.

3. The optical information recording device according to claim 1, wherein the decoder is a Viterbi decoder.

4. The optical information recording device according to claim 1, wherein the recorded code stream is synchronized with the reproduction signal by adjusting a timing between a specific pattern included in the detected code stream and that in the recorded code stream.

5. The optical information recording device according to claim 1, wherein the part to be detected is specified by specifying a position of a pre-stored specific pattern present in the recording data that are synchronized with the reproduction signal.

6. The optical information recording device according to claim 5, wherein a different specific pattern is selected for at least some different parameters to be corrected in a recording pulse.

7. The optical information recording device according to claim 1, the optical information recording device further comprising circuitry configured to detect an asymmetry using the detected amplitude level.

8. The optical information recording device according to claim 1, the optical information recording device further comprising circuitry configured to detect an amplitude shift amount using the detected amplitude level.

9. The optical information recording device according to claim 1, wherein the part to be detected is a part corresponding to a code that is shorter than an effective spot diameter of the laser beam.

10. The optical information recording device according to claim 1, wherein the part to be detected is a part corresponding to a code that is shorter than an effective spot diameter of the laser beam and longer than a shortest code.

11. An optical information recording method for recording information onto an optical recording medium by applying a series of recording pulses with a laser beam onto said recording medium to record a code stream thereon, the code stream comprising multiple types of codes, the recording pulses being configured for each of the codes, the optical information recording method comprising the steps of:
   obtaining a reproduction signal by irradiating a laser beam onto the medium;
   producing a detected code stream derived from the reproduction signal;
   synchronizing at least a portion of the recorded code stream with a corresponding portion of the reproduction signal using the detected code stream;
   specifying a part to be detected in the reproduction signal;
   detecting an amplitude level of the reproduction signal within the part to be detected; and
   configuring a condition for the recording pulses based on the detected amplitude level.

12. A signal processing circuit for incorporation into an optical information recording device for recording information onto an optical recording medium by applying a series of recording pulses with a laser beam onto said recording medium to record a code stream thereon, the code stream comprising multiple types of codes, the recording pulses being configured for each of the codes, the signal processing circuit comprising:
   a first input for receiving a reproduction signal produced by irradiating a laser beam onto the medium;
   a decoder configured to produce a detected code stream derived from the reproduction signal;
   timing adjustment circuitry for synchronizing at least a portion of the recorded code stream with a corresponding portion of the reproduction signal using the detected code stream;
   pattern specification circuitry configured to specify a part to be detected in the reproduction signal;
   peak detection circuitry configured to detect an amplitude level of the reproduction signal corresponding to the part to be detected; and
   recording pulse correction circuitry configured to modify a condition for the recording pulses based on the detected amplitude level.

* * * * *